United States Patent
Yi et al.

(10) Patent No.: US 12,294,957 B2
(45) Date of Patent: May 6, 2025

(54) POWER HEADROOM REPORTING

(71) Applicant: Canon Kabushiki Kaisha, Tokyo (JP)

(72) Inventors: Yunjung Yi, Vienna, VA (US); Esmael Hejazi Dinan, McLean, VA (US); Hyoungsuk Jeon, Centreville, VA (US); Hua Zhou, Vienna, VA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/384,559

(22) Filed: Oct. 27, 2023

(65) Prior Publication Data

US 2024/0205843 A1 Jun. 20, 2024

Related U.S. Application Data

(63) Continuation of application No. 17/965,934, filed on Oct. 14, 2022, now Pat. No. 11,838,875, which is a
(Continued)

(51) Int. Cl.
| | |
|---|---|
| *H04W 56/00* | (2009.01) |
| *H04W 52/36* | (2009.01) |
| *H04W 72/02* | (2009.01) |
| *H04W 72/0446* | (2023.01) |
| *H04W 76/27* | (2018.01) |
| *H04W 92/10* | (2009.01) |
| *H04W 92/18* | (2009.01) |

(52) U.S. Cl.
CPC ......... *H04W 52/365* (2013.01); *H04W 72/02* (2013.01); *H04W 72/0446* (2013.01); *H04W 76/27* (2018.02); *H04W 92/10* (2013.01); *H04W 92/18* (2013.01)

(58) Field of Classification Search
CPC ... H04W 52/365; H04W 76/27; H04W 72/02; H04W 72/0446; H04W 92/10; H04W 92/18
USPC .......................................... 370/329
See application file for complete search history.

(56) References Cited

U.S. PATENT DOCUMENTS

| | | | |
|---|---|---|---|
| 9,894,621 B2 | 2/2018 | Siomina | |
| 10,383,067 B2 * | 8/2019 | Lin | H04W 52/367 |

(Continued)

FOREIGN PATENT DOCUMENTS

WO 2016/016854 A1 2/2016

OTHER PUBLICATIONS

"Li et al., Method for Reporting Power Headroom and Apparatus Therefor, and Communication System, Jul. 16, 2020, WO 2020142929" (Year: 2019).*

(Continued)

*Primary Examiner* — Sai Ming Chan
(74) *Attorney, Agent, or Firm* — Venable LLP

(57) ABSTRACT

A wireless device may select a power headroom value of a first cell. The power headroom value may be selected from a first power headroom value of an uplink transmission via uplink resources of the first cell, and a second power headroom value of a sidelink transmission via a sidelink resource pool of the first cell. The power headroom value may be selected based on whether the uplink transmission or the sidelink transmission is a scheduled transmission. The wireless device may transmit, based on selecting the power headroom value, a power headroom report comprising the power headroom value of the first cell.

12 Claims, 35 Drawing Sheets

Related U.S. Application Data continuation of application No. 16/985,798, filed on Aug. 5, 2020, now Pat. No. 11,477,740.

(60) Provisional application No. 62/882,816, filed on Aug. 5, 2019.

(56) References Cited

U.S. PATENT DOCUMENTS

| | | | |
|---|---|---|---|
| 2015/0163791 | A1 | 6/2015 | Chen |
| 2018/0152924 | A1 | 5/2018 | Ouchi |
| 2018/0242264 | A1* | 8/2018 | Pelletier ............. H04W 52/346 |
| 2020/0059944 | A1* | 2/2020 | Lee ......................... H04W 4/40 |
| 2021/0022184 | A1* | 1/2021 | Hosseini ............... H04W 72/56 |
| 2021/0076336 | A1* | 3/2021 | Shen ..................... H04W 52/38 |
| 2021/0250878 | A1 | 8/2021 | Liu et al. |
| 2021/0377876 | A1* | 12/2021 | Jeon ..................... H04W 24/08 |
| 2022/0174774 | A1* | 6/2022 | Tseng ................... H04W 76/23 |

OTHER PUBLICATIONS

3GPP TS 38.211 V15.5.0 (Mar. 2019); Technical Specification; 3rd Generation Partnership Project; Technical Specification Group Radio Access Network; NR; Physical channels and modulation; (Release 15).

3GPP TS 38.212 V15.5.0 (Mar. 2019); Technical Specification; 3rd Generation Partnership Project; Technical Specification Group Radio Access Network; NR; Multiplexing and channel coding; (Release 15).

Bgpp TS 38.213 V15.5.0 (Mar. 2019); Technical Specification; 3rd Generation Partnership Project; Technical Specification Group Radio Access Network; NR; Physical layer procedures for control (Release 15).

3GPP TS 38.214 V15.5.0 (Mar. 2019); Technical Specification; 3rd Generation Partnership Project; Technical Specification Group Radio Access Network; NR; Physical layer procedures for data; (Release 15).

3GPP TS 38.300 V15.5.0 (Mar. 2019); Technical Specification; 3rd Generation Partnership Project; Technical Specification Group Radio Access Network; NR; NR and NG-RAN Overall Description; Stage 2; (Release 15).

3GPP TS 38.321 V15.5.0 (Mar. 2019); Technical Specification; 3rd Generation Partnership Project; Technical Specification Group Radio Access Network; NR; Medium Access Control (MAC) protocol specification; (Release 15).

3GPP TS 38.331 V15.5.1 (Apr. 2019); Technical Specification; 3rd Generation Partnership Project; Technical Specification Group Radio Access Network; NR; Radio Resource Control (RRC) protocol specification; (Release 15).

Source: MCC Support Title: Final Report of 3GPP TSG RAN WG1 #92 v1.0.0 (Athens, Greece, Feb. 26-Mar. 2, 2018).

R1-1720363; 3GPP TSG Ran WG1 meeting 91; Reno, USA, Nov. 27-Dec. 1, 2017; Agenda item: 7.6.3; Source:Samsung; Title: On PHR Requirements and Calculation; Document for Discussion and Decision.

R1-1801317; (R2-1801568); 3GPP TSG RAN WG1 Meeting #92; Athens, Greece, Feb. 26-Mar. 2, 2018; 3GPP TSG-RAN WG2 NR Ad hoc 1801; R2-1801568; Vancouver, Canada, Jan. 22-Jan. 26, 2018.

R1-1803239 7.1.6.2_Summary of NR UL PC-CA aspects_v2; 3GPP TSG RAN WG1 Meeting #92; Athens, Greece, Feb. 26-Mar. 2, 2018; Agenda item:7.1.6.2 and 7.1.6.3; Source:Samsung; Title:Summary of NR UL power control—CA aspects; Document for: Discussion and Decision.

3GPP TS 38.133 V15.5.0 (Mar. 2019) 3rd Generation Partnership Project; Technical Specification Group Radio AccessNetwork; NR; Requirements for Support of Radio Resource Management (Release 15).

* cited by examiner

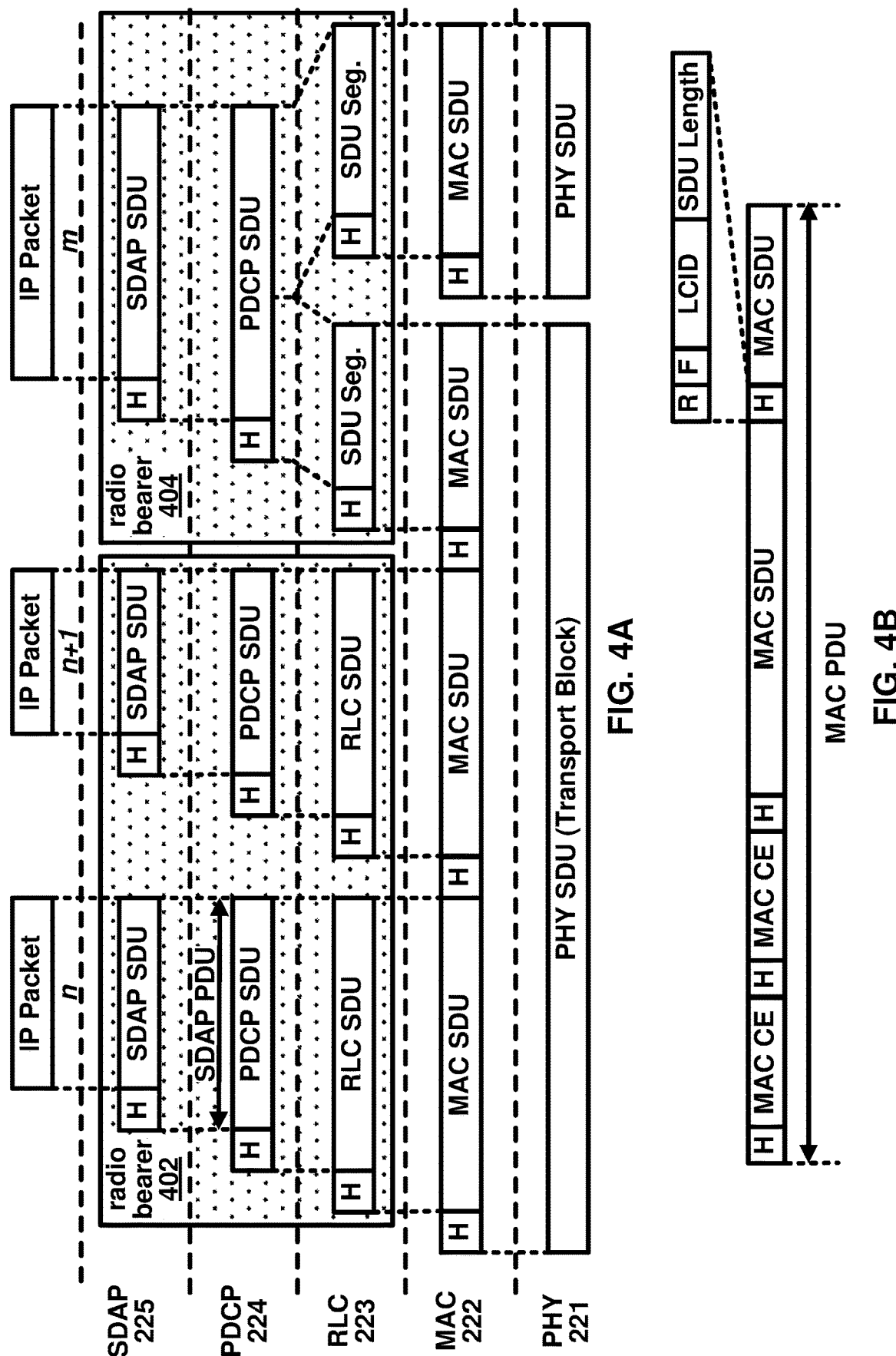

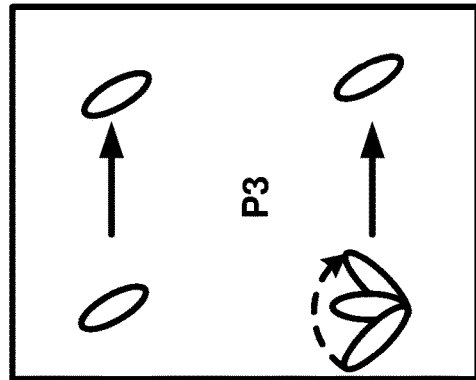
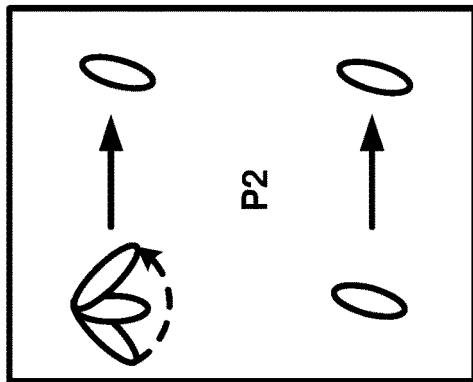
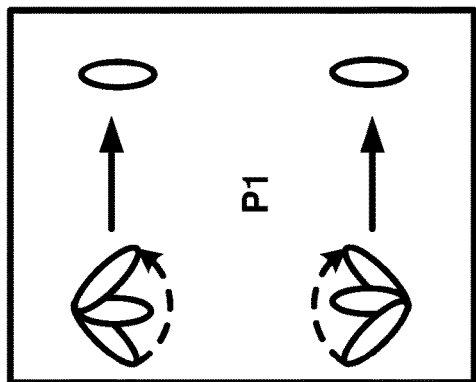
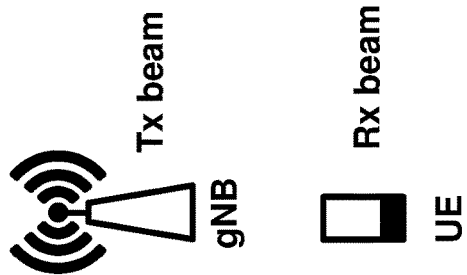
FIG. 12A
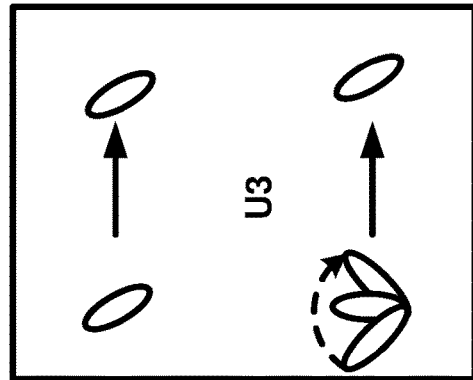
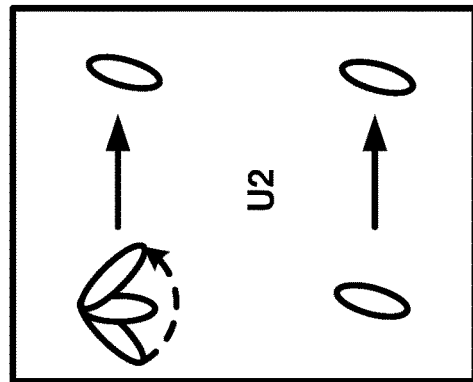
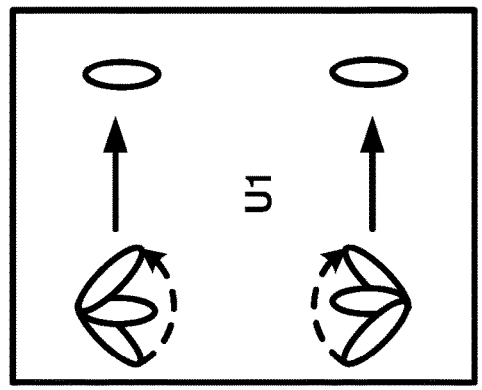
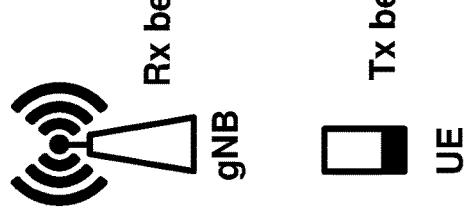
FIG. 12B

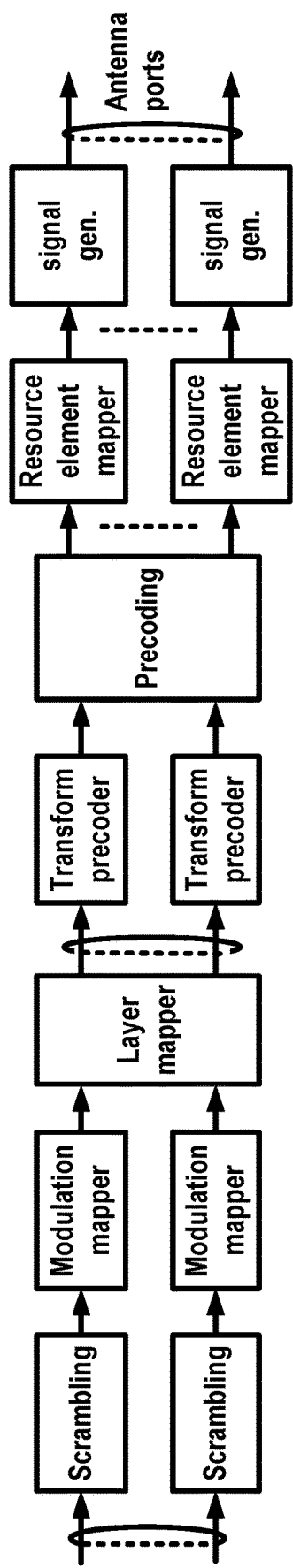
FIG. 16A
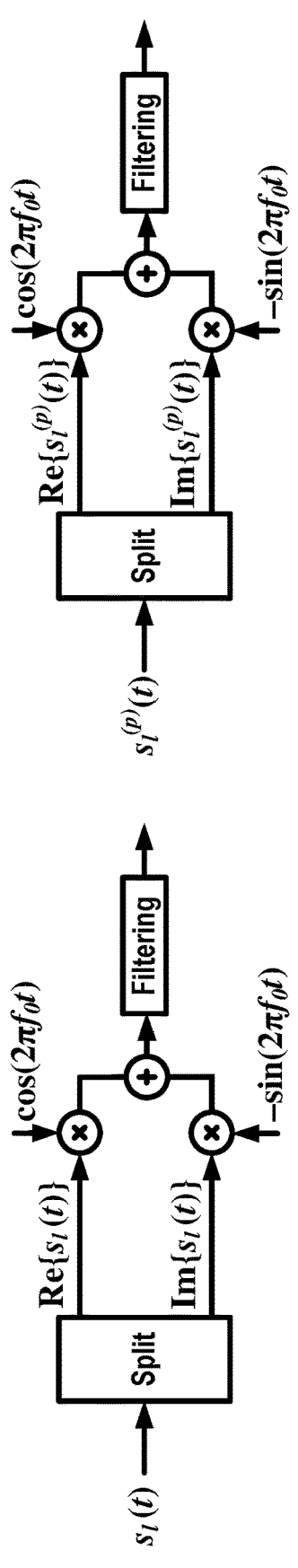
FIG. 16B
FIG. 16D
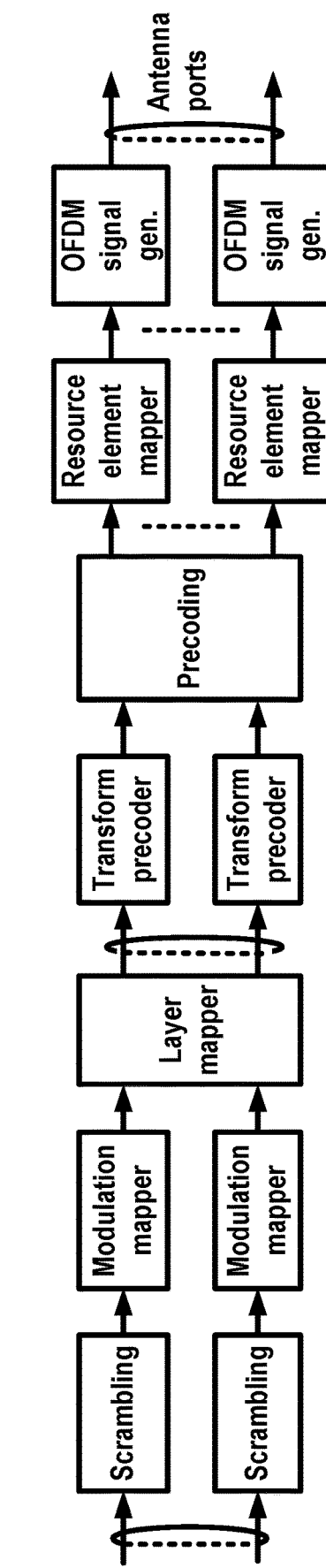
FIG. 16C

| C$_7$ | C$_6$ | C$_5$ | C$_4$ | C$_3$ | C$_2$ | C$_1$ | R |
|---|---|---|---|---|---|---|---|
| C$_{15}$ | C$_{14}$ | C$_{13}$ | C$_{12}$ | C$_{11}$ | C$_{10}$ | C$_9$ | C$_8$ |
| C$_{23}$ | C$_{22}$ | C$_{21}$ | C$_{20}$ | C$_{19}$ | C$_{18}$ | C$_{17}$ | C$_{16}$ |
| C$_{31}$ | C$_{30}$ | C$_{29}$ | C$_{28}$ | C$_{27}$ | C$_{26}$ | C$_{25}$ | C$_{24}$ |
| P | V | PH (Type 2, SpCell of other MAC entity) |||||||
| R | R | $P_{CMAX,f,c}$ 1 |||||||
| P | V | PH (Type 1, PCell) |||||||
| R | R | $P_{CMAX,f,c}$ 2 |||||||
| P | V | PH (Type X, Cell 1) |||||||
| R | R | $P_{CMAX,f,c}$ 3 |||||||

...

| P | V | PH (Type X, Cell n) |
|---|---|---|
| R | R | $P_{CMAX,f,c}$ m |

FIG. 18

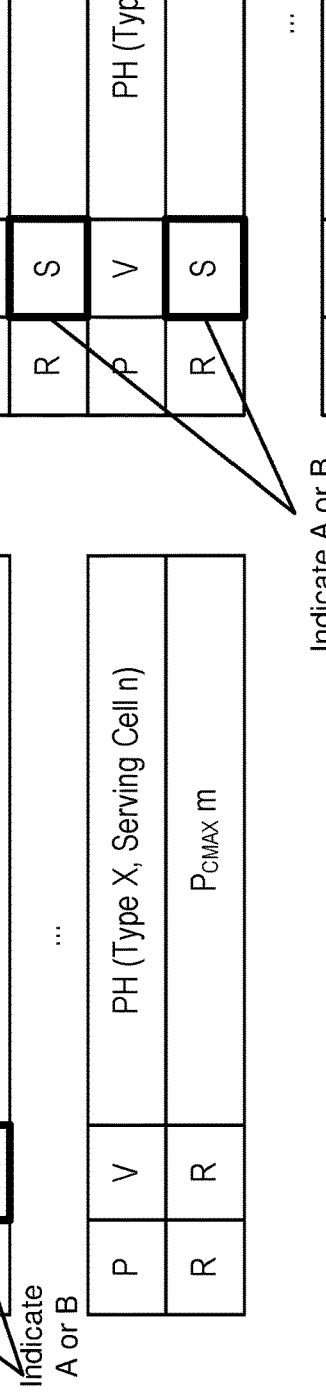

FIG. 25A

| R | C₁ | C₂ | C₃ | C₄ | C₅ | C₆ | C₇ |
|---|---|---|---|---|---|---|---|
| PH (Type 2, SpCell of the other MAC entity) | | | | | | V | P |
| P_CMAX 1 | | | | | | R | R |
| PH (Type 1, PCell) | | | | | | V | P |
| P_CMAX,c 2 | | | | | | R | R |
| PH (Type X, Serving Cell 1) | | | | | | V | P |
| P_CMAX 3 | | | | | | R | R |
| ... | | | | | | | |
| PH (Type X, Serving Cell n) | | | | | | V | P |
| P_CMAX m | | | | | | R | R |
| PH (Type4, Cell X) | | | | | | V | P |
| P_CMAX X | | | | | | R | R |

FIG. 25B

| R | C₁ | C₂ | C₃ | C₄ | C₅ | C₆ | C₇ |
|---|---|---|---|---|---|---|---|
| C₈ | C₉ | C₁₀ | C₁₁ | C₁₂ | C₁₃ | C₁₄ | C₁₅ |
| C₁₆ | C₁₇ | C₁₈ | C₁₉ | C₂₀ | C₂₁ | C₂₂ | C₂₃ |
| C₂₄ | C₂₅ | C₂₆ | C₂₇ | C₂₈ | C₂₉ | C₃₀ | C₃₁ |
| PH (Type 2, SpCell of the other MAC entity) | | | | | | V | P |
| P_CMAX 1 | | | | | | R | R |
| PH (Type 1, PCell) | | | | | | V | P |
| P_CMAX 2 | | | | | | R | R |
| PH (Type X, Serving Cell 1) | | | | | | V | P |
| P_CMAX 3 | | | | | | R | R |
| PH (Type X, Serving Cell n) | | | | | | V | P |
| P_CMAX m | | | | | | R | R |
| PH (Type4, Cell X) | | | | | | V | P |
| P_CMAX,f,c X | | | | | | R | R |

POWER HEADROOM REPORTING

CROSS-REFERENCE TO RELATED APPLICATIONS

This application is a continuation of U.S. patent application Ser. No. 17/965,934, filed Oct. 14, 2022, which is a continuations of U.S. patent application Ser. No. 16/985,798, filed Aug. 5, 2020, which claims the benefit of U.S. Provisional Application No. 62/882,816, filed Aug. 5, 2019, which are hereby incorporated by reference in their entirety.

BRIEF DESCRIPTION OF THE DRAWINGS

Examples of several of the various embodiments of the present disclosure are described herein with reference to the drawings.

FIG. 4A illustrates an example downlink data flow through the NR user plane protocol stack of FIG. 2A.

FIG. 4B illustrates an example format of a MAC subheader in a MAC PDU.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 18 illustrates a MAC CE format for power headroom reporting as per an aspect of an example embodiment of the present disclosure as per an aspect of an example embodiment of the present disclosure.

FIG. 24A illustrates a MAC CE format for power headroom reporting as per an aspect of an example embodiment of the present disclosure.

FIG. 24B illustrates a MAC CE format for power headroom reporting as per an aspect of an example embodiment of the present disclosure.

FIG. 25A illustrates a MAC CE format as per an aspect of an example embodiment of the present disclosure.

FIG. 25B illustrates a MAC CE format as per an aspect of an example embodiment of the present disclosure.

DETAILED DESCRIPTION

Figure 1A:
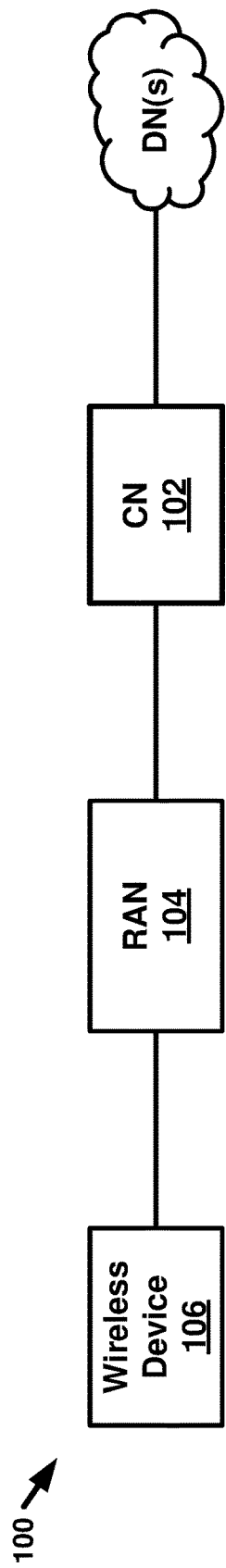
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

Network Architecture

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
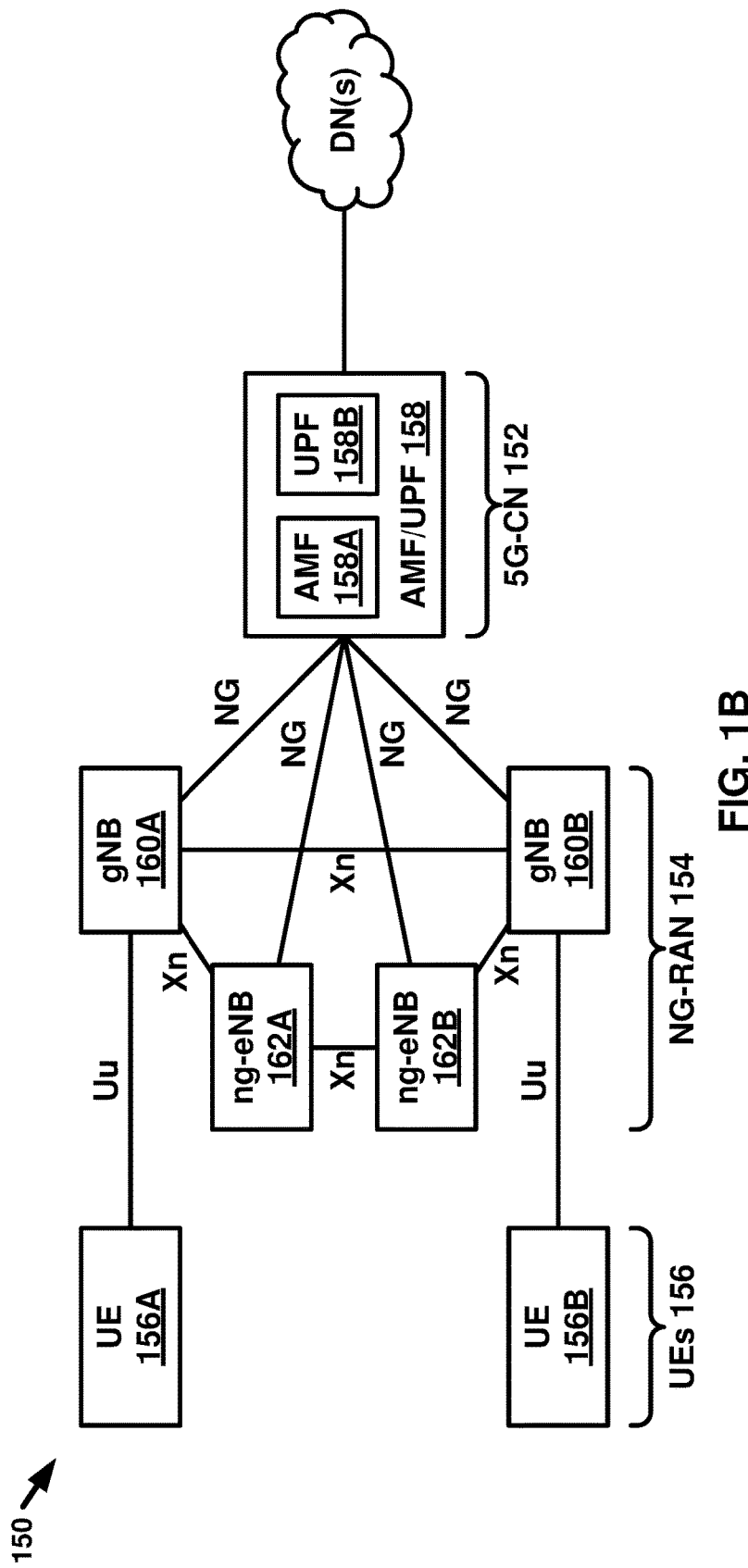

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

Radio Protocol Architecture

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
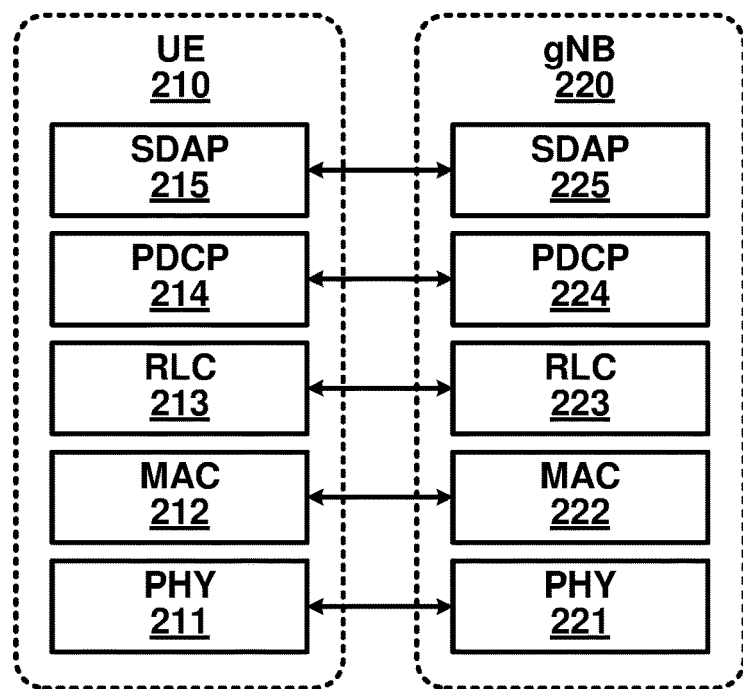
FIG. 2A and FIG. 2B respectively illustrate a New Radio (NR) user plane and control plane protocol stack.
Figure 2B:
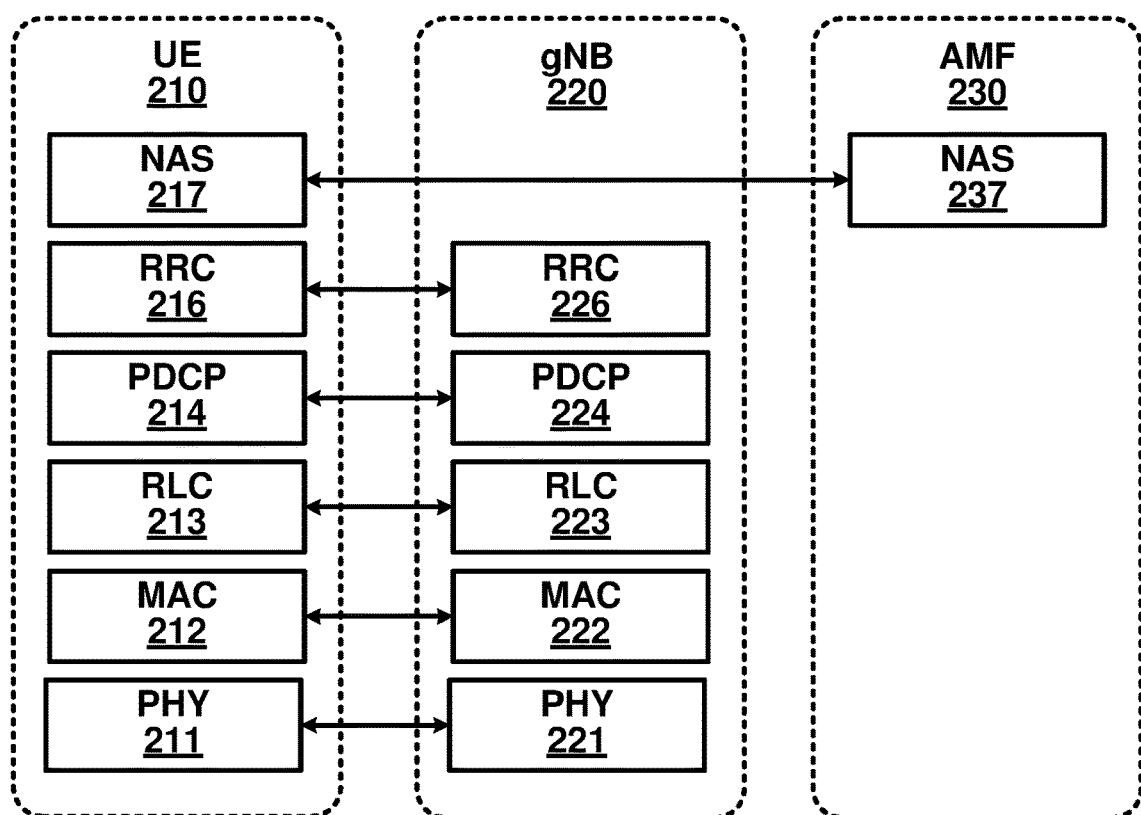

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

User Plane Protocol Stack

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
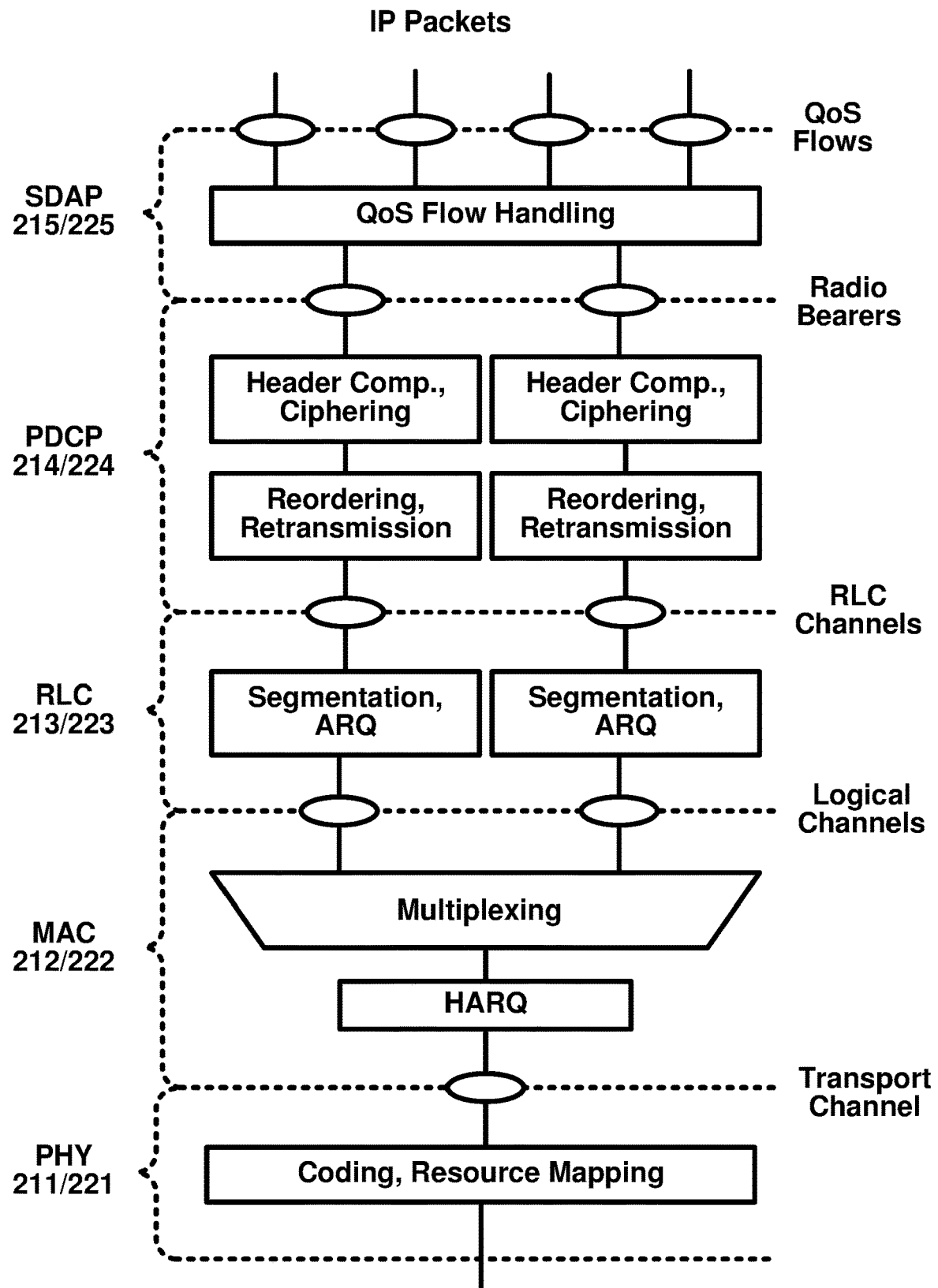
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
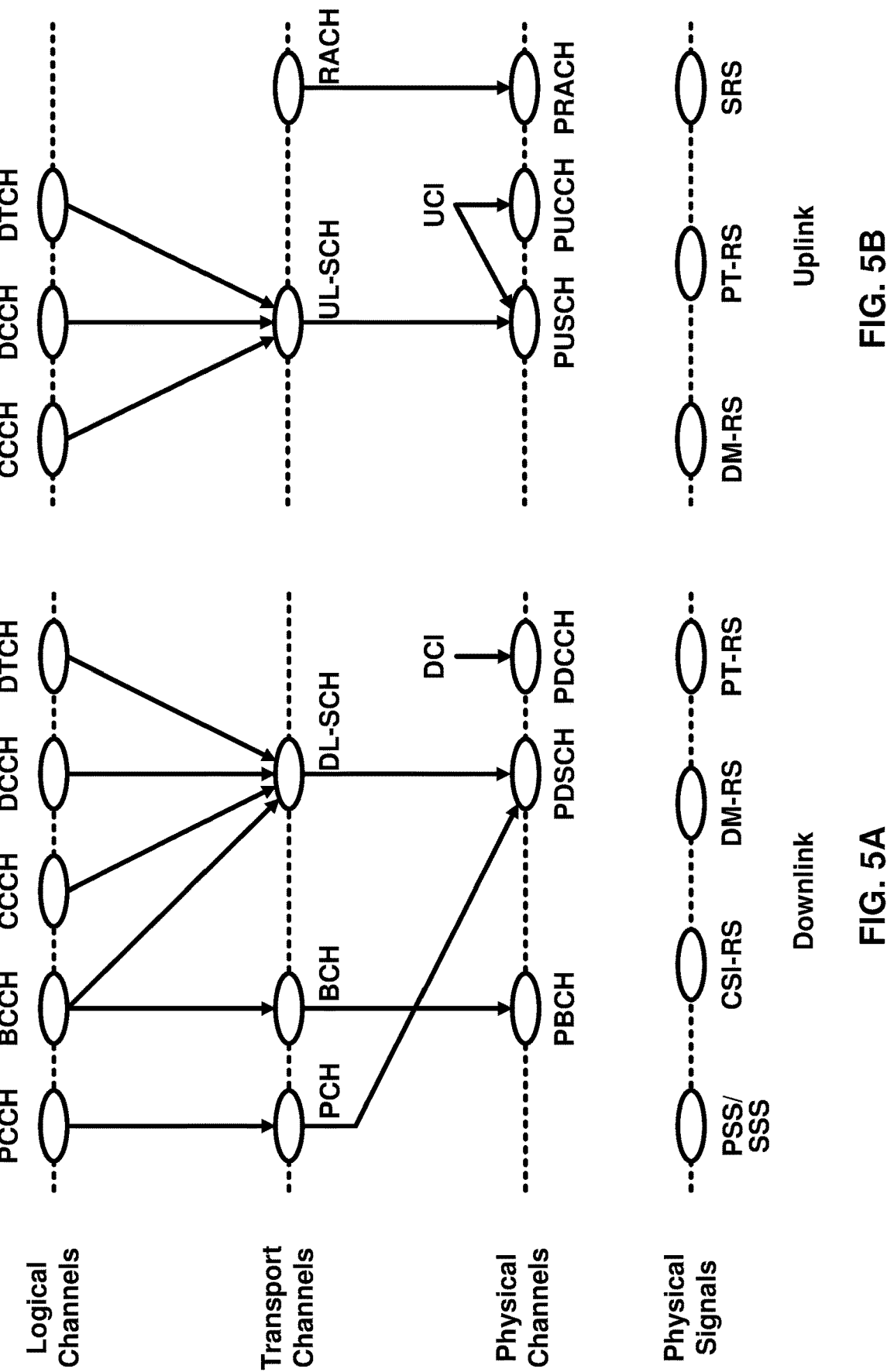
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:
- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

Control Plane Protocol Stack

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
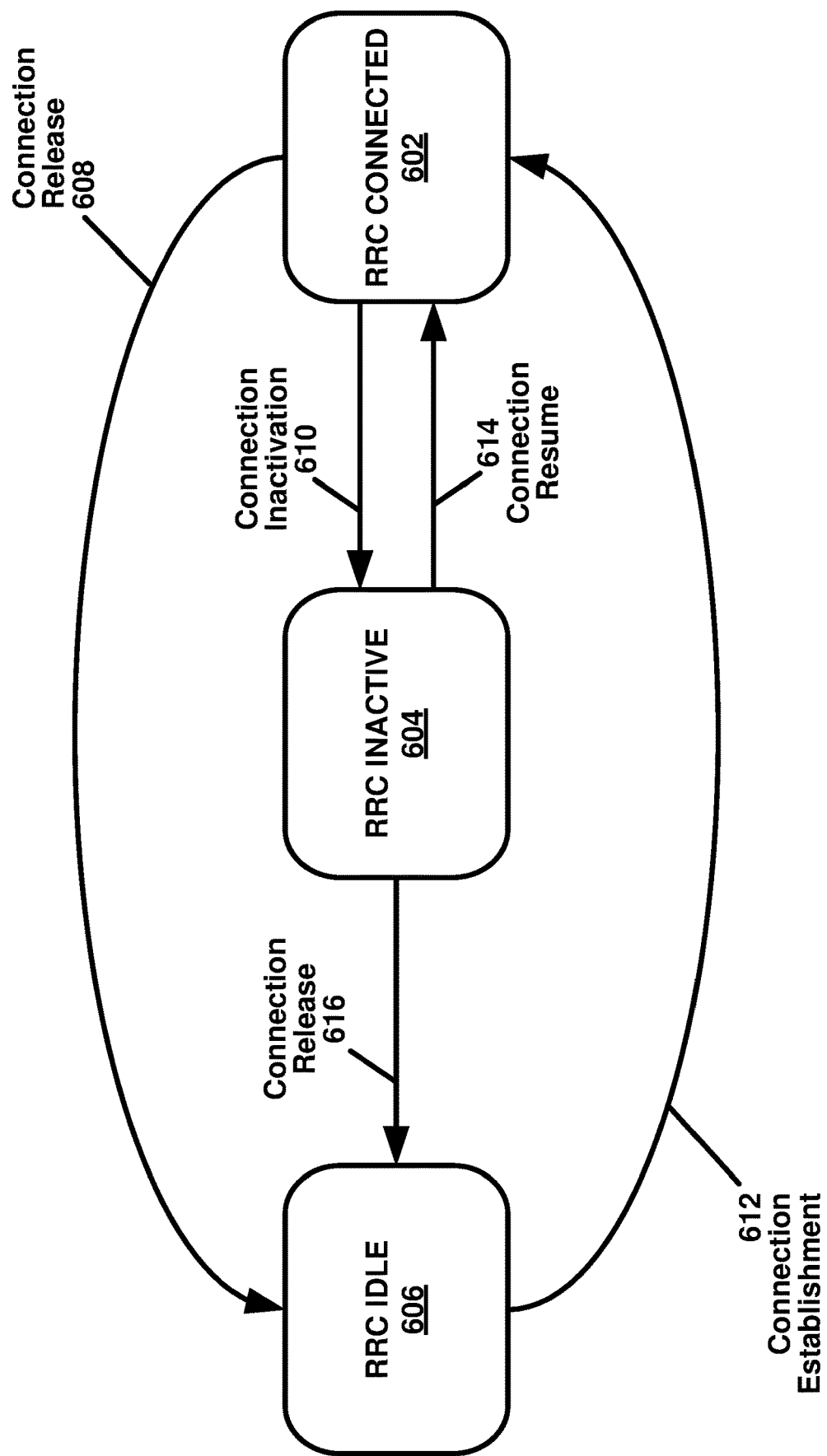
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

Transmission Structure

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
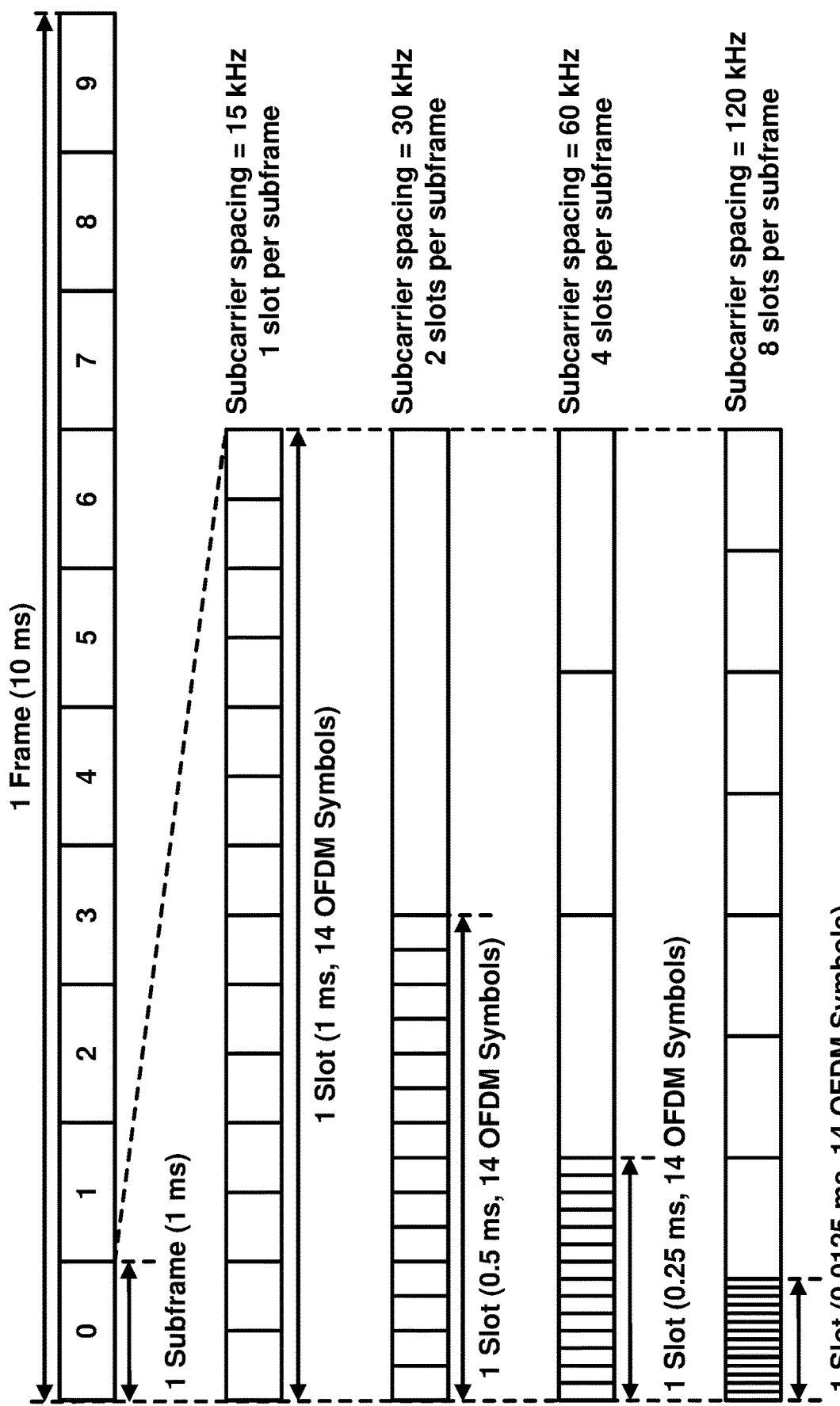
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
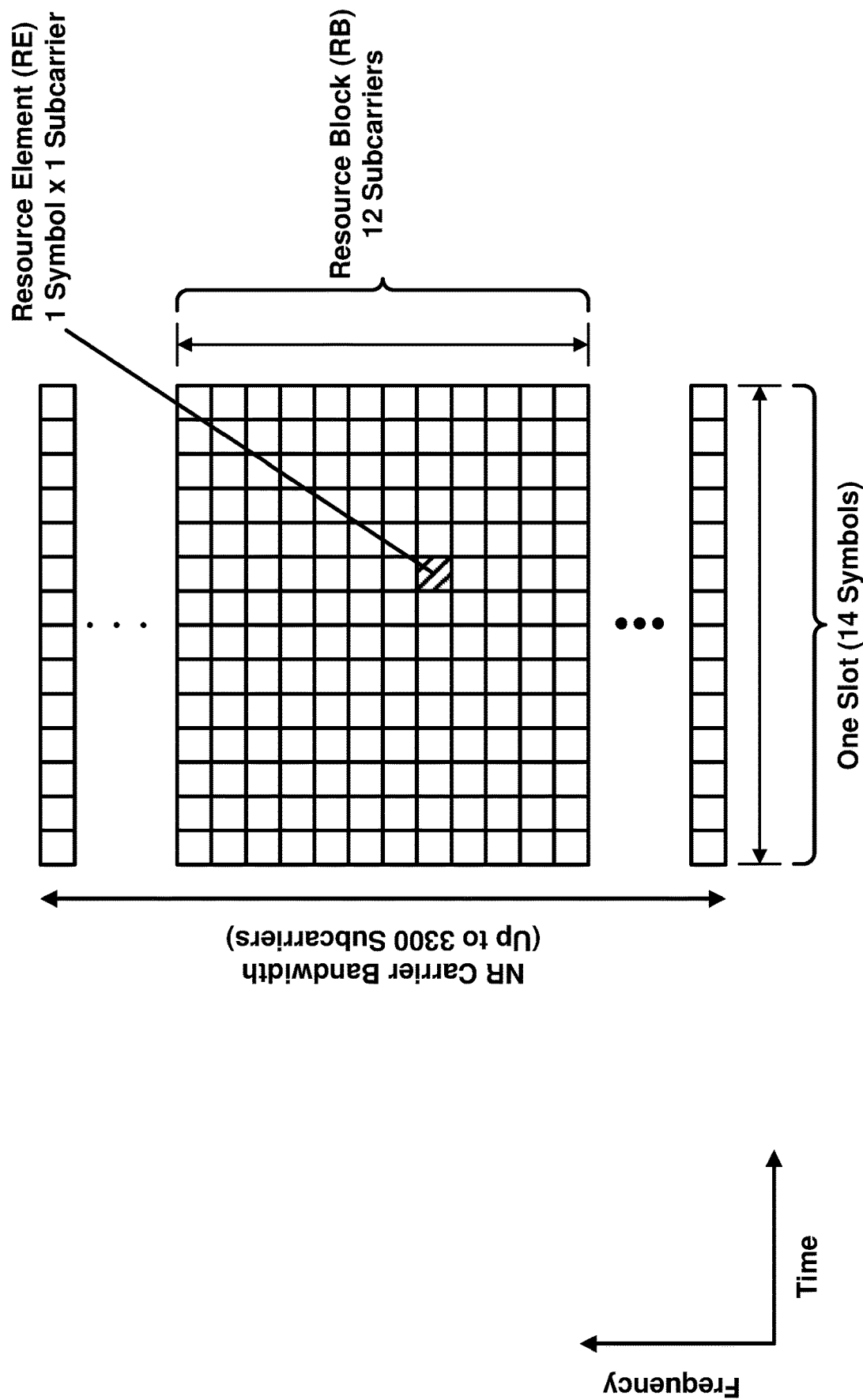
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

Transmission and Reception Techniques
Bandwidth Parts

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
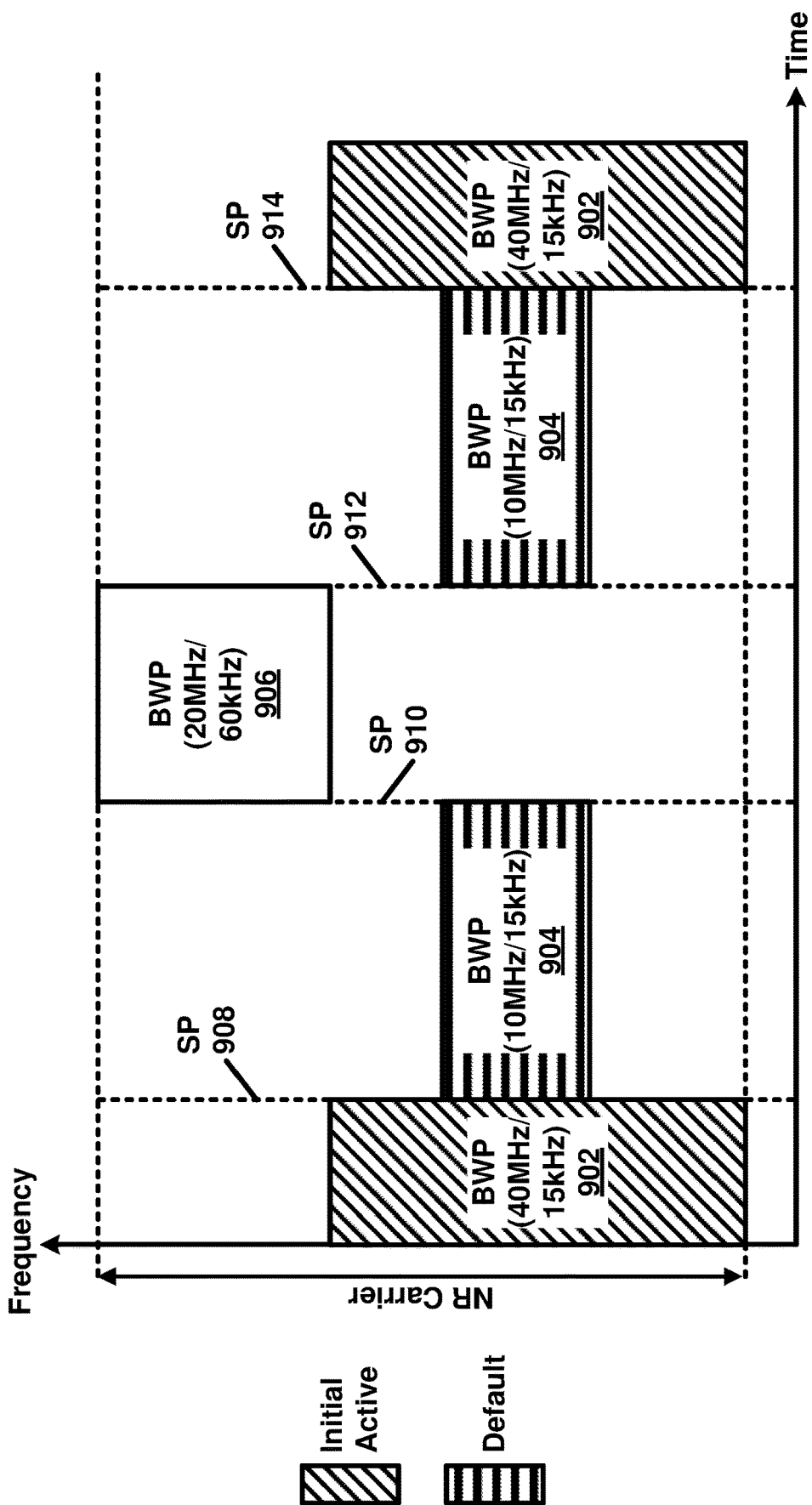
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

Carrier Aggregation

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
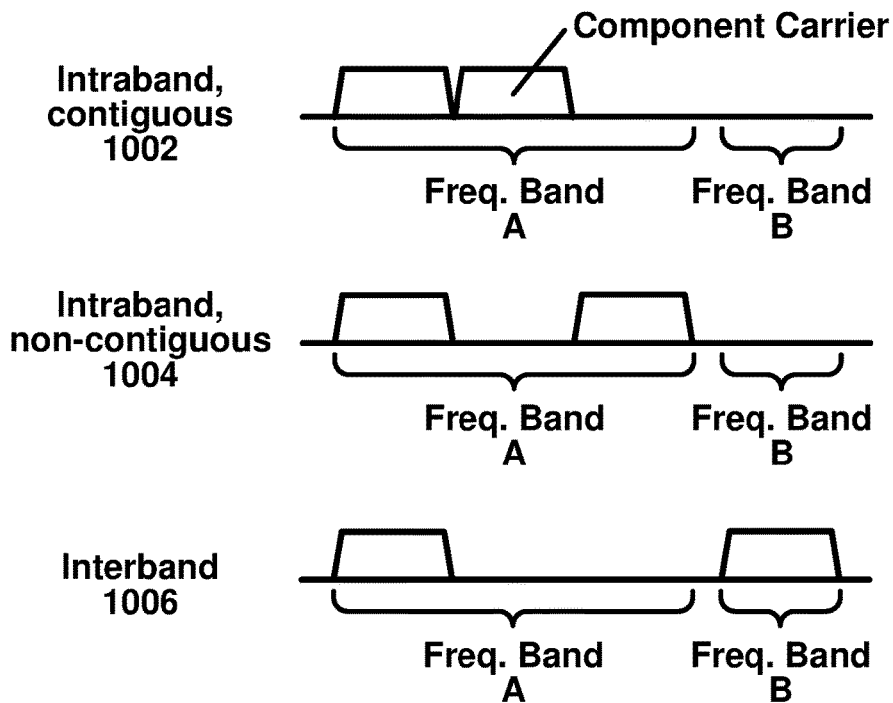
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
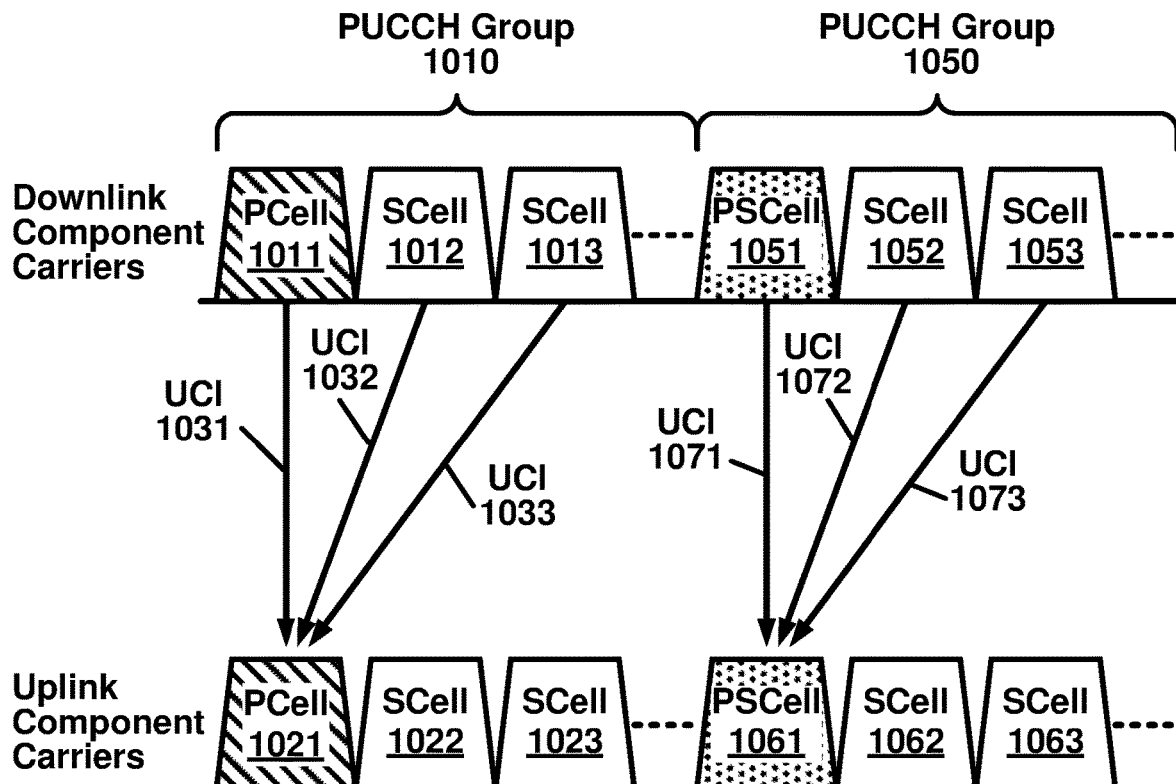
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

Reference Signals

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
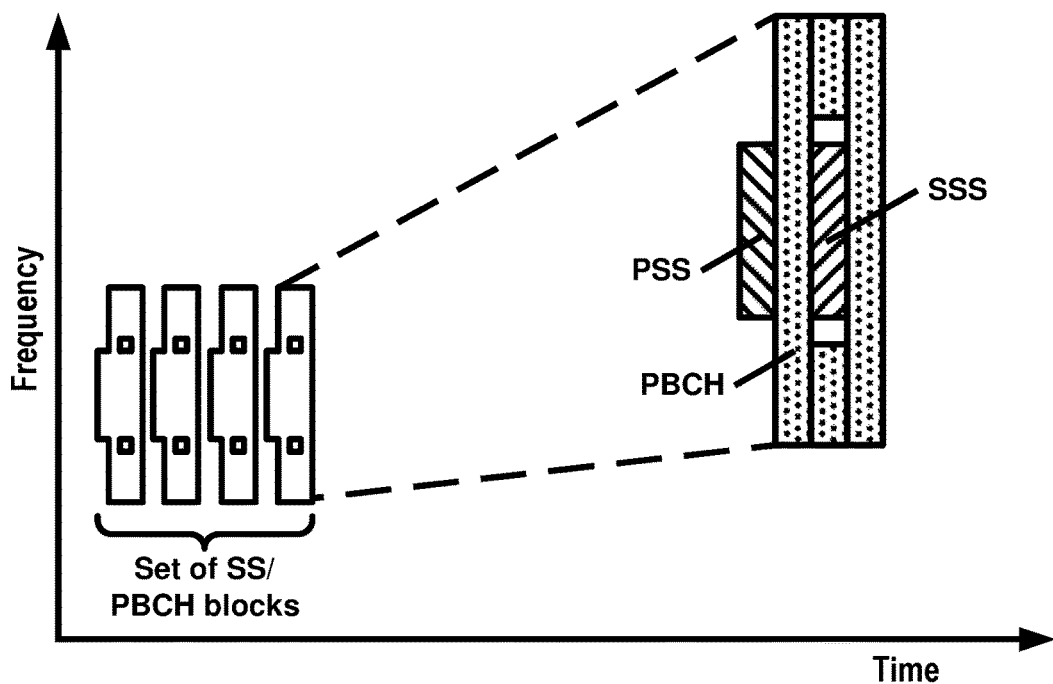
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

Beamforming

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
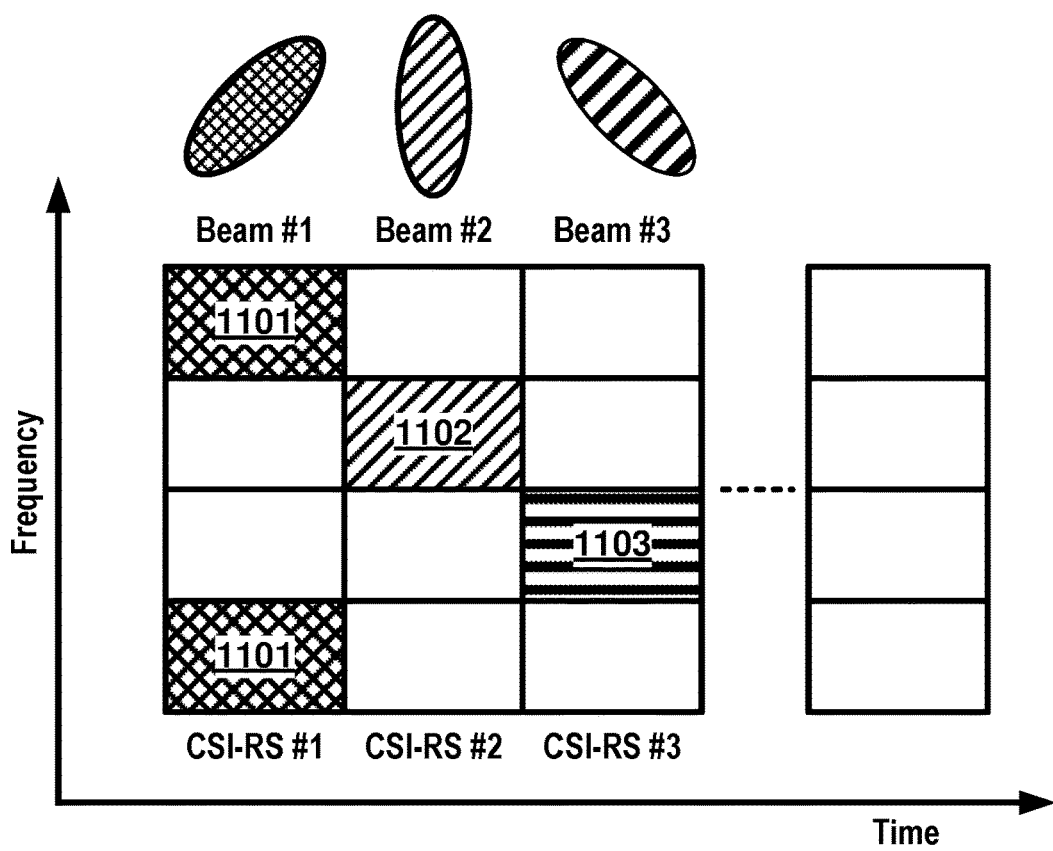
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

Random Access

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
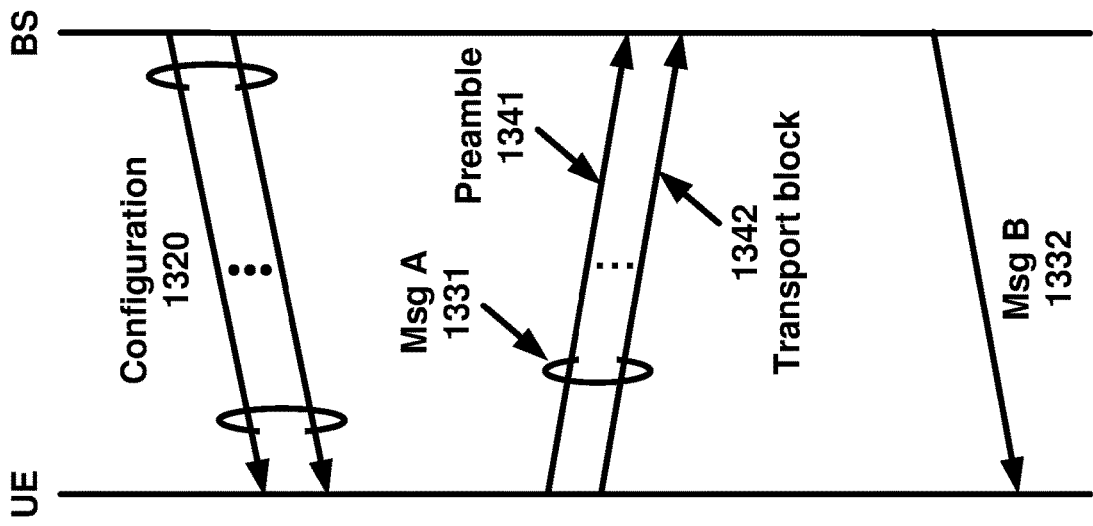
FIG. 13A, FIG. 13B, and FIG. 13C respectively illustrate a four-step contention-based random access procedure, a two-step contention-free random access procedure, and another two-step random access procedure.
Figure 13B:
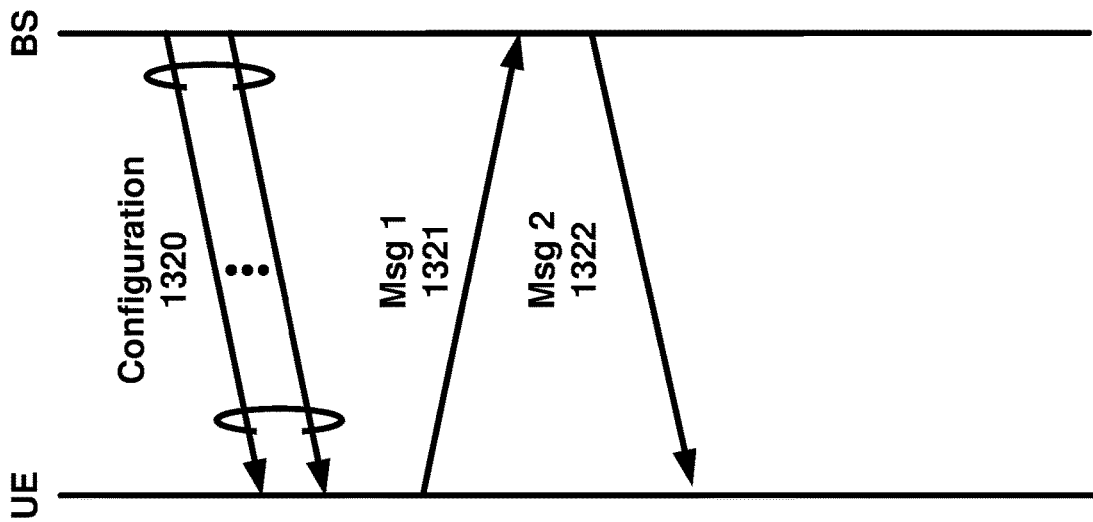
Figure 13A:
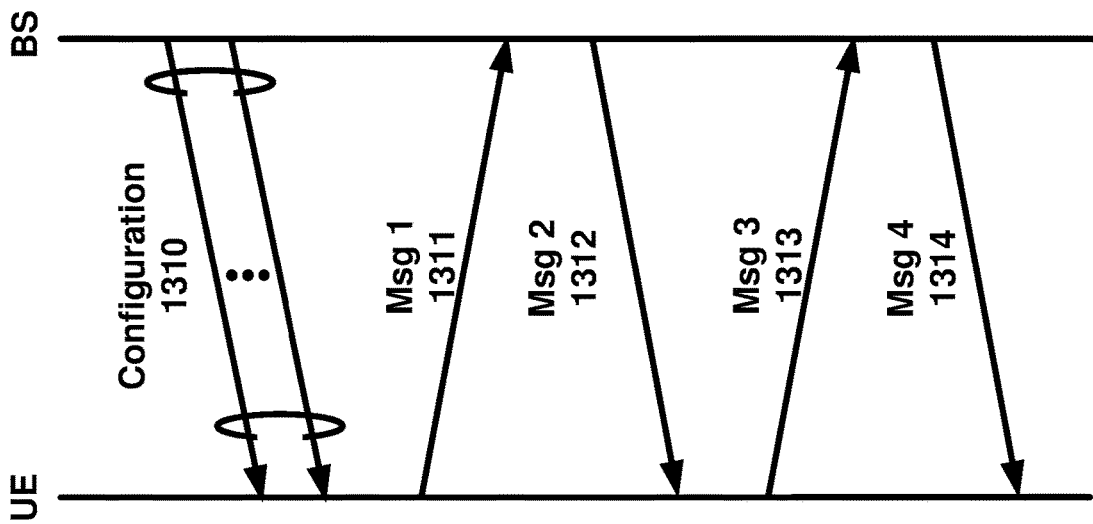

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_I-

NACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI=1+s\_id+14\times t\_id+14\times 80\times f\_id+14\times 80\times 8\times ul\_carrier\_id$$

where s_id may be an index of a first OFDM symbol of the PRACH occasion (e.g., 0≤s_id≤14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-Response Window) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1320 may be transmitted in an uplink transmission by the UE. Msg A 1320 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1350 after or in response to transmitting the Msg A 1320. The Msg B 1350 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1350.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

Physical-Layer Control Signaling

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
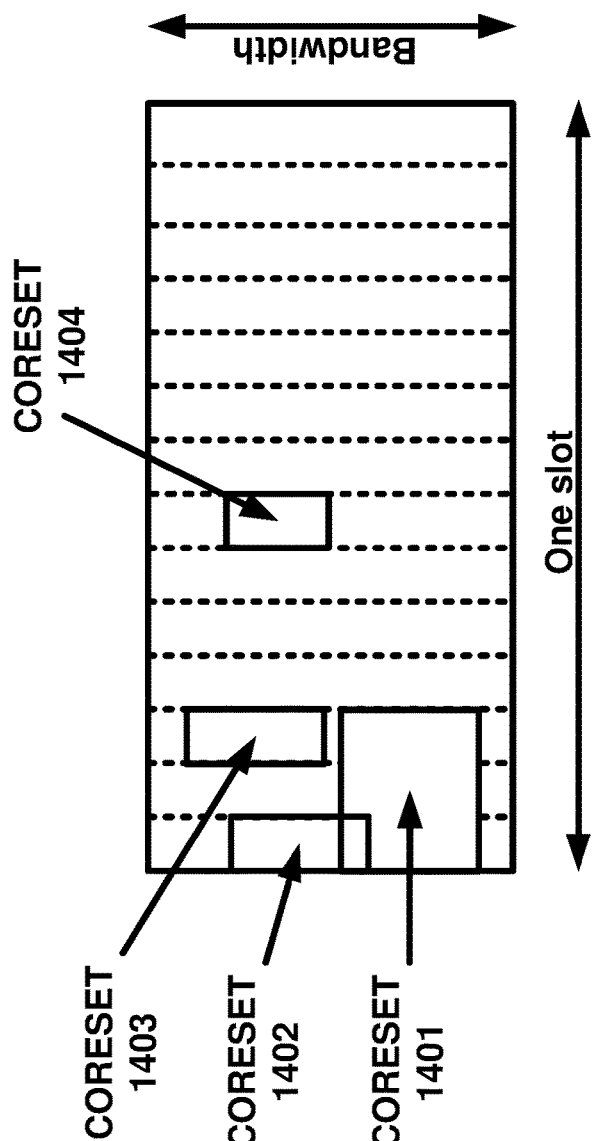
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a size and a location of the CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
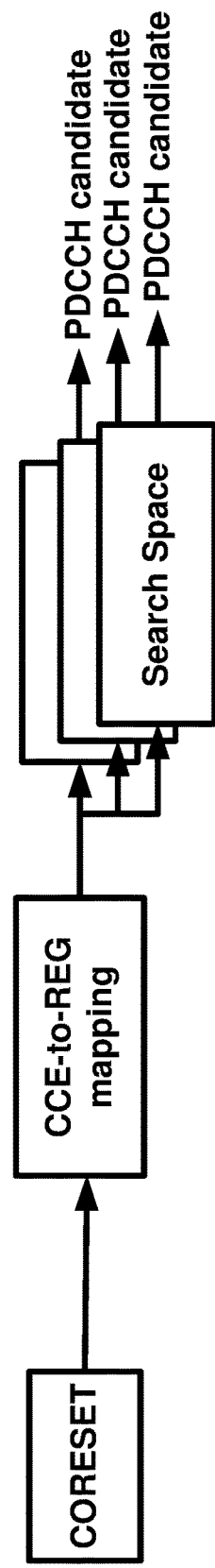
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Base Station and UE Implementation

Figure 15:
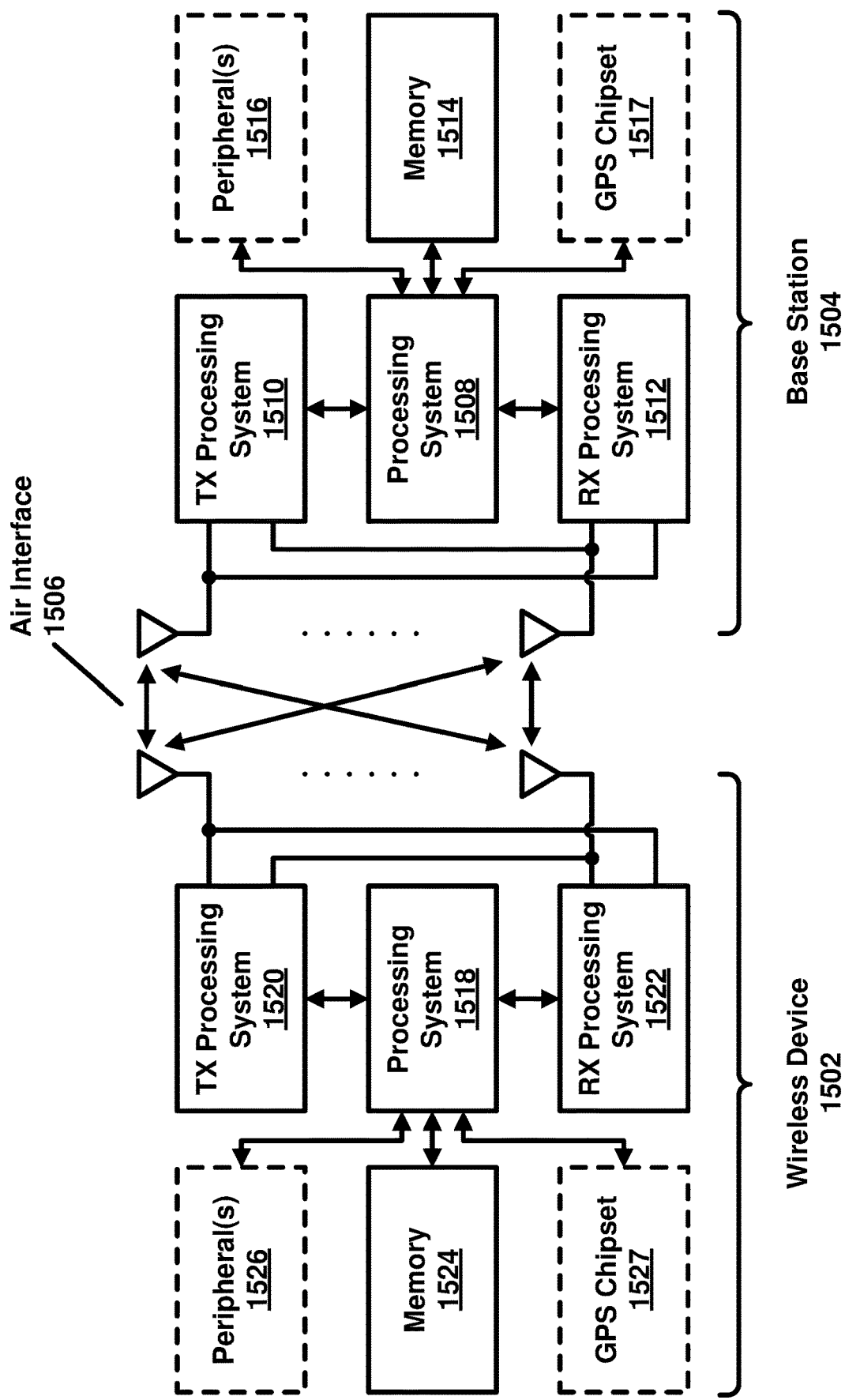
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

In an example, a PUSCH/PUCCH/SRS/PRACH transmission occasion i may be defined by a slot index $n_{s,f}^\mu$ within a frame with system frame number SFN, a first symbol S within the slot, and a number of consecutive symbols L.

For a PUSCH transmission on active UL BWP b of carrier f of serving cell c, a wireless device may calculate a linear value $\hat{P}_{PUSCH,b,f,c}$ (i, j, $q_d$, l) of the transmit power $P_{PUSCH,b,f,c}$ (i, j, $q_d$, l), with parameters described elsewhere in this specification. If the PUSCH transmission is scheduled by a DCI format 0_1 and when txConfig in PUSCH-Config is set to 'codebook', the wireless device may scale the linear value by the ratio of the number of antenna ports with a non-zero PUSCH transmission power to the maximum number of SRS ports supported by the wireless device in one SRS resource. For example, the wireless device split the power equally across the antenna ports on which the wireless device transmits the PUSCH with non-zero power. For example, two PUSCH transmissions are scheduled in different SRS resource sets (e.g., different antenna groups and/or panels), the wireless device may determine a PUSCH power per each SRS resource set (e.g., antenna group and/or panel) and scale a sum of one or more determined PUSCH powers for the different SRS resource sets (e.g., the different antenna groups and/or panels), for example, if the sum exceed (e.g., larger than and/or equal to) $P_{CMAX,f,c}(i)$.

For example, i a wireless device transmits a PUSCH on active UL BWP b of carrier f of serving cell c using parameter set configuration with index j and PUSCH power control adjustment state with index l, the wireless device may determine the PUSCH transmission power $P_{PUSCH,b,f,c}(i, j, q_d, l)$ in PUSCH transmission occasion i as $$P_{PUSCH,b,f,c}(i, j, q_d, l) =$$

$$\min \begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} [dBm].$$

In an example, $P_{CMAX,f,c}(i)$ may be the configured wireless device transmit power for carrier f of serving cell c in PUSCH transmission occasion i. $P_{O\_PUSCH,b,f,c}(j)$ may be a parameter composed of the sum of a component $P_{O\_NOMINAL\_PUSCH,f,c}(j)$ and a component $P_{O\_UE\_PUSCH,b,f,c}(j)$ where $j \in \{0, 1, \ldots, J-1\}$.

For example, if a wireless device is not provided P0-PUSCH-AlphaSet or for a PUSCH transmission scheduled by a RAR UL grant, a wireless device may determine j=0, $P_{O\_UE\_PUSCH,b,f,c}(0)=0$, and $P_{O\_NOMINAL\_PUSCH,f,c}(0)=P_{O\_PRE}+\Delta_{PREAMBLE\_Msg3}$, where a higher layer parameter, e.g., preambleReceivedTargetPower (for $P_{O\_PRE}$) and msg3-DeltaPreamble (for $\Delta_{PREAMBLE\_Msg3}$), may be provided by higher layers, or $\Delta_{PREAMBLE\_Msg3}=0$ dB if msg3-DeltaPreamble is not provided, for carrier f of serving cell c.

In an example, for a PUSCH (re)transmission configured by ConfiguredGrantConfig, j=1, $P_{O\_NOMINAL\_PUSCH,f,c}(1)$ is provided by p0-NominalWithoutGrant, or $P_{O\_NOMINAL\_PUSCH,f,c}(1)=P_{O\_NOMINAL\_PUSCH,f,c}(0)$ if p0-NominalWithoutGrant is not provided, and $P_{O\_UE\_PUSCH,b,f,c}(1)$ is provided by p0 obtained from p0-PUSCH-Alpha in ConfiguredGrantConfig that provides an index P0-PUSCH-AlphaSetId to a set of P0-PUSCH-AlphaSet for active UL BWP b of carrier f of serving cell c In an example, for $j \in \{2, \ldots, J-1\}=S_J$, a $P_{O\_NOMINAL\_PUSCH,f,c}(j)$ value, applicable for all $j \in S_J$, may be provided by p0-NominalWithGrant, or $P_{O\_NOMINAL\_PUSCH,f,c}(j)=P_{O\_NOMINAL\_PUSCH,f,c}(0)$ if p0-NominalWithGrant is not provided, for each carrier f of serving cell c and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell c In an example, if the wireless device is provided by SRI-PUSCH-PowerControl more than one values of p0-PUSCH-AlphaSetId and if DCI format 0_1 includes a SRI field, the wireless device may obtain a mapping from sri-PUSCH-PowerControlId in SRI-PUSCH-PowerControl between a set of values for the SRI field in DCI format 0_1 and a set of indexes provided by p0-PUSCH-AlphaSetId that map to a set of P0-PUSCH-AlphaSet values. If the PUSCH transmission is scheduled by a DCI format 0_1 that includes a SRI field, the wireless device determine the value of $P_{O\_UE\_PUSCH,b,f,c}(j)$ from the p0-PUSCH-AlphaSetId value that is mapped to the SRI field value.

If the PUSCH transmission is scheduled by a DCI format 0_0 or by a DCI format 0_1 that does not include a SRI field, or if SRI-PUSCHPowerControl is not provided to the UE, j=2, and the wireless device determines $P_{O\_UE\_PUSCH,b,f,c}(j)$ from the value of the first p0-Pusch-AlphaSet in p0-AlphaSets.

For $a_{b,f,c}(j)$ with j=0, $a_{b,f,c}(0)$ may be a value of msg3-Alpha, when provided; otherwise, a wireless device may determine $a_{b,f,c}(0)=1$. For $a_{b,f,c}(j)$ with j=1, $a_{b,f,c}(1)$ may be provided by alpha obtained from p0-PUSCH-Alpha in ConfiguredGrantConfig providing an index P0-PUSCH-AlphaSetId to a set of P0-PUSCH-AlphaSet for active UL BWP b of carrier f of serving cell c. For $a_{b,f,c}(j)$ with $j \in S_J$, a set of $a_{b,f,c}(j)$ values may be provided by a set of alpha in P0-PUSCH-AlphaSet indicated by a respective set of p0-PUSCH-AlphaSetId for active UL BWP b of carrier f of serving cell c.

For example, if the wireless device is provided SRI-PUSCH-PowerControl and more than one values of p0-PUSCH-AlphaSetId, and if DCI format 0_1 includes a SRI field, the wireless device may obtain a mapping from sri-PUSCH-PowerControlId in SRI-PUSCH-PowerControl between a set of values for the SRI field in DCI format 0_1 and a set of indexes provided by p0-PUSCH-AlphaSetId that map to a set of P0-PUSCH-AlphaSet values. If the PUSCH transmission is scheduled by a DCI format 0_1 that includes a SRI field, the wireless device may determine the values of $a_{b,f,c}(j)$ from the p0-PUSCH-AlphaSetId value that is mapped to the SRI field value For example, if the PUSCH transmission is scheduled by a DCI format 0_0 or by a DCI format 0_1 that does not include a SRI field, or if SRI-PUSCH-PowerControl is not provided to the UE, j=2, and the wireless device may determine $\alpha_{b,f,c}(j)$ from the value of the first p0-PUSCH-AlphaSet in p0-AlphaSets For example, $M_{RB,b,f,c}^{PUSCH}(i)$ may be the bandwidth of the PUSCH resource assignment expressed in number of resource blocks for PUSCH transmission occasion i on active UL BWP b of carrier f of serving cell c and µ is a SCS configuration.

For example, $PL_{b,f,c}(q_d)$ may be a downlink pathloss estimate in dB calculated by the wireless device using reference signal (RS) index $A_d$ for the active DL BWP of serving cell c.

For example, i the wireless device is not provided PUSCH-PathlossReferenceRS or before the wireless device is provided dedicated higher layer parameters, the wireless device may calculate $PL_{b,f,c}(q_d)$ using a RS resource from the SS/PBCH block that the wireless device may use to obtain MIB For example, if the wireless device is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes may comprise one or both of a set of SS/PBCH block indexes, each provided by ssb-Index when a value of a corresponding pusch-PathlossReferenceRS-Id maps to a SS/PBCH block index, and a set of CSI-RS resource indexes, each provided by csi-RS-Index when a value of a corresponding pusch-PathlossReferenceRS-Id maps to a CSI-RS resource index. The wireless device may identify an RS resource index $q_d$ in the set of RS resource indexes to correspond either to a SS/PBCH block index or to a CSI-RS resource index as provided by pusch-PathlossReferenceRS-Id in PUSCH-PathlossReferenceRS For example, if the PUSCH transmission is scheduled by a RAR UL grant, the wireless device may use the same RS resource index $q_d$ as for a corresponding PRACH transmission For example, if the wireless device is provided SRI-PUSCH-PowerControl and more than one values of PUSCH-PathlossReferenceRS-Id, the wireless device may obtain a mapping from sri-PUSCH-PowerControlId in SRI-PUSCH-PowerControl between a set of values for the SRI field in DCI format 0_1 and a set of PUSCH-PathlossReferenceRS-Id values. If the PUSCH transmission is scheduled by a DCI format 0_1 that includes a SRI field, the wireless device may determine the RS resource index $q_d$ from the value of PUSCH-PathlossReferenceRS-Id that is mapped to the SRI field value where the RS resource is either on serving cell c or, if provided, on a serving cell indicated by a value of pathlossReferenceLinking For example, If the PUSCH transmission is scheduled by a DCI format 0_0, and if the wireless device is provided a spatial setting by PUCCH-Spatialrelationinfo for a PUCCH resource with a lowest index for active UL BWP b of each carrier f and serving cell, the wireless device uses the same RS resource index $q_d$ as for a PUCCH transmission in the PUCCH resource with the lowest index For example, if the PUSCH transmission is scheduled by a DCI format 0_0 and if the wireless device is not provided a spatial setting for a PUCCH transmission, or by a DCI format 0_1 that does not include a SRI field, or if SRI-PUSCH-PowerControl is not provided to the wireless device, the wireless device determines a RS resource index $q_d$ with a respective PUSCH-PathlossReferenceRS-Id value being equal to zero where the RS resource is either on serving cell c or, if provided, on a serving cell indicated by a value of pathloss ReferenceLinking For a PUSCH transmission configured by ConfiguredGrantConfig, if rrc-ConfiguredUplinkGrant is included in ConfiguredGrantConfig, a RS resource index $q_d$ may be provided by a value of pathlossReferenceIndex included in rrc-ConfiguredUplinkGrant where the RS resource may be either on serving cell c or, if provided, on a serving cell indicated by a value of pathloss ReferenceLinking For a PUSCH transmission configured by ConfiguredGrantConfig that does not include rrc-ConfiguredUplinkGrant, the wireless device may determine an RS resource index $q_d$ from a value of PUSCH-PathlossReferenceRS-Id that is mapped to a SRI field value in a DCI format activating the PUSCH transmission. For example, if the DCI format activating the PUSCH transmission does not include a SRI field, the wireless device may determine an RS resource index $q_d$ with a respective PUSCH-PathlossReferenceRS-Id value being equal to zero where the RS resource is either on serving cell c or, if provided, on a serving cell indicated by a value of pathlossReferenceLinking The wireless device may determine $PL_{f,c}(q_d)$=referenceSignalPower—higher layer filtered RSRP, where referenceSignalPower may be provided by higher layers and a calculation of RSRP may be predefined for the reference serving cell and the higher layer filter configuration provided by QuantityConfig is for the reference serving cell For example, if the wireless device is not configured periodic CSI-RS reception, referenceSignalPower is provided by ss-PBCH-BlockPower. For example, if the wireless device is configured periodic CSI-RS reception, referenceSignalPower is provided either by ss-PBCH-BlockPower or by powerControlOffsetSS providing an offset of the CSI-RS transmission power relative to the SS/PBCH block transmission power. For example, if powerControlOffsetSS is not provided to the wireless device, the wireless device may determine an offset of 0 dB.

The wireless device may determine $\Delta_{TF,b,f,c}(i) = 10 \log_{10}((2^{BPRE \cdot K_s} - 1))$. B PUSCH for $K_s$=1.25 and $\Delta_{TF,b,f,c}(i)$=0 for $K_s$=0 where $K_s$ may be provided by deltaMCS for each UL BWP b of each carrier f and serving cell c. If the PUSCH transmission is over more than one layer, $\Delta_{TF,b,f,c}(i)$=0. BPRE and $\beta_{offset}^{PUSCH}$, for active UL BWP b of each carrier f and each serving cell c, may be computed as below the wireless device may determine $$BPRE = \sum_{r=0}^{C-1}$$

$K_r/N_{RE}$ for PUSCH with UL-SCH data and BPRE=$Q_m \cdot R/\beta_{offset}^{PUSCH}$ for CSI transmission in a PUSCH without UL-SCH data, where C may be a number of transmitted code blocks, $K_r$ is a size for code block r, and $N_{RE}$ may be a number of resource elements determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i, j),$$

where $N_{symb,b,f,c}^{PUSCH}(i)$ may be a number of symbols for PUSCH transmission occasion i on active UL BWP b of carrier f of serving cell c, $N_{sc,data}^{RB}(i,j)$ may be a number of subcarriers excluding DM-RS subcarriers and phase-tracking RS samples in PUSCH symbol j, $0 \leq j < N_{symb,b,f,c}^{PUSCH}(i)$, and C, $K_r$ may be predefined and/or indicated by a DCI and/or RRC.

The wireless device may determine $\beta_{offset}^{PUSCH}$=1, for example, when the PUSCH includes UL-SCH data and $\beta_{symb,b,f,c}^{PUSCH} = \beta_{offset}^{CSI,1}$ for example, when the PUSCH includes CSI and does not include UL-SCH data.

$Q_m$ may be the modulation order and R is the target code rate, provided by the DCI format scheduling the PUSCH transmission that includes CSI and does not include UL-SCH data.

For the PUSCH power control adjustment state $f_{b,f,c}(i, l)$ for active UL BWP b of carrier f of serving cell c in PUSCH transmission occasion i $\delta_{PUSCH,b,f,c}(i, l)$ may be a transmit power control (TPC) command value included in a DCI format 0_0 or DCI format 0_1 that schedules the PUSCH transmission occasion i on active UL BWP b of carrier f of serving cell c or jointly coded with other TPC commands in a DCI format 2_2 with CRC scrambled by a particular RNTI (e.g., TPC-PUSCH-RNTI). The wireless device may determine l ∈ {0, 1} if the wireless device is configured with two PUSCH-PC-AdjustmentStates and/=0 if the wireless device is not configured with two PUSCH-PC-AdjustmentStates or if the PUSCH transmission is scheduled by a RAR UL grant.

For a PUSCH (re)transmission configured by ConfiguredGrantConfig, the value of l ∈ {0, 1} may be provided to the wireless device by powerControlLoopToUse. For example, if the wireless device is provided SRI-PUSCH-PowerControl, the wireless device may obtain a mapping between a set of values for the SRI field in DCI format 0_1 and the l value(s) provided by sri-PUSCH-ClosedLoopIndex. For example, if the PUSCH transmission is scheduled by a DCI format 0_1 and if DCI format 0_1 includes a SRI field, the wireless device may determine the l value that is mapped to the SRI field value For example, if the PUSCH transmission is scheduled by a DCI format 0_0 or by a DCI format 0_1 that does not include a SRI field, or if a SRI-PUSCH-PowerControl is not provided to the UE, l=0 For example, if the wireless device obtains one TPC command from a DCI format 2_2 with CRC scrambled by a TPC-PUSCH-RNTI, the l value may be provided by the closed loop indicator field in DCI format 2_2.

The wireless device may determine that $$f_{b,f,c}(i, l) = f_{b,f,c}(i - i_0, l) + \sum_{m=0}^{C(D_i)-1} \delta_{PUSCH,b,f,c}(m, l)$$

is the PUSCH power control adjustment state l for active UL BWP b of carrier f of serving cell c and PUSCH transmission occasion i if the wireless device is not provided tpc-Accumulation, where the $\delta_{PUSCH,b,f,c}$ values are given in a predefined table.

For example $$\sum_{m=0}^{C(D_i)-1} \delta_{PUSCH,b,f,c}(m, l)$$

may be a sum of TPC command values in a set $D_i$ of TPC command values with cardinality $C(D_i)$ that the wireless device receives between $K_{PUSCH}(i-i_0)-1$ symbols before PUSCH transmission occasion $i-i_0$ and $K_{PUSCH}$ (i) symbols before PUSCH transmission occasion i on active UL BWP b of carrier f of serving cell c for PUSCH power control adjustment state l, where $i_0>0$ may be the smallest integer for which $K_{PUSCH}(i-i_0)$ symbols before PUSCH transmission occasion $i-i_0$ is earlier than $K_{PUSCH}$ (i) symbols before PUSCH transmission occasion i.

For example, if a PUSCH transmission is scheduled by a DCI format 0_0 or DCI format 0_1, $K_{PUSCH}(i)$ may be a number of symbols for active UL BWP b of carrier f of serving cell c after a last symbol of a corresponding PDCCH reception and before a first symbol of the PUSCH transmission.

For example, if a PUSCH transmission is configured by ConfiguredGrantConfig, $K_{PUSCH}$ (i) may be a number of $K_{PUSCH}$.min symbols equal to the product of a number of symbols per slot, $N_{symb}^{slot}$, and the minimum of the values provided by k2 in PUSCH-ConfigCommon for active UL BWP b of carrier f of serving cell c.

For example, if the wireless device has reached maximum power for active UL BWPb of carrier f of serving cell c at PUSCH transmission occasion $i-i_0$ and $$\sum_{m=0}^{C(D_i)-1} \delta_{PUSCH,b,f,c}(m, l) \geq 0,$$

then the wireless device may determine $f_{b,f,c}(i, l)=f_{b,f,c}(i-i_0, l)$.

For example, if the wireless device has reached minimum power for active UL BWPb of carrier f of serving cell c at PUSCH transmission occasion $i-i_0$ and $$\sum_{m=0}^{C(D_i)-1} \delta_{PUSCH,b,f,c}(m, l) \leq 0,$$

then the wireless device may determine $f_{b,f,c}(i, l)=f_{b,f,c}(i-i_0, l)$.

For example, a wireless device may reset accumulation of a PUSCH power control adjustment state I for active UL BWP b of carrier f of serving cell c to $f_{b,f,c}(0, l)=0$, for example, if a configuration for a corresponding $P_{O\_UE\_PUSCH,b,f,c}(j)$ value is provided by higher layers. For example, a wireless device may reset accumulation of a PUSCH power control adjustment state l for active UL BWP b of carrier f of serving cell c to $f_{b,f,c}(0, l)=0$, for example, if a configuration for a corresponding $a_{b,f,c}(j)$ value is provided by higher layers For example, if j>1 and the PUSCH transmission is scheduled by a DCI format 0_1 that includes a SRI field, and the wireless device is provided higher SRI-PUSCH-Power-Control, the wireless device may determine the value of l from the value of j based on an indication by the SRI field for a sri-PUSCH-PowerControlId value associated with the sri-P0-PUSCH-AlphaSetId value corresponding to j and with the sri-PUSCH-ClosedLoopIndex value corresponding to l.

For example, if j>1 and the PUSCH transmission is scheduled by a DCI format 0_0 or by a DCI format 0_1 that does not include a SRI field or the wireless device is not provided SRI-PUSCH-PowerControl, the wireless device may determine l=0.

For example, if j=1, l is provided by the value of powerControlLoopToUse, the wireless device may determine that $f_{b,f,c}(i, l)=\delta_{PUSCH,b,f,c}(i, l)$ is the PUSCH power control adjustment state for active UL BWP b of carrier f of serving cell c and PUSCH transmission occasion i if the wireless device is provided tpc-Accumulation, where $\delta_{PUSCH,b,f,c}$ absolute values may be predefined.

For example, if the wireless device receives a random access response message in response to a PRACH transmission on active UL BWP b of carrier f of serving cell c, the wireless device may determine $f_{b,f,c}(0, l)=\Delta P_{rampup,b,f,c}+\delta_{msg2,b,f,c}$, where the wireless device may determine that l=0 and $\delta_{msg2,b,f,c}$ is a TPC command value indicated in the random access response grant of the random access response message corresponding to the PRACH transmission on active UL BWP b of carrier f in the serving cell c, and $$\Delta P_{rampup,b,f,c} = \min\left[\left\{\max\left(0, P_{CMAX,f,c} - \begin{pmatrix} 10\log_{10}(2^\mu \cdot M_{RB,b,f,c}^{PUSCH}(0)) + \\ P_{O\_PUSCH,b,f,c}(0) + \alpha_{b,f,c}(0) \cdot PL_c + \\ \Delta_{TF,b,f,c}(0) + \delta_{msg2,b,f,c} \end{pmatrix}\right)\right\}, \Delta P_{rampuprequested,b,f,c}\right]$$

and $\Delta P_{rampuprequested,b,f,c}$ is provided by higher layers and corresponds to the total power ramp-up requested by higher layers from the first to the last random access preamble for carrier f in the serving cell c, $M_{RB,b,f,c}^{PUSCH}(0)$ is the bandwidth of the PUSCH resource assignment expressed in number of resource blocks for the first PUSCH transmission on active UL BWP b of carrier f of serving cell c, and $\Delta_{TF,b,f,c}(0)$ is the power adjustment of first PUSCH transmission on active UL BWP b of carrier f of serving cell c.

For example, if a wireless device transmits a PUCCH on active UL BWP b of carrier f in the primary cell c using PUCCH power control adjustment state with index l, the wireless device determines the PUCCH transmission power $P_{PUCCH,b,f,c}(i, q_u, q_d, l)$ in PUCCH transmission occasion i as $$P_{PUCCH,b,f,c}(i, q_u, q_d, l) =$$

-continued $$\min\begin{cases} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_b \end{cases}, [\text{dBm}].$$

For example, $P_{CMAX,f,c}(i)$ may be the configured wireless device transmit power defined in for carrier f of serving cell c in PUCCH transmission occasion i. For example, $P_{O\_PUCCH,b,f,c}(q_u)$ may be a parameter composed of the sum of a component $P_{O\_NOMINAL\_PUCCH}$, provided by p0-nominal, or $P_{O\_NOMINAL\_PUCCH}=0$ dBm, for example, if p0-nominal is not provided, for carrier f of primary cell c and, if provided, a component $P_{O\_UE\_PUCCH}(q_u)$ provided by p0-PUCCH-Value in P0-PUCCH for active UL BWP b of carrier f of primary cell c, where $0 \leq q_u < Q_u \cdot Q_u$ may be a size for a set of $P_{O\_UE\_PUCCH}$ values provided by maxNrof-PUCCH-P0-PerSet. The set of $P_{O\_UE\_PUCCH}$ values may be provided by p0-Set. If p0-Set is not provided to the wireless device, the wireless device may determine $P_{O\_UE\_PUCCH}(q_u)=0$, $0 \leq q_u < Q_u$ For example, if the wireless device is provided PUCCH-SpatialRelationInfo, the wireless device may obtain a mapping, by an index provided by p0-PUCCH-Id, between a set of pucch-SpatialRelationInfold values and a set of p0-PUCCH-Value values. If the wireless device is provided more than one values for pucch-SpatialRelationInfold and the wireless device receives an activation command indicating a value of pucch-SpatialRelationInfold, the wireless device may determine the p0-PUCCH-Value value through the link to a corresponding p0-PUCCH-Id index. The wireless device may apply the activation command with a time offset (e.g., 3 msec) after a slot where the wireless device transmits HARQ-ACK information for the PDSCH providing the activation command. For example, if the wireless device is not provided PUCCH-SpatialRelationInfo, the wireless device may obtain the p0-PUCCH-Value value from the P0-PUCCH with p0-PUCCH-Id value equal to 0 in p0-Set.

For example, $M_{RB,b,f,c}(i)$ may be a bandwidth of the PUCCH resource assignment expressed in number of resource blocks for PUCCH transmission occasion i on active UL BWP b of carrier f of serving cell c and u is a SCS configuration.

For example, $PL_{b,f,c}(q_d)$ may be a downlink pathloss estimate in dB calculated by the wireless device using RS resource index $q_d$ as described elsewhere in this specification for the active DL BWP of carrier f of the primary cell c.

For example, if the wireless device is not provided pathlossReferenceRSs or before the wireless device is provided dedicated higher layer parameters, the wireless device may determine $PL_{b,f,c}(q_d)$ using a RS resource obtained from the SS/PBCH block that the wireless device uses to obtain MIB.

For example, if the wireless device is provided a number of RS resource indexes, the wireless device may determine $PL_{b,f,c}(a)$ using RS resource with index $q_d$ where $0 \leq q_d < Q_d \cdot Q_d$ may be a size for a set of RS resources provided by maxNrofPUCCH-PathlossReferenceRSs. The set of RS resources may be provided by pathlossReferenceRSs. The set of RS resources may comprise one or both of a set of SS/PBCH block indexes, each provided by ssb-Index in PUCCH-PathlossReferenceRS when a value of a corresponding pucch-PathlossReferenceRS-Id maps to a SS/PBCH block index, and a set of CSI-RS resource indexes, each provided by csi-RS-Index when a value of a corresponding pucch-PathlossReferenceRS-Id maps to a CSI-RS resource index. The wireless device may identify an RS resource in the set of RS resources to correspond either to a SS/PBCH block index or to a CSI-RS resource index as provided by pucch-PathlossReferenceRS-Id in PUCCH-PathlossReferenceRS.

For example, if the wireless device is provided PUCCH-SpatialRelationInfo, the wireless device may obtain a mapping, by indexes provided by corresponding values of pucch-PathlossReferenceRS-Id, between a set of pucch-SpatialRelationInfold values and a set of reference signal values provided by PUCCH-PathlossReferenceRS. If the wireless device is provided more than one values for pucch-SpatialRelationInfold and the wireless device receives an activation command indicating a value of pucch-SpatialRelationInfold, the wireless device may determine the reference signal value in PUCCH-PathlossReferenceRS through the link to a corresponding pucch-PathlossReferenceRS-Id index. The wireless device may apply the activation command with a time offset (e.g., 3 msec) after a slot where the wireless device transmits HARQ-ACK information for the PDSCH providing the activation command.

For example, if PUCCH-SpatialRelationInfo comprises servingCellId indicating a serving cell, the wireless device may receive the RS for resource index $q_d$ on the active DL BWP of the serving cell. For example, if the wireless device is not provided PUCCH-SpatialRelationInfo, the wireless device may obtain the referencesignal value in PUCCH-PathlossReferenceRS from the pucch-PathlossReferenceRS-Id with index 0 in PUCCH-PathlossReferenceRS where the RS resource is either on a same serving cell or, if provided, on a serving cell indicated by a value of pathlossReferenceLinking.

For example, the parameter $\Delta_{F\_PUCCH}(F)$ may be provided by deltaF-PUCCH-f0 for PUCCH format 0, deltaF-PUCCH-f1 for PUCCH format 1, deltaF-PUCCH-f2 for PUCCH format 2, deltaF-PUCCH-f3 for PUCCH format 3, and deltaF-PUCCH-f4 for PUCCH format 4.

For example, $\Delta_{TF,b,f,c}(i)$ may be a PUCCH transmission power adjustment component on active UL BWP b of carrier f of primary cell c. For a PUCCH transmission using PUCCH format 0 or PUCCH format 1, the wireless device may determine $$\Delta_{TF,b,f,c}(i) = 10\log_{10}\left(\frac{N_{ref}^{PUCCH}}{N_{symb}^{PUCCH}(i)}\right) + \Delta_{UCI}(i).$$

For example, $N_{symb}^{PUCCH}(i)$ may be number of PUCCH format 0 symbols or PUCCH format 1 symbols included in a PUCCH resource of a PUCCH resource set indicated by a value of a PUCCH resource indicator field in DCI format 1_0 or DCI format 1_1, or provided by nrofSymbols in PUCCH-format0 or in PUCCH-format1 respectively. For example, the wireless device may determine $N_{ref}^{PUCCH}=2$ for PUCCH format 0. For example, the wireless device may determine $N_{ref}^{PUCCH}=N_{symb}^{slot}$ for PUCCH format 1. For example, the wireless device may determine $\Delta_{UCI}(i)=0$ for PUCCH format 0. For example, the wireless device may determine $\Delta_{UCI}(i)=10 \log_{10}(O_{UCI}(i))$ for PUCCH format 1, where $O_{UCI}(i)$ may be a number of UCI bits in PUCCH transmission occasion i.

For a PUCCH transmission using PUCCH format 2 or PUCCH format 3 or PUCCH format 4 and for a number of UCI bits smaller than or equal to 11, the wireless device may determine $\Delta_{TF,b,f,c}(i)=10 \log_{10}(K_1 \cdot (n_{HARQ-ACK}(i)+O_{SR}(i)+O_{CSI}(i))/N_{RE}(i))$. For example, $K_1=6$. For example, $n_{HARQ\text{-}ACK}$ (i) may be a number of HARQ-ACK information bits that the wireless device determines for Type-1 HARQ-ACK codebook and for Type-2 HARQ-ACK codebook. If the wireless device is not provided with pdsch-HARQ-ACK-Codebook, the wireless device may determine $n_{HARQ\text{-}ACK}$ (i)=1 if the wireless device includes a HARQ-ACK information bit in the PUCCH transmission; otherwise, the wireless device may determine $n_{HARQ\text{-}ACK}$(i)=0.

For example, $O_{SR}$(i) may be a number of SR information bits that the wireless device determines. For example, $O_{CSI}$(i) may be a number of CSI information bits that the wireless device determines.

For example, $N_{RE}$(i) may be a number of resource elements determined as $N_{RE}(i) = M_{RB,b,f,c}^{PUCCH}(i) \cdot N_{sc,ctrl}^{RB}(i) \cdot N_{symb\text{-}UCI,b,f,c}^{PUCCH}(i)$, where $N_{sc,ctrl}^{RB}(i)$ may be a number of subcarriers per resource block excluding subcarriers used for DM-RS transmission, and $N_{symb\text{-}UCI,b,f,c}^{PUCCH}(i)$ is a number of symbols excluding symbols used for DM-RS transmission for PUCCH transmission occasion i on active UL BWP b of carrier f of serving cell c For a PUCCH transmission using PUCCH format 2 or PUCCH format 3 or PUCCH format 4 and for a number of UCI bits larger than 11, the wireless device may determine $\Delta_{TF,b,f,c}(i) = 10 \log_{10}(2^{K_2 \cdot BPRE(i)} - 1)$.

For example, $K_2$=2.4. For example, the wireless device may determine BPRE(i)=$(O_{ACK}(i)+O_{SR}(i)+O_{CSI}(i)+O_{CRC}(i))/N_{RE}$(i).

For example, $O_{ACK}$(i) may be a number of HARQ-ACK information bits that the wireless device determines for Type-1 HARQ-ACK codebook and for Type-2 HARQ-ACK codebook. If the wireless device is not provided pdsch-HARQ-ACK-Codebook, the wireless device may determine $O_{ACK}$=1 if the wireless device includes a HARQ-ACK information bit in the PUCCH transmission; otherwise, $O_{ACK}$=0.

For example, $O_{SR}$(i) may be a number of SR information bits that the wireless device determines. For example, $O_{CSI}$(i) may be a number of CSI information bits that the wireless device determines. For example, $O_{CRC}$(i) may be a number of CRC bits.

For example, $N_{RE}$(i) may be a number of resource elements that the wireless device may determine as $N_{RE}(i) = M_{RB,b,f,c}^{PUCCH}(i) \cdot N_{sc,ctrl}^{RB}(i) \cdot N_{symb\text{-}UCI,b,f,c}^{PUCCH}(i)$, where $N_{sc,ctrl}^{RB}(i)$ may be a number of subcarriers per resource block excluding subcarriers used for DM-RS transmission, and $N_{symb\text{-}UCI,b,f,c}^{PUCCH}(i)$ may be a number of symbols excluding symbols used for DM-RS transmission for PUCCH transmission occasion i on active UL BWP b of carrier f of serving cell c.

For the PUCCH power control adjustment state $g_{b,f,c}$(i, l) for active UL BWP b of carrier f of primary cell c and PUCCH transmission occasion i, the wireless device may determine at least one of following.

For example, $\delta_{PUCCH,b,f,c}$(i, l) may be a TPC command value and is included in a DCI format 1_0 or DCI format 1_1 for active UL BWP b of carrier f of the primary cell c that the wireless device may detect for PUCCH transmission occasion i or is jointly coded with other TPC commands in a DCI format 2_2 with CRC scrambled by a particular RNTI (e.g., TPC-PUCCH-RNTI).

For example, l∈{0, 1} if the wireless device is provided twoPUCCH-PC-AdjustmentStates and PUCCH-SpatialRelationInfo and/=0 if the wireless device is not provided two PUCCH-PC-AdjustmentStates or PUCCH-SpatialRelationInfo.

For example, if the wireless device obtains a TPC command value from a DCI format 1_0 or a DCI format 1_1 and if the wireless device is provided PUCCH-SpatialRelationInfo, the wireless device may obtain a mapping, by an index provided by p0-PUCCH-Id, between a set of pucch-SpatialRelationInfoId values and a set of values for closedLoopIndex that provide the l value(s). If the wireless device receives an activation command indicating a value of pucch-SpatialRelationInfoId, the wireless device may determine the value closedLoopIndex that provides the value of l through the link to a corresponding p0-PUCCH-Id index.

For example, if the wireless device obtains one TPC command from a DCI format 2_2 with CRC scrambled by a particular RNTI (e.g., TPC-PUCCH-RNTI), the l value is provided by the closed loop indicator field in DCI format 2_2, the wireless device may determine that $$g_{b,f,c}(i, l) = g_{b,f,c}(i - i_0, l) + \sum_{m=0}^{C(C_i)-1} \delta_{PUCCH,b,f,c}(m, l)$$

is the current PUCCH power control adjustment state l for active UL BWP b of carrier f of serving cell c and PUCCH transmission occasion i, where the $\delta_{PUCCH,b,f,c}$ values may be predefined.

For example, $$\sum_{m=0}^{C(C_i)-1} \delta_{PUCCH,b,f,c}(m, l)$$

may be a sum of TPC command values in a set $C_i$ of TPC command values with cardinality $C(C_i)$ that the wireless device receives between $K_{PUCCH}(i-i_0)-1$ symbols before PUCCH transmission occasion $i-i_0$ and $K_{PUCCH}(i)$ symbols before PUCCH transmission occasion i on active UL BWP b of carrier f of serving cell c for PUCCH power control adjustment state, where $i_0$>0 may be the smallest integer for which $K_{PUCCH}(i-i_0)$ symbols before PUCCH transmission occasion $i-i_0$ is earlier than $K_{PUCCH}(i)$ symbols before PUCCH transmission occasion i.

For example, if the PUCCH transmission is in response to a detection by the wireless device of a DCI format 1_0 or DCI format 1_1, $K_{PUCCH}$(i) may be a number of symbols for active UL BWP b of carrier f of serving cell c after a last symbol of a corresponding PDCCH reception and before a first symbol of the PUCCH transmission.

For example, if the PUCCH transmission is not in response to a detection by the wireless device of a DCI format 1_0 or DCI format 1_1, $K_{PUCCH}$(i) may be a number of $K_{PUCCH}$.min symbols equal to the product of a number of symbols per slot, $N_{symb}^{slot}$, and the minimum of the values provided by k2 in PUSCH-ConfigCommon for active UL BWP b of carrier f of serving cell c.

For example, if the wireless device has reached maximum power for active UL BWP b of carrier f of primary cell c at PUCCH transmission occasion $i-i_0$ and $$\sum_{m=0}^{C(C_i)-1} \delta_{PUCCH,b,f,c}(m, l) \geq 0,$$

then the wireless device may determine $g_{b,f,c}(i, l) = g_{b,f,c}(i-i_0, l)$.

For example, if wireless device has reached minimum power for active UL BWP b of carrier f of primary cell c at PUCCH transmission occasion $i-i_0$ and $$\sum_{m=0}^{C(C_i)-1} \delta_{PUCCH,b,f,c}(m, l) \le 0,$$

then the wireless device may determine $g_{b,f,c}(i, l) = g_{b,f,c}(i-i_0, l)$.

For example, if a configuration of a $P_{O\_PUCCH,b,f,c}(q_u)$ value for a corresponding PUCCH power control adjustment state l for active UL BWP b of carrier f of serving cell c is provided by higher layers, the wireless device may determine $g_{b,f,c}(0, l)=0$. For example, if the wireless device is provided PUCCH-SpatialRelationInfo, the wireless device may determine the value of l from the value of $q_u$ based on a pucch-SpatialRelationInfoId value associated with the p0-PUCCH-Id value corresponding to $q_u$ and with the closedLoopIndex value corresponding to l; otherwise, l=0

For example, if a configuration of a $P_{O\_PUCCH,b,f,c}(q_u)$ value for a corresponding PUCCH power control adjustment state l for active UL BWP b of carrier f of serving cell c is not provided by higher layers, the wireless device may determine that $g_{b,f,c}(0, l) = \Delta P_{rampup,b,f,c} + \delta_{b,f,c}$. For example, l=0, and $\delta_{b,f,c}$ may be the TPC command value indicated in a random access response grant corresponding to a PRACH transmission or is the TPC command value in a DCI format with CRC scrambled by a particular RNTI (e.g., C-RNTI or MCS-C-RNTI) that the wireless device detects in a first PDCCH reception in a search space set provided by recoverySearchSpaceId if the PUCCH transmission is a first PUCCH transmission after a number of symbols (e.g., 28 symbols) from a last symbol of the first PDCCH reception, and, if the wireless device transmits PUCCH on active UL BWP b of carrier f of serving cell c, the wireless device may determine $$\Delta P_{rampup,b,f,c} = \min\left[\max\begin{pmatrix}0,\\ P_{CMAX,f,c} - (P_{O\_PUCCH,b,f,c} + PL_{b,f,c}(q_d) + \\ \Delta_{F\_PUCCH}(F) + \Delta_{TF,b,f,c} + \delta_{b,f,c})\end{pmatrix}\right];$$
$$\Delta P_{rampuprequested,b,f,c}$$

otherwise, The wireless device may $$\Delta P_{rampup,b,f,c} = \min\left[\max\begin{pmatrix}0,\\ P_{CMAX,f,c} - (P_{O\_PUCCH,b,f,c} + PL_{b,f,c}(q_d))\end{pmatrix},\right]$$
$$\Delta P_{rampuprequested,b,f,c}$$

where $\Delta P_{rampuprequested,b,f,c}$ may be provided by higher layers and corresponds to the total power ramp-up requested by higher layers from the first to the last preamble for active UL BWP b of carrier f of primary cell c, and $\Delta_{F\_PUCCH}(F)$ corresponds to PUCCH format 0 or PUCCH format 1.

If a wireless device transmits SRS on active UL BWP b of carrier f of serving cell c using SRS power control adjustment state with index l, the wireless device may determine the SRS transmission power $P_{SRS,b,f,c}(i, q_s, l)$ in SRS transmission occasion i as $$P_{SRS,b,f,c}(i, q_s, l) =$$
$$\min\begin{cases}P_{CMAX,f,c}(i),\\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l)\end{cases}[dBm].$$

For example, $P_{CMAX,f,c}(i)$ may be the configured wireless device transmit power for carrier f of serving cell c in SRS transmission occasion i. For example, $P_{O\_SRS,b,f,c}(q_s)$ may be provided by p0 for active UL BWP b of carrier f of serving cell c and SRS resource set $q_s$ provided by SRS-ResourceSet and SRS-ResourceSetId; if p0 is not provided, $P_{O\_SRS,b,f,c}(As) = P_{O\_NOMINAL\_PUSCH,f,c}(0)$. For example, $M_{SRS,b,f,c}(i)$ may be an SRS bandwidth expressed in number of resource blocks for SRS transmission occasion i on active UL BWP b of carrier f of serving cell c and µ is a SCS configuration. For example, $a_{SRS,b,f,c}(q_s)$ may be provided by alpha for active UL BWP b of carrier f of serving cell c and SRS resource set $q_s$.

For example, $PL_{b,f,c}(q_d)$ may be a downlink pathloss estimate in dB calculated by the wireless device using RS resource index $q_d$ as described elsewhere in this specification for the active DL BWP of serving cell c and SRS resource set $q_s$. The RS resource index $q_d$ may be provided by pathlossReferenceRS associated with the SRS resource set $q_s$ and may be either a ssb-Index providing a SS/PBCH block index or a csi-RS-Index providing a CSI-RS resource index.

For example, if the wireless device is not provided pathlossReferenceRS or before the wireless device is provided dedicated higher layer parameters, the wireless device may determine $PL_{b,f,c}(q_d)$ using a RS resource obtained from the SS/PBCH block that the wireless device uses to obtain MIB. For example, if the wireless device is provided pathloss ReferenceLinking, the RS resource may be on a serving cell indicated by a value of pathlossReferenceLinking.

For example, the wireless device may determine $h_{b,f,c}(i, l) = f_{b,f,c}(i, l)$, where $f_{b,f,c}(i, l)$ may be the current PUSCH power control adjustment state, for example if srs-PowerControlAdjustmentStates indicates a same power control adjustment state for SRS transmissions and PUSCH transmissions.

For example, the wireless device may determine $$h_{b,f,c}(i) = h_{b,f,c}(i-1) + \sum_{m=0}^{C(S_i)-1} \delta_{SRS,b,f,c}(m),$$

for example, if the wireless device is not configured for PUSCH transmissions on active UL BWP b of carrier f of serving cell c, or if srs-PowerControlAdjustmentStates indicates separate power control adjustment states between SRS transmissions and PUSCH transmissions, and if tpc-Accumulation is not provided, where the $\delta_{SRS,b,f,c}$ values may be predefined.

For example, $\delta_{SRS,b,f,c}(m)$ may be jointly coded with other TPC commands in a PDCCH with DCI format 2_3. For example, $$\sum_{m=0}^{C(S_i)-1} \delta_{SRS,b,f,c}(m)$$

may be a sum of TPC command values in a set $S_i$ of TPC command values with cardinality $C(S_i)$ that the wireless device receives between $K_{SRS}(i-i_0)-1$ symbols before SRS transmission occasion $i-i_0$ and $K_{SRS}(i)$ symbols before SRS transmission occasion i on active UL BWP b of carrier f of serving cell c for SRS power control adjustment state, where $i_0 > 0$ may be the smallest integer for which $K_{SRS}(i-i_0)$ symbols before SRS transmission occasion $i-i_0$ is earlier than $K_{SRS}(i)$ symbols before SRS transmission occasion i.

For example, if the SRS transmission is aperiodic, $K_{SRS}$ (i) may be a number of symbols for active UL BWP b of carrier f of serving cell c after a last symbol of a corresponding PDCCH triggering the SRS transmission and before a first symbol of the SRS transmission For example, if the SRS transmission is semi-persistent or periodic, $K_{SRS}$ (i) may be a number of $K_{SRS}$.min symbols equal to the product of a number of symbols per slot, $N_{symb}^{slot}$, and the minimum of the values provided by k2 in PUSCH-ConfigCommon for active UL BWP b of carrier f of serving cell c.

For example, if the wireless device has reached maximum power for active UL BWP b of carrier f of serving cell c at SRS transmission occasion $i-i_0$ and $$\sum\nolimits_{m=0}^{C(S_i)-1} \delta_{SRS,b,f,c}(m) \geq 0,$$

then the wireless device may determine $h_{b,f,c}(i)=h_{b,f,c}(i-i_0)$. For example, if the wireless device has reached minimum power for active UL BWP b of carrier f of serving cell c at SRS transmission occasion $i-i_0$ and $$\sum\nolimits_{m=0}^{C(S_i)-1} \delta_{SRS,b,f,c}(m) \leq 0,$$

then the wireless device may determine $h_{b,f,c}(i)=h_{b,f,c}(i-i_0)$.

For example, if a configuration for a $P_{O\_SRS,b,f,c}(q_s)$ value or for a $\beta_{SRS,b,f,c}(q_s)$ value for a corresponding SRS power control adjustment state l for active UL BWP b of carrier f of serving cell c is provided by higher layer, the wireless device may determine $h_{b,f,c}(0)=0$; else the wireless device may determine $h_{b,f,c}(0)=\Delta P_{rampup,b,f,c}+\delta_{msg2,b,f,c}$.

For example, $\delta_{msg2,b,f,c}$ may be the TPC command value indicated in the random access response grant corresponding to the random access preamble that the wireless device transmitted on active UL BWP b of carrier f of the serving cell c, and $$\Delta P_{rampup,b,f,c} = \min\left[\max\begin{pmatrix}0, \\ P_{CMAX,f,c} - (P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d))\end{pmatrix}, \Delta P_{rampuprequested,b,f,c}\right].$$

For example, $\Delta P_{rampuprequested\ b,f,c}$ may be provided by higher layers and corresponds to the total power ramp-up requested by higher layers from the first to the last preamble for active UL BWP b of carrier f of serving cell c.

For example, the wireless device may determine $h_{b,f,c}(i)=\delta_{SRS,b,f,c}(i)$ if the wireless device is not configured for PUSCH transmissions on active UL BWP b of carrier f of serving cell c, or if srs-PowerControlAdjustmentStates indicates separate power control adjustment states between SRS transmissions and PUSCH transmissions, and tpc-Accumulation is provided, and the wireless device may detect a DCI format 2_3 $K_{SRS}$.min symbols before a first symbol of SRS transmission occasion i, where absolute values of $\delta_{SRS,b,f,c}$ may be predefined.

For example, if srs-PowerControlAdjustmentStates indicates a same power control adjustment state for SRS transmissions and PUSCH transmissions, the update of the power control adjustment state for SRS transmission occasion i may occur at the beginning of each SRS resource in the SRS resource set $q_s$; otherwise, the update of the power control adjustment state SRS transmission occasion i may occur at the beginning of the first transmitted SRS resource in the SRS resource set $q_s$.

A wireless device may receive an RRC message indicating one or more parameters for the power headroom reporting procedure. An MAC entity of the wireless device may determine when to transmit, to a base station, a power headroom report (PHR) based on the one or more parameters. The wireless device may determine which cell and/or which type of power headroom need to be reported via the PHR. For example, the one or more parameters may indicate a first value of a PHR periodic timer (e.g., phr-PeriodicTimer), a second value of a PHR prohibit timer (e.g., phr-ProhibitTimer), a PHR pathloss change threshold (e.g., phr-Tx-PowerFactorChange), a presence/absence indicator of a PH value for other cell in the PHR (e.g., phr-Type2OtherCell), a mode (e.g., real or virtual) indicator of a PH (e.g., phr-ModeOtherCG), and/or a multiple PHR indicator (e.g., multiplePHR).

An MAC entity of a wireless device may trigger a PHR based on one or more conditions. For example, the wireless derive may trigger a PHR at least one of following events: a first timer (e.g., phr-PeriodicTimer) expires; upon configuration or reconfiguration of the power headroom reporting functionality by upper layers, which may not be used to disable the function; activation of an SCell of any MAC entity with configured uplink; and/or an addition of the PSCell (e.g., a PSCell may be added or changed).

An MAC entity of a wireless device may, for example, if the wireless device has UL resources allocated for a new transmission, start a PHR periodic timer if a first UL resource is firstly allocated for a new transmission since a last MAC reset. A wireless device may transmit, for example, if a PHR procedure determines that at least one PHR has been triggered and not cancelled and/or if allocated UL resources accommodate at least one PHR (e.g., a MAC CE for the PHR which the MAC entity is configured to transmit, plus its subheader, as a result of logical channel prioritization), at least one PHR to a base station. A PHR procedure and/or a PHR format may be determined, for example on whether a base station configures a wireless device with a single entry PHR format (e.g., a multiple PHR indicator (e.g., multiplePHR) is not configured) or a multiple entry PHR format (e.g., a multiple PHR indicator (e.g., multiplePHR) is configured).

If a base station configures a wireless device with a multiple PHR indicator (e.g., by transmitting an RRC configuration parameter indicating the multiple entry PHR format (e.g., multiplePHR)), an MAC entity of the wireless device may determine, for each of one or more activated cells with configured uplink(s) associated with the wireless device, a first value of a first type power headroom (PH), e.g., Type 1 PH determined based on a PUSCH transmission, or a third type PH, e.g., Type 3 PH determined based on an SRS transmission. A wireless device may determine, for example, if the wireless device has UL resources allocated for a transmission on the at least one cell, or if one or more other cells of the one or more activated cells have UL resources allocated for transmission on the at least one cell and PHR configuration parameters transmitted for indicating a PHR mode of the one or more cells indicates a real PH value (e.g., a mode (e.g., real or virtual) indicator of a PH (e.g., phr-ModeOtherCG)) indicate a real PH value), a second value corresponding to PCMAX, c (described elsewhere in this specification) and transmit the first value and the second value via corresponding one or more fields in a PHR.

If a presence/absence indicator of a PH value for other cell in the PHR (e.g., phr-Type2OtherCell) is configured to a wireless device, and/or if other MAC entity is a particular radio access technology (e.g., 4G) MAC entity, an MAC entity of the wireless device determine a first value corresponding to a second type PH (e.g., Type 2 PH) for an SpCell of the other MAC entity. If a PHR mode of the one or more cells indicates a real PH value (e.g., a mode (e.g., real or virtual) indicator of a PH (e.g., phr-ModeOtherCG)) indicate a real PH value), a wireless device may a second value corresponding to PCMAX, c. The wireless device may transmit the first value and the second value via one or more corresponding fields in a PHR.

An MAC entity of a wireless device may trigger a multiplexing and assembly procedure for generating and transmitting a PHR (e.g., in a form of a PHR MAC CE). The PHR may comprise a first value of a first type PH, a second type PH, and/or a third type PH of at least one cell. The PHR may comprise a second value, corresponding to PCMAX, c, for example, based on a configured serving cell index (e.g., ServCellIndex) and/or configured PUCCH(s) for the wireless device. A wireless device may, for example, based on transmitting a PHR, start or restart a PHR periodic timer (e.g., periodicPHR-Timer) and/or a PHR prohibit timer (e.g., prohibitPHR-Timer). A wireless device may, for example, based on transmitting a PHR, cancel one or more triggered PHRs.

If a base station configures a wireless device with a single entry PHR format (e.g., by transmitting a PHR configuration parameter indicating the single entry PHR format, and/or by not configuring a PHR configuration parameter indicating a multiple entry PHR format (e.g., if multiplePHR is absent)), the wireless device may, for example, determine a first value, of a first type PH or of a third type PH, for a corresponding uplink carrier of a cell (e.g., a PCell). The wireless device may, for example, determine a second value corresponding to PCMAX, c. The wireless device may, for example, based on determining the first value and the second value, transmit a PHR to a base station (e.g., a gNB). The PHR may comprise one or more fields indicating the first value and the second value. A wireless device may trigger a multiplexing and assembly procedure for generating and transmitting a PHR MAC CE comprising a value of a first type PH or of a third type PH. A wireless device may, for example, based on transmitting a PHR, start or restart a PHR periodic timer (e.g., periodicPHR-Timer) and/or a PHR prohibit timer (e.g., prohibitPHR-Timer). A wireless device may, for example, based on transmitting a PHR, cancel one or more triggered PHRs.

Figure 17:
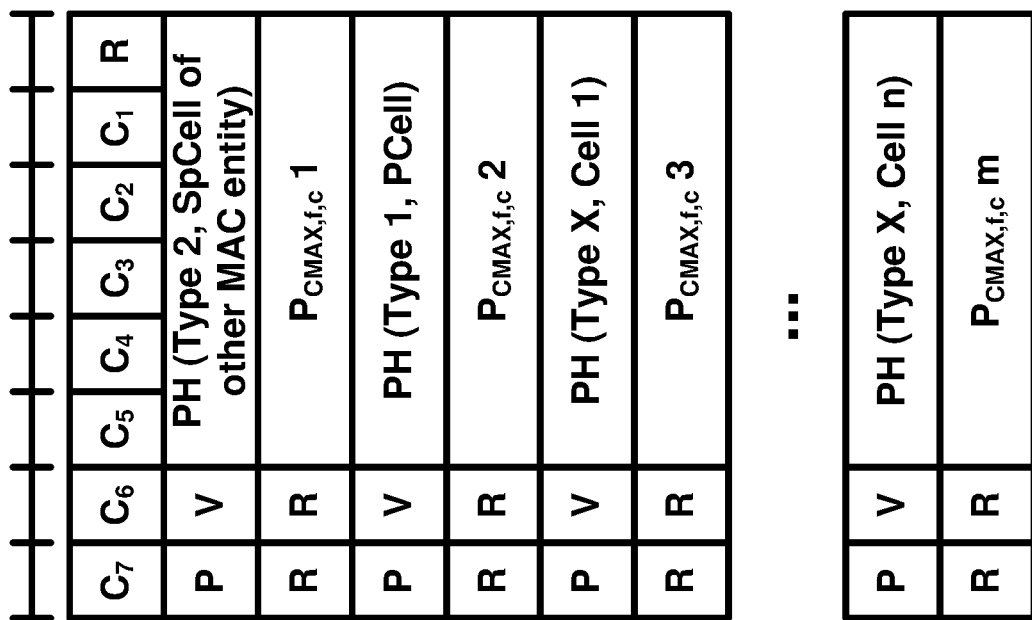
FIG. 17 illustrates a MAC CE format for power headroom reporting as per an aspect of an example embodiment of the present disclosure.

FIG. 17 and FIG. 18 show example of multiple entry PHR MAC CE. The multiple entry PHR MAC CE may be identified by a MAC PDU subheader with a particular LCID assigned for the multiple entry PHR MAC CE. The multiple entry PHR MAC CE may have a variable size, and comprise a bitmap, a Type 2 PH field and an octet comprising an associated PCMAX,f,c field (e.g., if reported) for SpCell of the other MAC entity, a Type 1 PH field and an octet comprising an associated PCMAX,f,c field (e.g., if reported) for a PCell. The multiple entry PHR MAC CE may further comprise, e.g., in ascending order based on the a cell ID (e.g., ServCellIndex), one or more of Type X PH fields and octets comprising an associated PCMAX,f,c fields (e.g., if reported) for a serving cells other than a PCell indicated in the bitmap (e.g., X may be either 1 or 3). A presence of Type 2 PH field for SpCell of the other MAC entity may be configured by a presence/absence indicator of a PH value for other cell in the PHR (e.g., phr-Type2OtherCell with value true). A single octet bitmap may be used for indicating the presence of PH per a serving cell, e.g., when a total number of serving cells and/or a highest cell ID (e.g., ServCellIndex) of a serving cell with configured uplink is less than 8, otherwise four octets are used. The MAC entity determines whether PH value for an activated serving cell is based on real transmission or a reference format based on configured grant(s) and downlink control information that may have been received until and including the PDCCH occasion in which a first UL grant for a new transmission is received since a PHR has been triggered if a PHR MAC CE is reported on an uplink grant received on the PDCCH or until the first uplink symbol of PUSCH transmission minus PUSCH reparation time predefined, e.g., if the PHR MAC CE is reported on a configured grant.

As shown in FIG. 17 and FIG. 18, the PHR MAC CEs may comprise at least one of:
  a presence/absence indication field (e.g., $C_i$ in FIG. 17 and/or FIG. 18) that indicates a presence of a PH field for a serving cell with a cell ID i (e.g., ServCellIndex i). The $C_i$ field set to "1" may indicate that a PH field for the serving cell with the cell ID i (e.g., ServCellIndex i) is reported. The $C_i$ field set to "0" may indicate that a PH field for the serving cell with a cell ID i (e.g., ServCellIndex i) is not reported;
  a reservation field (e.g., R in FIG. 17 and/or FIG. 18) indicating one or more reserved bit (e.g., R set to "0");
  a PH mode indicator (e.g., V in FIG. 17 and/or FIG. 18) that indicate if the PH value is based on a real (or actual) transmission or a reference format. For Type 1 PH, V=0 may indicates a real transmission on PUSCH and V=1 may indicate that a PUSCH reference format is used. For Type 2 PH, V=0 may indicate a real transmission on PUCCH and V=1 may indicate that a PUCCH reference format is used. For Type 3 PH, V=0 may indicate a real transmission on SRS and V=1 may indicate that an SRS reference format is used. For Type 1, Type 2, and Type 3 PH, V=0 may indicate a presence of an octet comprising an associated PCMAX,f,c field, and V=1 may indicate that the octet comprising the associated PCMAX,f,c field is omitted;
  a PH field (e.g., a PH field in FIG. 17 and FIG. 18) indicating a power headroom level. Example reported PH and example corresponding power headroom levels are shown in FIG. 22B;
  a power backoff indicator file (e.g., a P field in FIG. 17 and FIG. 18) indicating whether the MAC entity applies power backoff due to power management. The MAC entity may set P=1 if a corresponding PCMAX, f,c field have had a different value if no power backoff due to power management had been applied;
  a PCMAX,f,c field. If present, this field may indicates a determined allowed UE power (e.g., a UE maximum power) for a serving cell c used for determining a preceding PH field. A determined allowed power of a cell c may be determined based on a UE allowed power, an allowed power at the cell c, and/or one or more MPR (marginal power reduction) values.

In an example, a wireless device may report a PH per antenna group (e.g., panel) in a PHR. A wireless device may transmit a PH of an activated antenna group (e.g., panel). A wireless device may not transmit a PH of a deactivated antenna group (e.g., panel). For example, for a deactivated antenna group (e.g., panel), a wireless device may power off a hardware unit of a antenna group (e.g., panel), for example, if the antenna group (e.g., panel) is deactivated. A wireless device may deactivate one or more antenna groups (e.g., panels) of a plurality of antenna groups (e.g., panels), for example, for power saving. A wireless device may deactivate one or more antenna groups (e.g., panels) after or in response to receiving, from a base station, a message and/or a signal indicating to deactivate the one or more antenna groups (e.g., panels). A first wireless device may determine a deactivation of one or more first antenna groups (e.g., panels) and transmit, to a first base station, a message and/or a signal indicating the deactivation of the one or more first antenna groups. There may be one or more ways to deactivate the one or more antenna groups (e.g., panels). For example, the first wireless may transmit the message and/or the signal after or in response to the deactivation of the one or more first antenna group (e.g., panels). For example, the first wireless may deactivate the one or more first antenna group (e.g., panels) after or in response to transmitting the message and/or the signal. For example, the first wireless may deactivate the one or more first antenna group (e.g., panels) after or in response to receiving, from the first base station, a response indicating a deactivation of the one or more first antenna group (e.g., panels). For example, the response may indicate a deactivation of one or more second antenna group (e.g., panels) of the one or more first antenna group (e.g., panels). For example, the first wireless may deactivate the one or more second antenna group (e.g., panels) after or in response to receiving, from the first base station, the response indicating the one or more second antenna group (e.g., panels).

A wireless device may report a PH per antenna group (e.g., panel) in a PHR. For an activated serving cell, a wireless device may determine a PH value per antenna group (e.g., panel). For example, if there are two antenna groups (e.g., panel) activated, a wireless device may determine two PH values for an activated serving cell; one for a first activated antenna group (e.g., a first panel) and the other for a second activated antenna group (e.g., a second panel). There may be one or more ways to construct a PHR comprising a PH per antenna group (e.g., panel). For example, if there are a plurality of activated antenna groups (e.g., panels), a PHR for a first activated serving cell may comprise a plurality of PH values (e.g., each of the PH values corresponds to one of the plurality of activated antenna groups (e.g., panels)) in an ascending order or a descending order of IDs of the a plurality of activated antenna groups (e.g., panels). For example, if there are an antenna group 1 (e.g., panel ID 1) and an antenna group 2 (e.g., panel ID 2) for a wireless device configured with one or more activated serving cell, for each of the one or more activated serving cells, the wireless device may determine two PH values for the antenna group 1 (e.g., panel ID 1) and the antenna group 2 (e.g., panel ID 2).

For example, for a PH value of a first activated serving cell of the one or more activated serving cells, a first PH value (e.g., with corresponding P, V, and/or $P_{CMAX,f,c}$ fields) determined based on the antenna group 1 (e.g., panel ID 1) may be placed first and a second PH value (e.g., with corresponding P, V, and/or $P_{CMAX,f,c}$ fields) determined based on the antenna group 2 (e.g., panel ID 2). The order of the two PH values may be based on ascending or descending orders. For the second activated serving cell of the one or more activated serving cells, another two PH values for the antenna group 1 (e.g., panel ID 1) and the antenna group 2 (e.g., panel ID 2) may be placed in the PHR in a similar way. For example, a PHR may comprise a field indicating an antenna group ID (e.g., panel ID). One or more R fields in FIG. 17, and FIG. 18 may be used to indicate an antenna group ID (e.g., panel ID). For example, there may be an antenna group 1 (e.g., panel ID 1) and an antenna group 2 (e.g., panel ID 2) for a wireless device configured with one or more activated serving cell. For a PH value of a first activated serving cell of the one or more activated serving cell, a first PH value (e.g., with corresponding P, V, and/or $P_{CMAX,f,c}$ fields) determined based on the antenna group 1 (e.g., panel ID 1) may be placed with a first field indicating a first ID of the antenna group 1 and a second PH value (e.g., with corresponding P, V, and/or $P_{CMAX,f,c}$ fields) determined based on the antenna group 2 (e.g., panel ID 2) may be placed with a second field indicating a second ID of the antenna group 2. For example, the first fields may be "00" and the second field may be "01." The order of the first PH value (e.g., with corresponding a P field, a V field, a $P_{CMAX,f,c}$ field, and/or a first field indicating the first ID) and the second PH value (e.g., with corresponding a P field, a V field, a $P_{CMAX,f,c}$ field, and/or a second field indicating the second ID) may be in ascending order and/or a descending order (e.g., similar ordering mechanism may be applied for a case of a plurality of antenna groups). For example, one or more PH fields corresponding to one or more antenna groups (e.g., panels) may be grouped together per an activated serving cell in a PHR. The one or more PH fields may not be ordered in the PHR, for example, if the one or more PH fields are placed with their antenna group IDs. The one or more PH fields may be ordered in the PHR, for example, if the one or more PH fields are placed without their antenna group IDs.

In existing technologies of a dual connectivity scenario, a wireless device may transmit a PHR (Power Headroom Report) of each cell of one or more active cells belonging to a first cell group or a second cell group. The wireless device, when it transmits a PHR to the first cell group (e.g., a first base station), may determine a power headroom (PH) value of a second cell of the second cell group (e.g., of a second base station) based on an actual transmission (e.g., an actual PH) or a reference format (e.g., a virtual PH) based on a configuration parameter of phr-ModeOtherCG (e.g., actual or virtual). The first base station may utilize the PH of the second cell of the second cell group in determining one or more power control parameters for a first cell for the first cell group. The PH value based on an actual communication may be beneficial as it provides an actual power headroom value of the second cell. The PH value based on a reference may be beneficial as it provides a pathloss estimation of the second cell. An actual PH (based on an actual transmission) or a virtual PH (based on a reference format) may be beneficial in different scenarios. In a dual connectivity scenario, each cell group may operate in different frequency regions (e.g., a first cell group is in a frequency region 1 (e.g., below 7 GHz) and a second cell group is in a frequency region 2 (e.g., below 30 GHz and above 7 GHZ)). Each frequency region may use different set of numerologies which may lead different processing time in each CG. For example, a first processing time of a first cell group with small subcarrier spacing (e.g., 15 kHz) may be slower than a second process time of a second cell group with large subcarrier spacing (e.g., 10 kHz). With different processing time, a first base station with slower processing time may not easily acquire one or more PH values of cells associated with a second base station with faster processing time based on the existing technologies.

In an embodiment, a wireless device may provide a PH value of a previous uplink transmission of a second cell of a second base station when it transmits a PHR to a first base station and it is configured with an actual PHR for the second base station. The wireless device may provide one or more PH values of one or more cells associated with a second base station based on an actual transmission without increasing a UE complexity.

In existing technologies, when a wireless device supports more than one power control processes for a cell, the wireless device may report an actual PH value of the cell based on a power control process determined based on a scheduling DCI or parameters of a configured grant. A first base station receives a first PH value of a second cell associated with a second base station based on a first power control process at a first time. The first base station receives a second PH value of the second cell associated with the second base station based on a second power control process at a second time. Without real-time scheduling information of the second cell, the first base station may not distinguish where an offset between the first PH value and the second PH value comes from (e.g., pathloss change, different power control process). An actual PH value may be less useful for the first base station.

In an example, a single power control process may be used in determining a PH value for a cell based on an actual transmission or a reference format. For example, a lowest indexed power control process of a cell may be used in determining a PH value of the cell regardless of determination based on an actual transmission or a reference format. In response to utilizing the lowest indexed power control process of a cell, a PH of a cell may be determined based on an actual transmission only when the actual transmission is performed based on the lowest indexed power control process of the cell. The wireless device may determine the PH value of the cell based on a reference format when a PUSCH is scheduled based on another power control processes in a cell. The procedure may be applied to one or more first cells of a second cell group and may not applied to one or more second cells of a first cell group, when a wireless device is triggered with a PHR for the first cell group. Similarly, the procedure may be applied to the one or more second cells of the first cell group and may not applied to the one or more first cells of the second cell group, when the wireless device is triggered with a PHR for the second cell group.

In an example, a wireless device may determine a PH value, of a second cell of a second base station based on actual, only based on a single power control process, when it operates with a plurality of power control processes, in transmitting a PHR to a first base station. This may reduce uncertainty of a received actual PH value of the second cell at the first base station and thus enhances usefulness of the actual PH value.

In existing technologies, when a wireless device supports more than one power control processes for a cell, the wireless device may report a virtual PH value of the cell based on a default power control process (e.g., a lowest indexed power control process). A wireless device determines a PH value of a second cell of a second base station based on a reference format and based on a default power control process (e.g., a first power control process). The wireless device may transmit the PH value of the second cell to a first base station. When a first pathloss or a first accumulated power of the default power control process is much different from a second pathloss or a second accumulated power of a second power control process, the first base station may estimate inaccurately about the cell of a second base station. With diverse applications and a multi-TRP scenario where a wireless device may have a different pathloss to each TRP, a difference between the first power control process and the second power control process may become larger, and the impact of inaccurate estimation may degrade system performance.

In an example, a wireless device may determine a first PH value of a cell based on a first power control process, where in the cell belongs to a first cell group and a PHR is triggered for a second cell group. The wireless device may determine a power offset for a second power control process of the cell. The wireless device may transmit a PHR comprising the first PH value and the power offset to the second cell group (or a second base station). The second base station may utilize the first PH value and the power offset to determine PH values for a plurality of power control processes of the cell of the first cell group (or a first base station).

Embodiments may provide power headroom values associated with a plurality of power control processes of a cell for a second cell group, wherein a PHR is triggered for a first cell group. The provided power headroom values may be used by a second base station in determining necessary power control for one or more cells of the second cell group. Embodiments may enhance power sharing between the first cell group and the second cell group.

Figure 19:
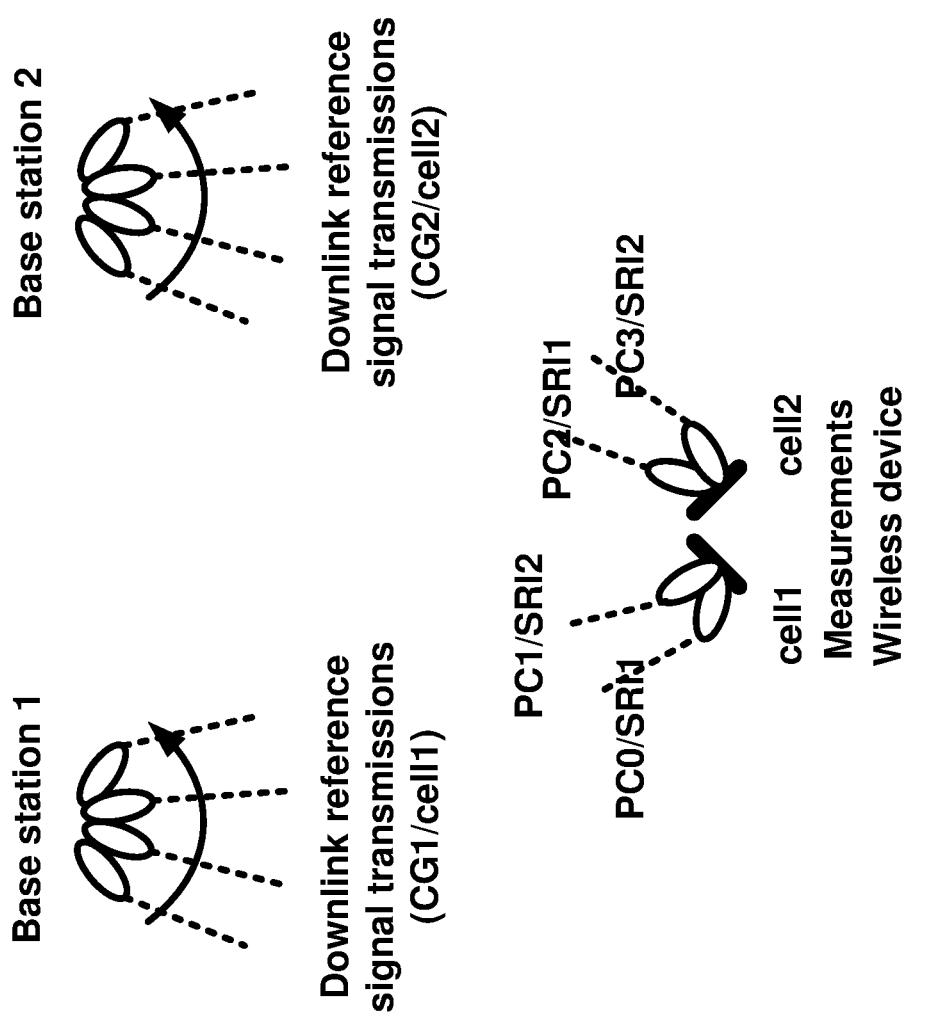
FIG. 19 illustrates a multiple downlink reference signals and multiple power control processes for multiple cells as per an aspect of an example embodiment of the present disclosure.

A base station may transmit one or more messages configuring one or more downlink reference signals that are used for measuring pathloss from the base station to a wireless device. The one or more messages may be radio resource control (RRC) messages. The base station may maintain one or more closed-loop power control processes corresponding to a cell of the wireless device. FIG. 19 illustrates an example of multiple downlink reference signals (RSs) and multiple power control processes for multiple cells. A first base station (e.g., base station 1) may provide multiple first downlink RSs for a cell 1. The first base station may configure a first cell group (e.g., CG1) to a wireless device. A second base station (e.g., base station 2) may provide one or more second downlink RSs for a cell 2. The second base station may configure a second cell group (e.g., CG2) to the wireless device. The first base station maintains two closed-loop power control processes (e.g., PC0 and PC1) for the cell 1. The second base station maintains two closed-loop power control processes (e.g., PC2 and PC3) for the cell 2. The wireless device may determine an uplink power of an uplink channel for the cell 1 based on either PC0 or PC1. Similarly, the wireless device may determine an uplink power of an uplink channel for the cell 2 based on either PC2 or PC3. The wireless device may determine which power control process to use based on one or more downlink control information (DCI) fields. For example, the wireless device may determine which process to use based on an SRS resource indicator in a DCI field. The wireless device may use a default power control process (e.g., a lowest indexed power control process) among multiple power control processes when no explicit indication is provided. The term 'power control process' may be used interchangeably with 'closed-loop power control process'.

In response to a triggering of a power headroom report (PHR), a wireless device may determine a PH value for each activated cell of both a first CG and a second CG (if any). The wireless device may determine a PH value based on an actual transmission or a reference format. In the case of actual transmission, the wireless device may determine a power headroom (PH) value based on scheduling information of uplink channel(s) (e.g., PUSCH, PUCCH, SRS) which are overlapped in time with a PUSCH carrying a PHR. When determining a PH value based on an actual transmission, several parameters are considered. For example, the wireless device may determine a maximum allowed power for the cell (for example, Pcmax) based on, for example, one or more parameters of maximum power configuration and one or more MPR (maximum power reduction) values. The wireless device may also determine a PH value power of the actual transmission based on, for example, one or more power control process parameters based on one or more DCI fields such as SRS resource indicator (SRI), a number of resource blocks (RBs), a transmission power control (TPC) field, and/or the like. The PH value may be based on the difference between the maximum allowed power for the cell and the power of the actual transmission.

Figure 20:
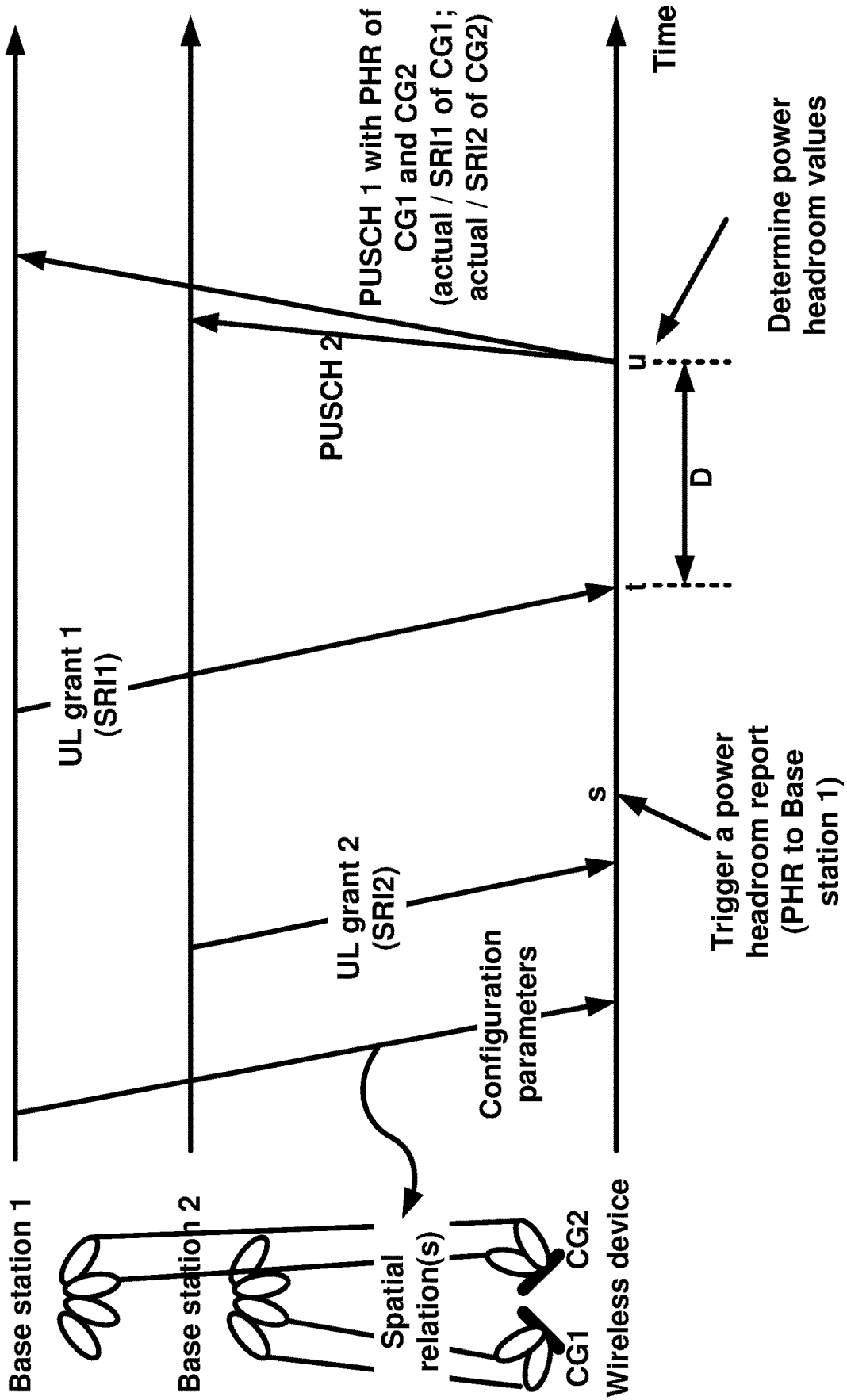
FIG. 20 illustrates a signal flow diagram for power headroom reporting as per an aspect of an example embodiment of the present disclosure.

FIG. 20 illustrates an example signal flow diagram for power headroom reporting. In FIG. 20, a wireless device receives configuration parameters. Although the configuration parameters are illustrated as being received from a first base station, they may be received from a second base station or both base stations. The configuration parameters may relate to a first cell group (CG1) associated with the base station (e.g., Base station 1) and/or a second cell group (CG2) associated with the second base station (e.g., Base station 2). A cell within CG1 or CG2 may have multiple beams configured and the configuration parameters may configure spatial relations of the multiple beams for the cell. The first base station configures a first cell of the first CG. The second base station configures a second cell of the second CG. The wireless device may be configured with two power control processes for the first cell of the first CG where a first power control process is associated with a first SRI (SRS resource indicator) of the first cell and a second power control process is associated with a second SRI of the first cell. The wireless device may be configured with two power control processes for the second cell of the second CG where a first power control process is associated with a first SRI of the second cell and a second power control process is associated with a second SRI of the second cell.

The wireless device may receive an indicated SRI via a scheduling information/uplink grant (for example, a DCI). When determining a PH value based on an actual transmission, the wireless device may utilize the first power control process or the second power control process depending on whether the uplink grant indicates the first SRI or the second SRI. If the uplink grant does not indicate a particular SRI, then the wireless device may utilize a default power control process. The default power control process may be, for example, the power control process with a lowest index value.

In the example of FIG. 20, the wireless device may receive an uplink grant (UL grant 2) from the second base station. UL grant 2 may grant resources for transmission via an uplink channel. UL grant 2 may indicate the second SRI of the second cell (which corresponds to the second power control process of the second cell). The uplink channel may be, for example, a PUSCH. The uplink grant may schedule the resources for time u.

In the example of FIG. 20, a PHR associated with the first base station may be triggered at a time s. The PHR may be triggered by any suitable factor or factors (including, for example, expiration of a PHR timer associated with the first base station). After the PHR associated with the first base station is triggered, the wireless device may determine that a PHR should be transmitted to the first base station the next time the wireless device transmits to the first base station on an uplink channel (for example, a PUSCH). A first PH value of the first cell associated with the first base station may be included in the PHR. Although the PHR is transmitted to the first base station, the PHR may include a second PH value associated with the second cell of the second base station. The first base station may use both the first PH value and the second PH value to facilitate efficient uplink scheduling by the first base station in, for example, a dual connectivity scenario.

The wireless device may transmit a PHR via a first available PUSCH associated with the first base station (i.e., the base station for which the PHR was triggered at time s). In the example of FIG. 20, the wireless device receives from the first base station an UL grant (UL grant 1) at a time t. UL grant 1 may grant resources for uplink transmission via an uplink channel of the first cell (in this example, a PUSCH). UL grant 1 may indicate a particular SRI of the first cell (in this example, the first SRI of the first cell, which corresponds to the first power control process of the first cell). The uplink grant may schedule the resources for a PUSCH at a time u.

FIG. 20 depicts a duration D between a time t (when the wireless device receives uplink grant 1 from the first base station) and a time u (when the PHR is transmitted). In the example of FIG. 20, the receiving of the uplink grant from the second base station occurs prior to time t (that is, before the duration D). Because the uplink grant was received before the duration D, the wireless device determines one or more actual PH values corresponding to the second cell based on the actual transmission scheduled for time u. As will be discussed in greater detail below with respect to FIG. 21, the wireless device may not consider any uplink grants received during the duration D for an actual PH determination. In particular, if the uplink grant scheduling an uplink transmission at time u was received during the duration D (that is, after time t), then the wireless device may not determine an actual PH based on the uplink grant received during the duration D. Instead, the wireless device would report virtual PH values corresponding to the second cell, even though an actual transmission on the second cell is scheduled to occur at time u.

In the example of FIG. 20, the window begins at time t, a point at which an uplink grant is received from a base station for which a PHR has been triggered (in this example, the first base station). In other examples, the wireless device may transmit on the first cell in accordance with a configured grant. In the case of a configured grant, the uplink transmission to the first base station may be scheduled for time u, but the scheduling would not be based on a received uplink grant. In this instance, the duration D may be defined as beginning at a time t', which may be equal to time u minus a processing delay.

Figure 21:
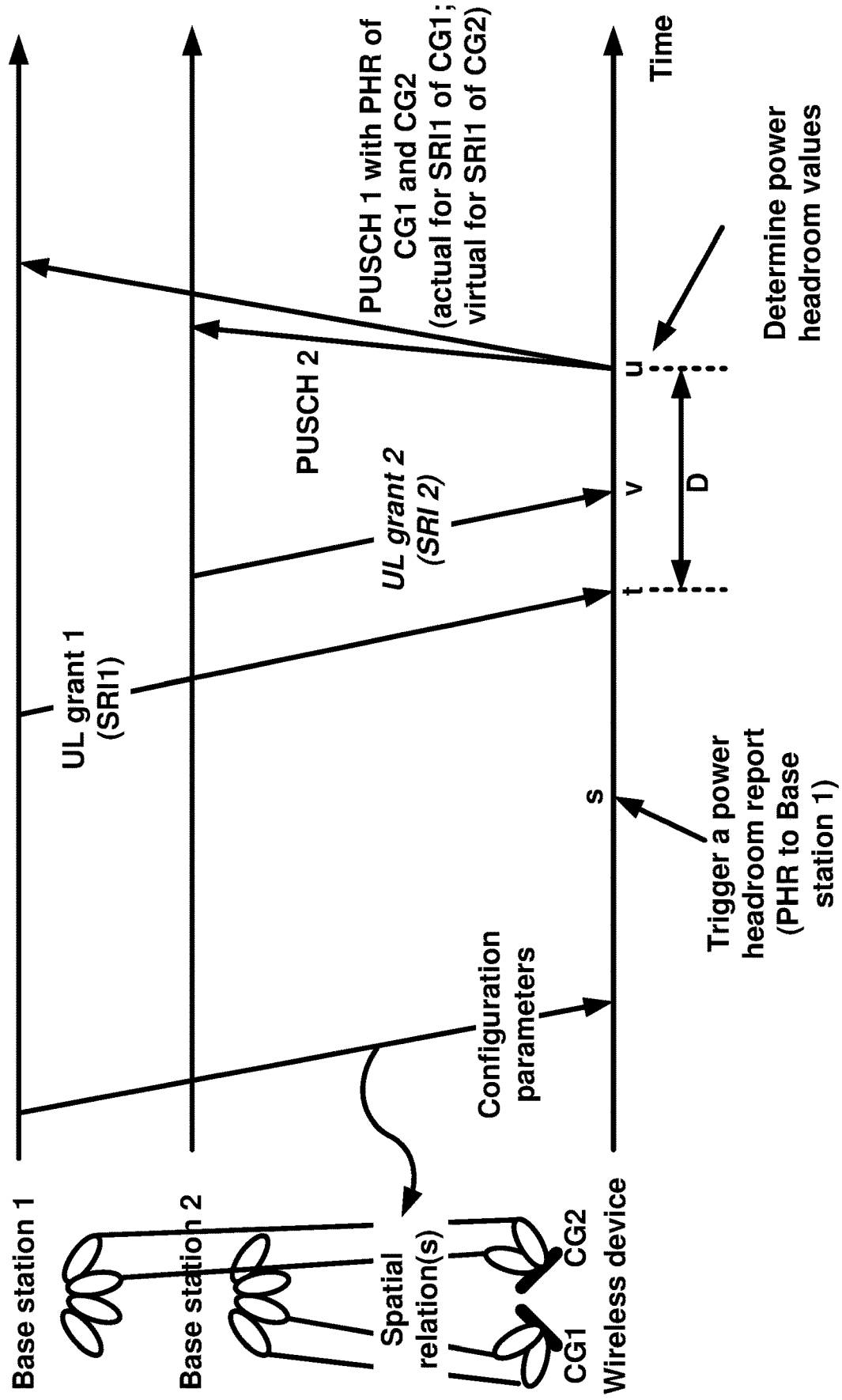
FIG. 21 illustrates a signal flow diagram for power headroom reporting as per an aspect of an example embodiment of the present disclosure.

FIG. 21 illustrates another example signal flow diagram for power headroom reporting. FIG. 21 is similar to FIG. 20 except that the uplink grant received from the second base station is received at a time v (during the duration D between time t and time u) rather than at time s (before the duration D). The wireless device may not consider an uplink grant (e.g., UL grant 2) from the second base station at time v when computing a PH value for the second cell to be reported at time u. Similar to the UL grant from the second base station depicted in FIG. 20, the UL grant from the second base station depicted in FIG. 21 may schedule a second PUSCH at a time u for the second base station. The wireless device determines a first PH value of the first cell of the first CG based on the second power control process (associated with SRI2). The first PH value may be determined based on an actual PUSCH transmission for the first cell scheduled for time u. The wireless device determines a second PH value of the second cell of the second CG based on a default power control process (for example, the lowest-indexed power control process, i.e., SRI1 in the present example). The second PH value is determined based on a reference format rather than an actual transmission. As noted above, this is because the UL grant received at the time v is during the duration D, and therefore not considered for the PHR determination. UL grant 2 received at time v indicates SRI2 and schedules transmission for time u (which overlaps with the scheduled uplink transmission to the first base station). But because UL grant 2 is received during the duration D (because time v is between time t and time u), the wireless device determines a virtual PH value based on the default SRI (SRI1 in this example).

For example, a wireless device is configured with a first cell group and a second cell group where a first processing time of the first cell group is slower than a second processing time of the second cell group. In response to a PHR trigger for the first cell group, with processing time constraint, the wireless device may not determine one or more PH values of cell(s) of the second cell group based on one or more actual transmissions (as UL grant(s) of the second group may come after an UL grant scheduling a PUSCH for the first cell group for PHR transmission). The first base station may not easily obtain the one or more PH values of cell(s) of the second cell group based on the one or more actual transmissions with different processing time between CGs. In spite of one or more configuration parameters to determine one or more PH values of cell(s) of a first CG for PHR transmission towards a second CG based on an actual transmission, a wireless device may determine the one or more PH values of cell(s) of the first CG for the PHR transmission towards the second CG based on a reference format due to a processing time restriction. In the example, the second CG may not acquire information of PH values of the first CG based on the actual transmission.

In an example, a wireless device may determine a PH value of a second cell based on a scheduling information of a most recent PUSCH, where the scheduling information is available (e.g., a UL grant is received before a duration D or a configured grant transmission time minus a processing delay occurs before the duration D). The wireless device may determine the PH value based on a past PUSCH only when one or more following conditions are satisfied. First, the wireless device is configured with an actual PH determination for a second cell group where the wireless device transmits a PHR to a first base station. Second, a processing time of the first base station is a slower than a processing time of the second base station. Third, a UL grant scheduling a PUSCH for the second cell group at a time u (when the PHR is transmitted) is not available before a duration D (e.g., before a scheduling information is available to a PUSCH with the PHR). Fourth, based on slot formation information and/or other configuration parameters, a wireless device may transmit a PUSCH to the second cell at a same time where a PUSCH with the PHR to the first base station may overlap. Fifth, a previous PUSCH may occur with a certain duration from a time u (e.g., within twice of a duration D). The wireless device may utilize a previous PUSCH of the second cell in determining an actual PH value.

Figure 22:
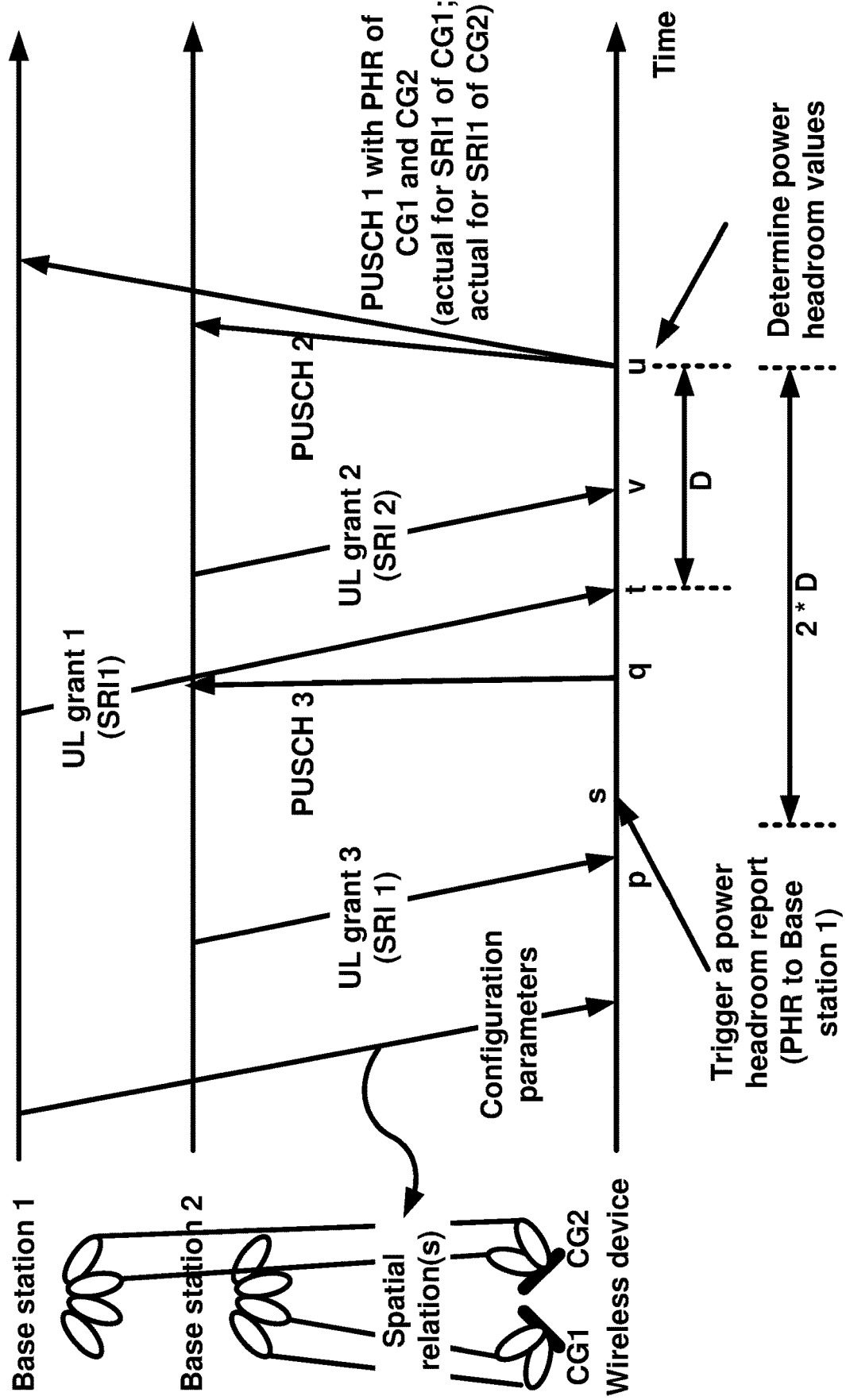
FIG. 22 illustrates a signal flow diagram as per an aspect of an example embodiment of the present disclosure.

FIG. 22 illustrates another example signal flow diagram for power headroom reporting of an embodiment. FIG. 22 is similar to FIG. 21 except that another uplink grant (UL grant 3) at a time p schedules a PUSCH (PUSCH 3) at a time q. A wireless device is triggered with a PHR to a first base station at a time s. The wireless device may determine one or more PH values and transmit a PHR on a time u to the first base station. The wireless device may determine an actual PH value of the first cell based on UL grant 1. The wireless device may determine an actual PH value of the second cell based on UL grant 3 instead of UL grant 2 as UL grant 2 is received during a duration D. The wireless device may transmit an actual PH value of a cell associated with a second base station to a first base station regardless of a processing time difference between cell groups. The wireless device may determine a PH value of the second cell based on UL grant 3. The wireless device may transmit a first PH of the first cell based on actual transmission of SRI1 and a second PH of the second cell based on actual transmission of SRI1 at a time u.

In an example, a wireless device may provide additional information to a first base station (for a first CG) in response to transmission of a PHR reporting, to the first base station, comprising one or more PH values of one or more cells of a second CG associated with a second base station. For example, a wireless device may transmit a power offset between a first power control process of a cell and a second power control process of the cell. The wireless device may transmit the power offset with a PH value of the cell where the PH value is determined based on either the first power control process or the second power control process. The wireless device may transmit a power offset of the second power control process compared to the first power control process.

In an example, a wireless device may transmit a power offset when one or more conditions are met for a cell. For example, a condition is when the second power control process is mainly associated with a fast processing compared to the first power control process. A condition is when the wireless device may transmit a PHR to a first base station comprising a PH for a cell of a second base station. The wireless device may transmit a power offset for the cell of the second base station. The wireless device may not transmit a power offset for another cell of the second base station. A condition is when a gap between a first accumulated power of the first power control process and a second accumulated power of the second power control is larger than a threshold value (e.g., 6 dB).

A power offset of a cell may provide additional information of the second power control process in case the second power control process operates with a faster processing time. With a faster processing time of the second power control process, a wireless device may receive a second UL grant scheduling a second PUSCH during a processing time duration between a time of receiving a first UL grant scheduling a first PUSCH and a time to transmit the first PUSCH that carries a PHR. The wireless device may not consider the second UL grant with a processing time constraint for an actual PH of the cell. The wireless device may determine a PH value of the cell based on a reference format (e.g., a virtual PH). When the wireless device may determine a PHR based on a reference format, the wireless device may use a default power control process (e.g., a first power control process). In that case, the wireless device may not provide a PHR related to the second power control process either based on an actual transmission or based on a reference format. Thus, a base station may not receive a PH of the second power control process. In such a case, the wireless device may transmit additional information regarding the second power control process to inform potential power headroom of the second power control process. In an example, when a wireless device is configured with a plurality of pathloss reference signals (RSs), the wireless device may indicate a gap between a first pathloss RS and a second pathloss RS. A base station may send an inquiry message. The wireless device may transmit one or more gap values in response to the inquiry. In an example, the wireless device may transmit a PHR in response to detecting a gap between a first pathloss RS and a second pathloss RS becomes larger than a threshold.

Embodiments mentioned in the specification may be applied to a scenario of carrier aggregation with a single cell group. Embodiments mentioned in the specification may be applied to a scenario of a single carrier or a carrier aggregation with a multi-TRP operation.

In an example, a wireless device may determine a power offset between two power control processes of a cell based on virtual PH values. The wireless device may determine a first PH value based on a reference format based on a first power control process. The wireless device may determine a second PH value based on a reference format based on a second power control process. The wireless device may determine a power offset or a PH value offset based on the first and the second PH values. A power offset, when one or more parameters are same between the first power control process and the second power control process, may represent a difference between a first accumulated TPC value of the first power control process and a second accumulated TPC value of the second power control process. In an example, a wireless device may determine a power offset based on a first PH value of a first power control process and a second PH value of a second power control process based on a reference format. In an example, a wireless device may determine a power offset based on a first PH value of a first power control process and a second PH value of a second power control process based on an actual transmission. The power offset may be determined in a different time from when the wireless device may determine a PH value of the cell. Transmitting an offset may reduce overhead in delivering the information compared to transmitting another PH value corresponding to the second power control process.

Figure 23:
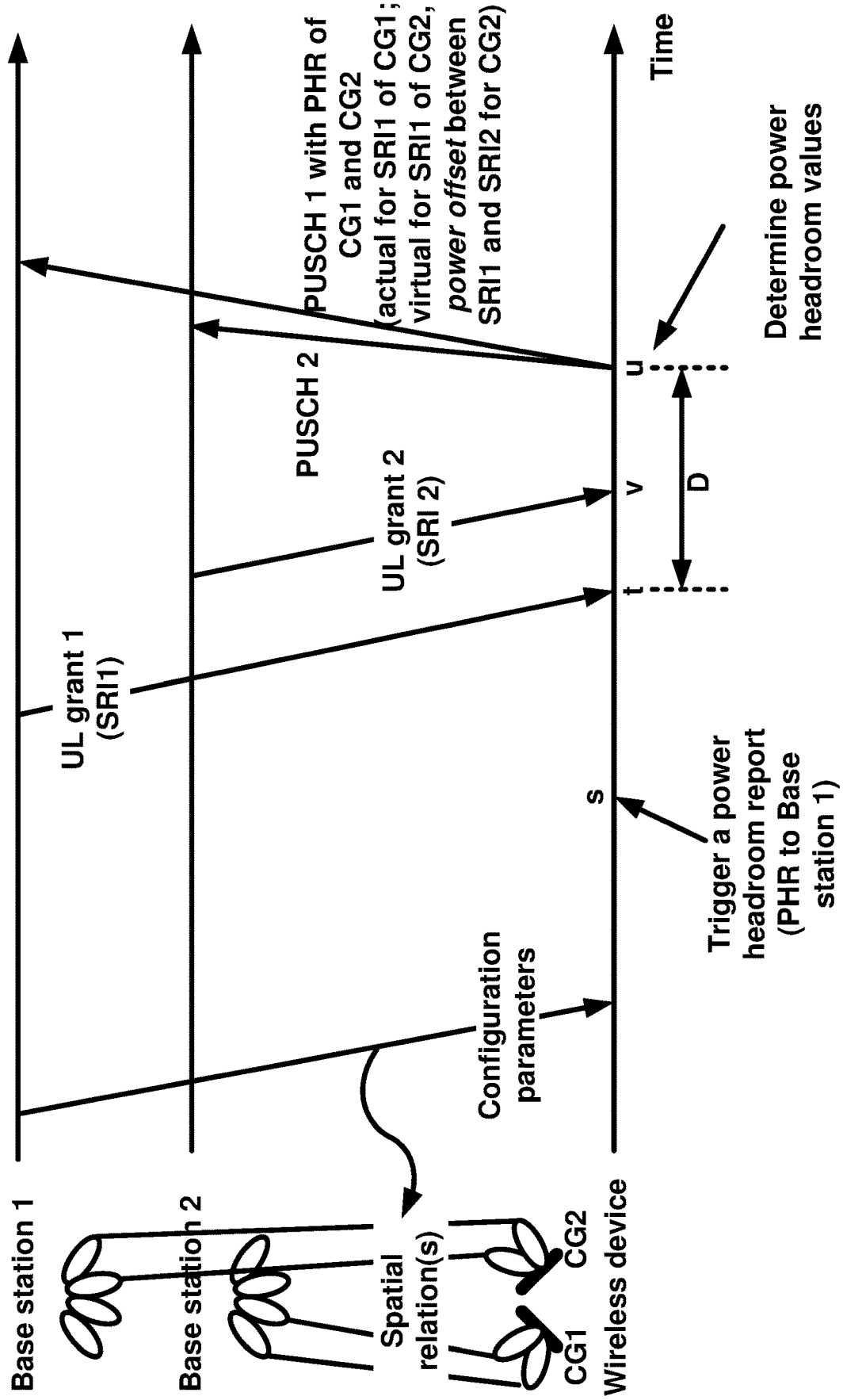
FIG. 23 illustrates a signal flow diagram as per an aspect of an example embodiment of the present disclosure.

FIG. 23 illustrates an example. A scenario described in FIG. 23 is a similar scenario to that in FIG. 21. In response to determining a PHR report of one or more cells of a first cell group and a second cell group, a wireless device transmits a PHR report to a first base station at a time u. The wireless device may transmit, along with the PHR report, a power offset that is a difference between a first power control process associated with SRI=1 and a second power control process associated with SRI=2. The wireless device may transmit the power offset of a second cell of a second CG, when the wireless device transmits a PHR to a first base station. The wireless device may transmit a power offset of a first cell of a first CG, when the wireless device transmits a PHR to a second base station. At a time u, the wireless device may transmit a PUSCH with PHR containing a first PH of the first cell and a second PH of the second cell. In addition to the second PH, the wireless device transmits a power offset for the second cell.

A power offset of a cell may be determined when a wireless device is configured with more than one power control processes in the cell. In an example, a wireless device may transmit additional information such as a power offset when one or more conditions are met. For example, a wireless device may transmit a power offset of a cell when the wireless device determines a PH value of the cell of a first CG, where a PHR is triggered for a second CG. When the wireless device is not configured with a second CG (e.g., no dual connectivity scenario), or when the wireless device is not configured with a cell with more than one power control processes that belong to a different cell group from a cell group for a PHR reporting, the wireless device may not determine nor report the power offset in a PHR report.

(Default Pathloss→Take a Highest Pathloss for the Other CG)

In an example, a wireless device may transmit a power offset of a cell of a first CG, in response to transmitting a PHR report to a second CG, when the cell of the first CG is configured with more than one power control processes, and a processing time of the first CG or the cell of the first CG is faster than a processing time of the second CG (or a cell of the second CG where the PHR report is transmitted). If more than one processing time are supported for the cell of the first CG, a fastest processing time may be used to determine the condition. In an example, a wireless device may transmit a power offset when a second base station may transmit one or more radio resource control messages indicating that the wireless device needs to transmit a power offset for a cell of a first CG when a PHR is reported to the second base station/the second cell group. Based on the configuration from the second base station for PHR reporting, the wireless device may transmit a power offset for a cell. In an example, a wireless device may be configured by a base station regardless of a dual connectivity to transmit a power offset between a first power control process and a second power control process of a cell when there are more than one power control processes associated with the cell.

In an example, a wireless device may transmit a power offset of a cell based on a value of the power offset between a first power control process and a second power control process. For example, if the power offset is greater than a threshold, the wireless device may transmit the power offset in a PHR report. Otherwise, the wireless device may not transmit the power offset in the PHR report. The threshold value may be determined based on a preconfigured value or based on one or more RRC messages from a first base station and/or a second base station. In an example, a wireless device may transmit a power offset of a cell when the wireless device may support more than one service types in the cell or the wireless device may support more than one priority levels in the cell. When the wireless device supports a mixed type of services, power control processes may be operated to be associated with different services. In an example, a wireless device may transmit a power offset of a cell when the wireless device may support a sidelink operation (e.g., for supporting a UE-to-UE direct communication) in the cell or in a same frequency to the cell. For example, the wireless device may maintain one or more first power control processes for supporting uplink transmissions to a base station. The wireless device may maintain one or more second power control processes for supporting sidelink operation where a power used for the sidelink operation may or may not be available/known to the base station. To inform a potential sidelink operation in a same frequency to the cell, the wireless device may inform a power offset between a power control process for an uplink transmission to the base station and a power control process for a sidelink operation. There is a possibility that a sidelink operation may not occur at a same time to an uplink transmission to a base station in a same cell or in a same frequency. In that case, an individual value of a PHR for a sidelink may be transmitted instead.

In existing mechanism of a sidelink operation, a wireless device may determine a transmission power of a sidelink transmission based on an allowed UE maximum power, one or more sidelink power control parameters, and a pathloss to a base station. The wireless device may consider the pathloss to the base station when the wireless device is connected to the base station. The wireless device may transmit a second power headroom for a sidelink operation of a cell in addition to a first power headroom for an uplink operation of the cell. In an example, the wireless device may trigger and maintain a second power headroom process for the sidelink operation separately from a first power headroom process for the uplink operation. This may lead increased wireless device complexity and may increase power headroom reporting overhead.

In an example, a wireless device may report either a first PH of a sidelink transmission of a cell or a second PH of an uplink transmission of the cell. For example, the wireless device may report a PHR reporting that may comprise one or more power headroom (PH) values of one or more cells. The one or more cells may comprise a first cell. For example, the wireless device may operate uplink and sidelink simultaneously via the first cell. The wireless device may maintain a single power headroom reporting (PHR) process for the first cell regardless of the sidelink operation via the first cell. The wireless device may select a first PH value based on an uplink transmission or a second PH value based on a sidelink transmission for the first cell. The wireless device may transmit a PHR comprising the selected PH value for the first cell. This may reduce a wireless device complexity by reducing a number of PHR processes for supporting sidelink and uplink. The wireless device may inform/indicate whether the first PH is selected or the second PH is selected via the PHR. For example, the wireless device may set to 1 of a reserved bit of a PHR MAC CE format for the second PH value. The wireless device may set to 0 of the reserved bit of the PHR MAC CE format for the first PH value. This may reduce a PHR overhead by limiting a single PH value for a single cell regardless of simultaneous sidelink and uplink operation via the single cell.

In an example, a base station may enable/configure/indicate a mode 1 operation for a sidelink operation or a wireless device may determine a mode 2 operation for the sidelink operation. Based on the mode 1 operation, the base station may transmit DCI(s) comprising resource assignments for sidelink transmissions. The wireless device may receive scheduling information via the DCI(s) and may transmit the sidelink transmissions based on the resource assignments. Based on the mode 2 operation, the wireless device may determine resources without receiving DCI(s) from the base station. The wireless device may determine the resources based on sensing/monitoring shared resources with other wireless devices.

When a mode 1 operation is used, the base station may be aware of resources allocated to the wireless device for the sidelink transmission. A PH value of a cell, where the sidelink transmissions may occur, based on an actual transmission or based on a scheduled resource for a sidelink transmission of the sidelink transmissions may be beneficial with the mode 1 operation as the base station is aware of the scheduled resource. When a mode 2 operation is used, the base station may not be aware of resources determined by the wireless device for the sidelink transmissions. The PH value of the cell based on the actual transmission or based on the scheduled resource for the sidelink transmission may lead inaccurate estimation of remained power for the base station as the base station may not aware the scheduled resource. For example, when the scheduled resource comprises a large number of RBs, even with small pathloss, a small PH may be determined. Thus, the small PH may not indicate a large pathloss. For example, when the scheduled resource comprises a small number of RBs, a small PH may be related to a large pathloss.

There is a need to determine a PH of a sidelink transmission differently based on whether a mode 1 operation is enabled or a mode 2 operation is enabled. For example, based on a mode of sidelink operation, the wireless device may need to transmit a PH based on an actual transmission (e.g., mode 1) or based on a reference format (e.g., mode 2). In an example, the base station may configure a PH determination mechanism either based on the actual or the reference format. The base station may determine the PH determination mechanism based on the mode of the sidelink operation. In an example, the wireless device may determine the PH determination mechanism based on the mode of the sidelink operation. This may allow efficient PH report of a sidelink operation with reduced wireless device complexity.

In an example, a wireless device may transmit a second PH value for a sidelink operation in addition to a first PH value for an uplink transmission in a cell. A transmission by a wireless device targeting a base station may be referred as an uplink transmission. A transmission by a wireless device targeting another wireless device may be referred as a sidelink transmission. A wireless device may transmit one or more PH values for one or more sidelink frequencies/cells where the wireless device may transmit one or more sidelink data/control/discovery channels. A base station may transmit one or more RRC messages indicating an actual PH or a virtual PH used for a sidelink channel/frequency/cell or for a sidelink PH in general. A wireless device may operate a sidelink based on a scheduling from the base station (e.g., mode 1 operation). The wireless device may operate a sidelink based on autonomous scheduling by the wireless device (e.g., mode 2 operation). The base station may configure one or more parameters comprising:

- a PH determination mechanism (e.g., between actual and virtual);
- a PH computation on only mode 1 resource, only on mode 2 resource or both mode 1 and 2 resources; and
- a PH computation on only PSSCH (physical sidelink shared channel), for PSCCH (physical sidelink control channel) and PSSCH, for PSSCH and PSDCH (physical sidelink discovery channel).

When a wireless device is configured with a PH computation on only mode 1 resource for a sidelink PH, the wireless device may determine a PH value based on an actual transmission only when there is a sidelink transmission on a mode 1 resource. The wireless device may determine a PH value based on a reference format only when there is a mode 1 resource configured in a slot or a resource where a PUSCH with a PHR is transmitted. Similarly, when the configuration indicates a mode 2 resource only, the wireless device may determine a PH value based on only mode 2 resources. When the configuration indicates both mode 1 and mode 2 resources, the wireless device may determine a PH of a sidelink operation based on either mode 1 or mode 2 resource. When a wireless device may support other mode(s), similar configuration parameters (such as only mode 3) may be considered.

The base station may also indicate one or more sidelink channels or one or more PH types for a sidelink operation to inform a PH value. For example, the base station may configure to determine a PH value based on a shared data channel only (e.g., PSSCH only). The wireless device may determine a PH based on one or more power parameters related to PSSCH. The wireless device may determine a PH value based on an actual PSSCH when the wireless device transmits PSSCH. Otherwise, the wireless device may determine the PH value based on a reference format. When the base station configures PSSCH or PSDCH, the wireless device may determine a PH value based on an actual when the wireless device transmits either PSSCH or PSDCH. Otherwise, the wireless device may determine the PH value based on a reference format, for example based on power control parameters for a PSSCH.

A wireless device may be configured with an allowed power separately for a resource pool for a sidelink operation. The wireless device may be configured with a plurality of resource pools in a cell/carrier/frequency for a sidelink operation. The wireless device may inform a maximum UE power for the sidelink operation in the cell/carrier/frequency when the wireless device informs a PH value based on an actual transmission. The base station may configure a resource pool used for a sidelink PH determination. When a wireless device determines a PH value based on a reference format, the wireless device may use one or more power control parameters associated with a default resource pool. For example, the default resource pool may be a resource pool associated with a highest priority index (and a lowest index among the same priority resource pools), a lowest indexed resource pool, a lowest index resource pool associated with a mode 1 operation, an indicated resource pool by a base station, and/or the like.

If the wireless device determines a PH value for a sidelink operation based on an actual transmission, the wireless device may determine the PH value based on an actual sidelink control/data channel transmission overlapping with a slot where a PHR report is performed. When the wireless device determines a PH value for a sidelink operation based on a reference format, the wireless device may determine the PH value based on one or more preconfigured/configured parameters regarding power control and/or resource allocation. In an example, a wireless device may transmit a PH value for a sidelink operation of a cell/a frequency or for a resource pool of a cell/a frequency or for a cell or for a frequency when at least one resource pool in that frequency or in the cell is associated with a priority level which may be higher than a normal priority of an uplink transmission to a base station. The wireless device may reduce a power on one or more uplink transmissions to the base station when a sum of allocated powers on multiple transmissions may exceed an allowed power. The wireless device may transmit a PH value related to a sidelink operation when there is a chance that the wireless device may reduce/impact a power of one or more uplink transmissions to a base station. For a sidelink operation with lower priority than uplink transmissions to the base station may not be reported in a PHR report.

In an example, a wireless device may determine a first power headroom (PH) type to determine a power headroom value for a PUSCH. The wireless device may determine a second PH type to determine a power headroom value for a sidelink transmission (e.g., PSSCH, PSCCH, PSDCH). The wireless device may determine the second PH type for a sidelink channel based on either a PSSCH or a PSDCH when the wireless device determines the second PH type PH value based on an actual transmission. When a wireless device may not transmit a sidelink channel and an uplink channel at a same time in a same uplink cell, the wireless device may determine a PH value for the uplink cell based on the second type PH or the first type PH or a third type PH. The wireless device may use the third type PH for determining a power headroom value based on an SRS transmission.

In an example, a wireless device may determine a second PH type PHR for a cell, which may be activated or deactivated, but it is configured, based on an actual PSSCH transmission for PSSCH (Physical sidelink shared channel) transmission occasion i on a UL carrier b of a cell c, the wireless device may compute the second PH type PHR as {allowed power on the UL carrier b of the cell c—allocated power on an actual PSSCH or PSDCH}. The wireless device may activate the second PH type PHR (e.g., transmit the second PH type PH in a PHR) when the wireless device may transmit a sidelink channel in a cell/carrier/frequency that overlaps with a PUSCH conveying the PHR. The wireless device may deactivate the second PH type PHR (e.g., skip transmission of the second PH type PH in the PHR) otherwise.

The wireless device may not consider a UL grant or a sidelink control channel for a PHR determination within a threshold from a time where the PHR is transmitted. For example, the threshold may represent a processing time of a PHR determination and uplink channel preparation.

In an example, when a wireless device may not have any actual PSSCH or PSDCH in a carrier of a cell, the wireless device may determine the second PH type based on a reference format. To determine a PHR based on a reference format, the wireless device may assume default parameters for power control parameters similar as to a PH value of a first type PH determination based on a PUSCH. When a wireless device may have a plurality of power control processes for a sidelink operation in a cell/carrier/frequency, a default power control process or default power control parameters may be selected. For example, a lowest indexed power control process may be selected as the default. For example, a power control process associated with a lowest indexed resource pool may be selected as the default. For example, a power control process associated with a mode 1 (or a mode 2) with a lowest indexed resource pool may be selected as the default. For example, a power control process associated with highest priority resource pool(s) where a collision may be handled by an index (e.g., select a lowest indexed resource pool) may be selected as the default.

In an example, when a wireless device may transmit a PH value of a cell based on the second PH type, the wireless device may utilize a reserved bit in a PHR MAC CE to indicate whether the PH value is based on a PUSCH/SRS or based on a PSSCH/PSDCH. For example, one of two reserved bits with PCmax,c entry in a PHR MAC CE (e.g., 'R, R, $P_{CMAX,f,c}1$' in FIG. 17) may be used for indicating whether the value is based on a sidelink operation or based on a Uu communication (e.g., between a base station and a wireless device). FIG. 24A and FIG. 24B illustrate the example. FIG. 24A illustrates a MAC CE format for a PHR for one or more carriers where a number of configured carriers is not more than 8. A base station may know whether there is a sidelink operation in a carrier among one or more configured carriers based on a wireless device feedback (e.g., a wireless device may transmission an intention of a sidelink operation in a carrier/cell/frequency) and/or based on sidelink related configurations. As a PH value based on a sidelink channel may be transmitted only when a PHR based on an actual transmission is used, when a PH value based on a sidelink operation is reported for a cell, there will be a $P_{CMAX,c}$ (e.g., a determined allowed/maximum power of the cell c) value reported for the cell. The wireless device may use a first or second reserved bit in the entry carrying $P_{CMAX,c}$. For example, when a wireless device may perform a sidelink operation in a PCell and a serving cell 1, a second reserved bit along with PCmax,c of the PCell or the serving cell 1 may indicate whether a PHR is based on a Uu channel or a sidelink channel. For a cell where a sidelink operation may not occur, there is no reason to have an indication as the wireless device may not determine a PH for a sidelink operation for the cell.

Similarly, when there are more than 8 cells configured, a MAC CE format illustrated in FIG. 24B may be used. 'S' field (utilizing one or reserved bit for a PH entry based on an actual transmission) may be used to indicate whether a reported PH value is based on a PUSCH or based on a PSSCH/PSDCH or a sidelink channel. A base station may configure one or more cells where a wireless device may determine a PH value based on a sidelink channel. The base station may configure one or more cells where a wireless device may report a PH value based on a sidelink channel, for a cell from the one or more cells, under one or more conditions. $P_{CMAX}$ X in figures (e.g., FIG. 24A and FIG. 24B) may represent an allowed maximum power (e.g., a determined allowed power, a determined maximum power) at a cell X. The allowed maximum power may be determined based on one or more power control parameters and MPR value(s).

When a wireless device may transmit a first uplink channel in a first uplink carrier of a cell and a second sidelink channel in a second uplink carrier of the cell (e.g., the cell is associated with a UL carrier and supplemental UL carrier), the wireless device may determine a first PH value corresponding to the first uplink carrier and a second PH value corresponding to the second uplink carrier. The wireless device may select a PH value between the first PH value and the second PH value for the cell based on one or more conditions. For example, the wireless device may transmit the first PH value when the first PH value is determined based on an actual transmission and the second PH value is determined based on a reference format. For example, the wireless device may select the first PH when both PH values are based on a reference format. The wireless device may transmit the first PH value in response the first PH value is based on a reference format and the second PH value is based on a reference format. For example, the wireless device may select a PH value based on a priority associated with an actual transmission when both PH values are determined based on an actual transmission. The wireless device may transmit the first PH value when the first PH value is based on an actual format, the second PH value is based on an actual format, and a priority level of a first uplink channel of the first uplink carrier may be equal to or higher than that of a second sidelink channel of the second uplink carrier. In other cases, the wireless device may transmit the second PH value. The wireless device may transmit a PH based on an actual sidelink transmission with setting 'S' bit to 1 along with a determined maximum power for the sidelink operation in a cell.

In FIG. 24A or FIG. 24B, 'S' bit may represent 0 to inform 'A' (e.g., A is an indication of a PH of a Uu transmission) or 'B' (e.g., B is an indication of a PH of a sidelink transmission). The 'S' bit may be present only when 'V' bit (a PH mode indicator) for a given cell indicates an actual PH.

In an example, a wireless device may determine a PH value for a cell or a frequency or a sidelink channel or a sidelink cell. The wireless device may transmit the PH value for the cell for sidelink operation. The wireless device may add the PH value to one or more PH values of activated uplink cells by the network for Uu communication. For example, a wireless device may support a single cell or a single frequency or a single sidelink channel or a single sidelink cell at a time. The wireless device may additionally transmit a PH value of the single cell or the single frequency or the single sidelink channel or the single sidelink cell in addition to one or more PH values for cells associated/ activated by a base station. FIG. 25A and FIG. 25B illustrate a MAC CE format used for reporting one or more PH values for one or more activated cells and additionally a PH value of a sidelink operation in a single cell/frequency/channel. A wireless device may transmit one or more radio resource control messages indicating the single cell/frequency/channel where the sidelink operation may occur. A base station may transmit one or more radio resource control messages configuring the single cell/frequency/channel for a PHR based on a sidelink channel. A PH type based on a sidelink channel may be represented as 'Type4'. A PH value, and additionally a $P_{CMAX}$ X value if the PH value is based on an actual transmission may be transmitted in a last part of a MAC CE for a PHR transmission. For example, a 'P' bit and 'V' bit appended represent a same functionality to 'P' bit and 'V' bit of a Uu PH entry (e.g., same purpose as to 'P' and 'V' of the PH (Type 1, PCell)). 'R' may represent 'reserved'. PH (Type 4, Cell X) represents that a PH value of a cell X based on a PH type 'Type 4'. In the specification, '$P_{CMAC,f,c}X$' and '$P_{CMAX}X$' are interchangeably used. In FIG. 25A and FIG. 25B, an entry of a sidelink shown in dotted pattern is added for a PH value of a sidelink cell/carrier/frequency in each MAC CE format.

A wireless device may transmit a single PH value of a sidelink even when the wireless device may operate a sidelink in a plurality of cells. In an example, a wireless device may operate sidelink in one or more cells/carriers/ frequencies/sidelink channels/sidelink cells/sidelink carriers. A base station may select a single cell/carrier/frequency/ sidelink channel/sidelink cell/sidelink carrier for a PHR. The base station may transmit one or more radio resource control messages comprising parameters to indicate the single selected cell/carrier/frequency/sidelink channel/sidelink cell/sidelink carrier.

Figure 26:
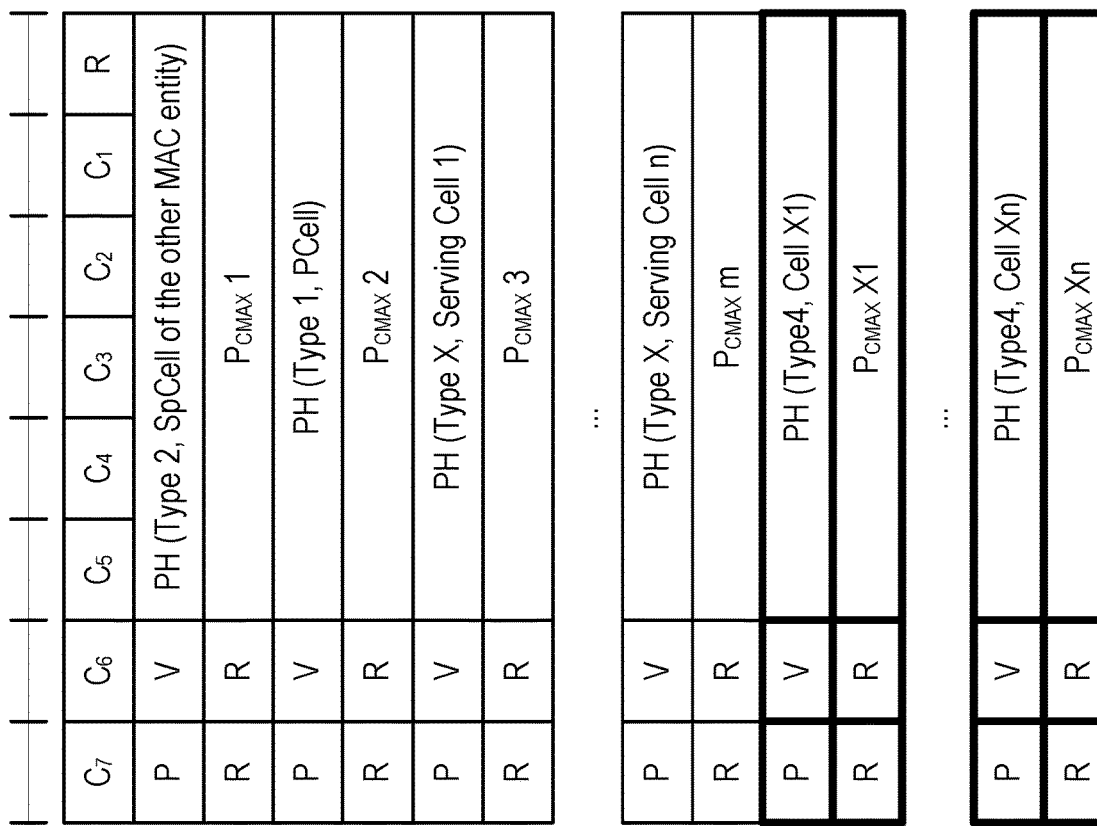
FIG. 26 illustrates a MAC CE format as per an aspect of an example embodiment of the present disclosure.

Another example is to have one or more PH entries for sidelink operation. A number of PH entries that a wireless device may report may be determined based on a number of sidelink cells/carriers that the wireless device is operating or may be determined based on one or more RRC messages from a base station. A list of cells and a number of PH entries where each cell may correspond to each entry of the configured PH entries may be additionally indicated by the base station. The list of cells may be determined by a wireless device and the wireless device may send one or more RRC messages informing the mapping. A number of PH entries may be placed after one or more PH entries for a Uu communication/activated cells as shown in FIG. 26. FIG. 26 illustrates an example of a MAC CE format based on FIG. 17A. At the end of PH values of Uu, the wireless device may append one or more PH values corresponding to the list of cells for the sidelink operation. The 'P' and 'V' bit are operated in a same manner to 'P' and 'V' bit for a PH entry of a Uu communication. PH (Type 4, Cell X1) may represent a PH value of Cell X1 based on a PH type 'Type 4'. The PH type 'Type4' may be used to determine a PH value for a sidelink operation. 'Type 4' may be replaced by another type or a name that is used for a PH determination for one or more sidelink channels. $P_{CMAX}$ X1 may be present when a corresponding PH value is determined based on an actual transmission. In a sidelink PH report, a wireless device may not transmit $P_{CMAX}$ X1 regardless the PH is computed based on an actual (e.g. a real transmission) transmission or a reference format.

In an example, a wireless device may determine a PHR for a cell of a second base station based on an actual transmission based on one or more parameters configured for PHR determination. The wireless device may maintain more than one power control processes for the cell. When the wireless device determines a PHR for the cell based on an actual transmission, depending on which power control process is selected for the actual transmission, a determined PH value may be different with a same scheduling information and a same pathloss. For example, a different power control process may have a different accumulated power. For example, a different power control process or a different SRI may be associated with a different pathloss. For example, a different power control process may be associated with a different set of power control parameters.

Figure 27:
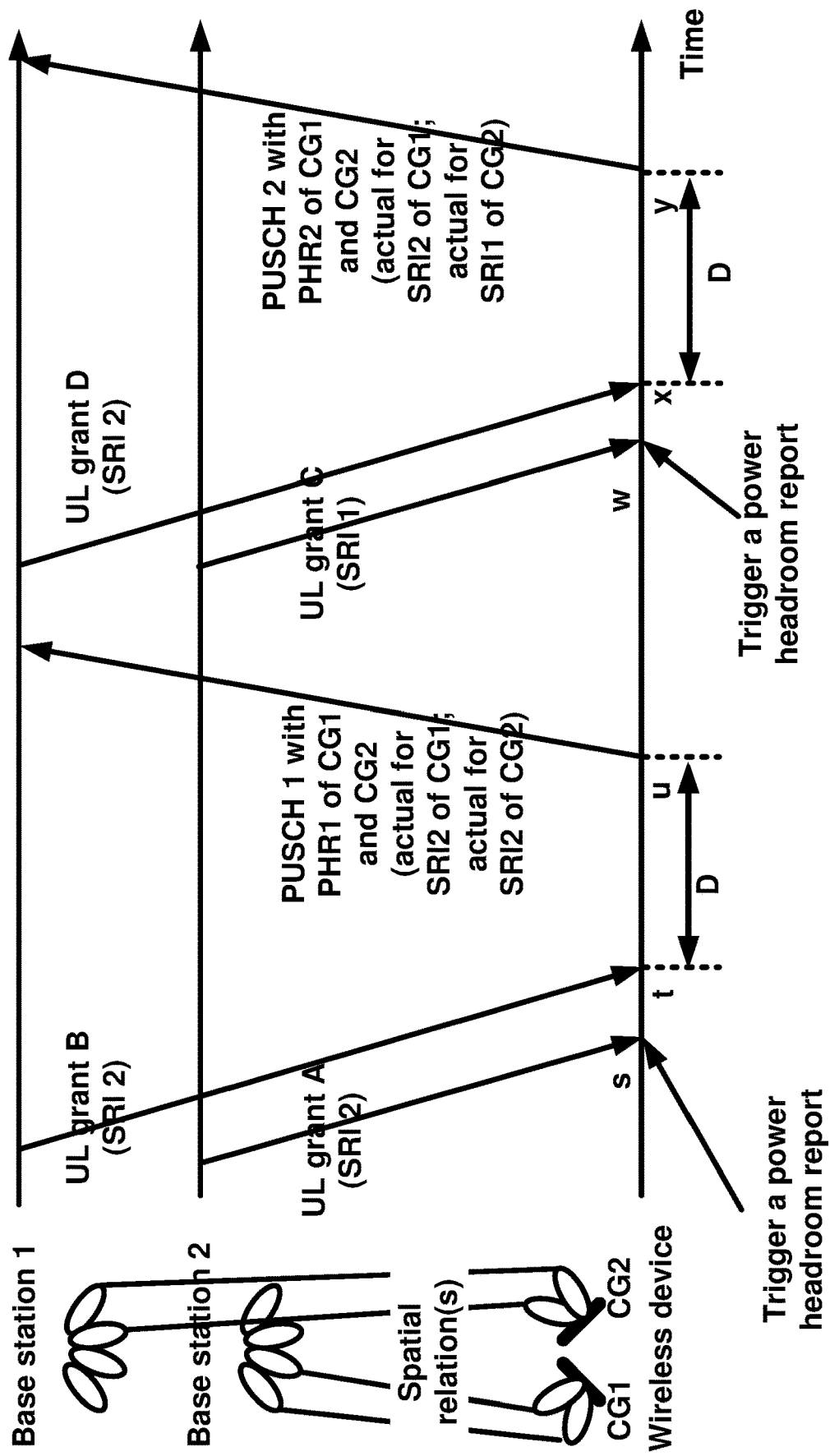
FIG. 27 is a signal flow diagram for power headroom reporting as per an aspect of an example embodiment of the present disclosure.

FIG. 27 illustrates an example of an actual PH scenario. A wireless device is configured with a dual connectivity scenario similar as in FIG. 20 and FIG. 21. In the example, the wireless device is triggered with a first PHR reporting at a time s and a second PHR reporting at a time w towards a first base station (e.g., Base station 1). In response to the PHR trigger at the time s, the wireless device determines a first PH value of a first cell based on an UL grant (UL grant B) received at a time t. The wireless device determines a second PH value of the second cell based on an UL grant received prior to the time t (e.g., UL grant (UL grant A) received at the time s). The UL grant A indicates SRI=2 that is associated with a second power control process of the second cell. The wireless device determines the PH value of the second cell based on the second power control process for the PHR at a time u. The wireless device transmits a first PH value of a first cell based on SRI=2 (associated with a second power control process of the first cell) and the second PH value of the second cell based on the second power control process at the time u. The wireless device is triggered with the second PHR reporting at the time w. The wireless device determines a second PH value of the second cell based on a first power control process that is associated with SRI=1 at the time x. The wireless device transmits a first PH value of a first cell based on SRI=2 (associated with the second power control process of the first cell) and the second PH value of the second cell based on the first power control process of the second cell at a time y.

The first base station (e.g., Base station 1) receives PHR1 comprising a first PH value of the second cell based on a second power control process of the second cell at the time u. The first base station receives PHR2 comprising a second PH value of the second cell based on a first power control process of the second cell at the time y. Without scheduling information of the second cell, the first base station may not differentiate one or more reasons (e.g., pathloss change, a power change, power control process change) of differences between the first PH and the second PH value of the second cell.

Figure 28:
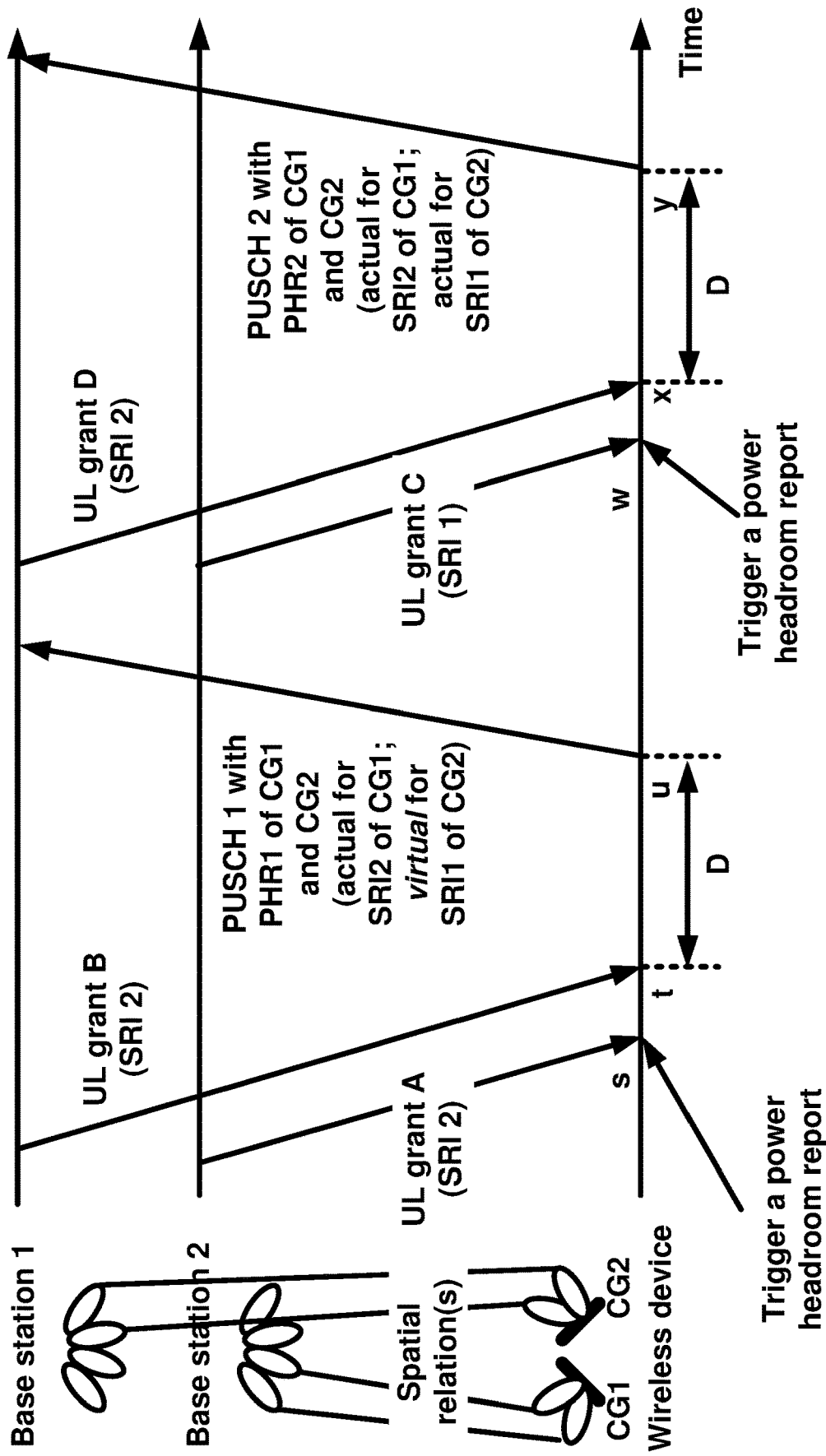
FIG. 28 is a signal flow diagram as per an aspect of an example embodiment of the present disclosure.

In an example, a wireless device may use a fixed/single power control process in determining a PH value for a cell of a second CG/base station when the wireless device is triggered a PHR for a first base station. The wireless device may transmit a PH of a cell based on an actual transmission only when the actual transmission is scheduled with a SRI associated with the fixed/single power control process. The wireless device may determine a PH of the cell based on a reference format otherwise. FIG. 28 illustrates an example. FIG. 28 is similar to FIG. 27 except that a wireless device may determine a PH of a second cell based on a first power control of SRI1 for a first PHR report (PHR1). In determining a PHR for the second cell of the second base station, the wireless device determines an actual PH of the second cell based on a UL grant or a configured grant (e.g., actual PH) indicating the first power control process. The wireless device determines a virtual PH when a UL grant or a configured grant may indicate another power control process than a first power control process or when the wireless device has not been scheduled. At a time t, the wireless device may not consider an UL grant received at a time s as the UL grant (UL grant A) schedules an uplink transmission with SRI=2 that is associated with the second power control process. The wireless device determines the PHR for the second cell of the second cell group based on a reference format based on the first power control process for the PHR reporting at a time u. PHR1 thus includes a PHR for the first cell based on an actual transmission (e.g., based on UL grant at a time t) and a PHR for the second cell based on a reference format (e.g., based on the first power control process).

The wireless device may determine PH values for both cells based on actual transmissions at a time x as an UL grant at a time w schedules an uplink associated with a first power control process (SRI=1 is associated with the first power control process). PHR2 includes a PHR for the first cell based on an actual transmission (e.g., based on UL grant D at a time x) and a PHR for the second cell based on an actual transmission (e.g., based on UL grant C at a time w). A first base station may configure a power control process index that will be used to determine a PHR based on an actual transmission for a second base station in reporting a PHR to the first base station. Similarly, a first base station and/or a second base station may configure a power control index for a cell used in a PHR reporting for another base station.

A wireless device may determine a fixed/single power control process by selecting a lowest indexed power control process for a cell, or a power control process associated with a lowest SRI index for a cell in determining a PH based on an actual transmission. For example, a PHR determination based on an actual transmission with a specific/fixed/single power control process may be applied to a PHR determination of a cell of a second cell group when a wireless device is triggered with a PHR for a first cell group or a base station of the first cell group. In the example, the wireless device may determine a PH value of a first cell based on an indicated power control process by a scheduling information when the first cell is associated with the first base station/first cell group.

In an example, a first base station may transmit one or more radio control resource messages comprising one or more parameters indicating an index of power control process that is used for PHR computation of one or more cells associated with a second base station in a dual connectivity scenario. The one or more parameters may indicate to use any power control process based on actual transmission/scheduling when a PHR determination on the other cell group/the other base station is determined based on an actual transmission. When a wireless device has not received the one or more parameters, the wireless device may assume that a power control process indicated in a DCI or based on a configured grant configuration used in an actual transmission for a PHR determination is used.

In an example, a wireless device may determine a PH value of a second cell associated with a second base station based on an actual transmission of a first power control process of the second cell in one or more conditions. In other cases, the wireless device may determine a PH value of the second cell based on an actual transmission regardless of a power control process indicated by a scheduling DCI or by a configured grant configuration. One or more conditions specified in the specification to determine whether to transmit a power offset additionally may be applied to determine whether to use a specific power control process or not for a PHR determination based on an actual transmission. For example, a condition may be met when a gap between a first accumulated power of a first power control process and a second accumulated power of a second power control process is larger than a threshold. For example, a condition may comprise a case where a gap is a first PH value based on a first power control of a cell and a second PHR vale based on a second power control of the cell is larger than a value/threshold. For example, a condition may comprise a case where a first processing time associated with a first power control is different from a second processing time associated with a second power control process. A similar mechanism may be used for a PHR determination of a second cell of a second base station for a PHR reporting towards a first base station when the PHR determination is configured to be determined based on a reference format.

In an example, a wireless device may be associated with more than one transmission and reception point (TRP) in a given cell. For example, a wireless device is associated with a first TRP and a second TRP. The wireless device is configured with one or more first cells associated with the first TRP. The wireless device is configured with one or more second cells associated with the second TRP. The one or more first cells may be same as the one or more second cells. The one or more first cells may be different or a superset or a subset of the one or more second cells. The one or more first cells may be partially overlapped with the one or more second cells. The wireless device may support up to K TRPs (e.g., K=2) in a cell group. The wireless device may support up to K TRPs across cell groups. A base station may have one or more TRPs. A first base station and a second base station may not share a TRP. When a wireless device supports up to 2 TRPs, if the wireless device is configured with a dual connectivity of two base stations, the wireless device may assume that there is a TRP in each cell group or by each base station.

In an example, a wireless device may be configured with a PUCCH cell group using a dual connectivity framework. The wireless device may be configured with more than one TRPs and a PUCCH cell group.

In an example, a wireless device may be configured with a dual connectivity via a first base station and a second base station. The wireless device may be configured with more than one TRPs in a cell group where TRPs of the cell group may be communicated via ideal backhaul. In an example, if a wireless device is associated with a first TRP and a second TRP where the first TRP and the second TRP may communicate via non-ideal backhaul or via a latency backhaul, the wireless device may utilize a dual connectivity framework across TRPs. In the example, the wireless device may not expect that a dual connectivity and a multi-TRP operation are configured simultaneously. In response to configuration of a multi-TRP scenario, the wireless device may assume a dual connectivity is not configured. In response to configuration of a dual connectivity, the wireless device may assume a multi-TRP operation is not configured.

When a wireless device is configured with a multi-TRP operation, the wireless device may be configured with one or more power control processes across the multi-TRP. In an example, a wireless device is configured with a multi-TRP where a first TRP and a second TRP may communicate via a non-ideal backhaul. For example, the wireless device is activated with one or more first cells serviced by the first TRP. The wireless device is activated with one or more second cells serviced by the second TRP. The wireless device may transmit a first UL transmission to the first TRP. The wireless device may transmit a second UL transmission to the second TRP. The first UL transmission and the second UL transmission may be different.

In an example, a wireless device may maintain a separate PHR timer/PHR process per each TRP. For example, the wireless device may utilize a PHR framework of a dual connectivity in a multi-TRP scenario where a first TRP may correspond to a first CG/a first base station and a second TRP may correspond to a second CG/a second base station. When a wireless device may support PHR reporting on a multi-TRP scenario based on a dual connectivity scenario, the wireless device may not be configured with a dual connectivity and a multi-TRP scenario at a same time. In an example, a base station may transmit one or more RRC messages indicating whether to support a TRP-specific PHR report or a cell-specific PHR report. In response to a configuration of a TRP-specific PHR report, a wireless device may operate a PHR process per TRP. When a wireless device is associated with more than one TRP, the wireless device may operate more than one TRP processes. One TRP process may comprise one or more timers related to PHR reporting such as phr-PeriodicTimer, phr-ProhibitTimer, or phr-Tx-PowerFactorChange. When a wireless device may utilize a PHR framework of a dual connectivity for a multi-TRP scenario, a base station may transmit a parameter of phr-ModeOtherCG to configure a PHR determination either based on an actual transmission or based on a reference format for one or more cells associated with a different TRP than a TRP where a PHR is triggered. A common value of a parameter such as phr-Tx-PowerFactorChange may be shared among multiple TRPs/multiple PHR processes unless a different set of values are configured for different processes. In an example, a wireless device may be associated with a single TRP for a PCell. For example, the wireless device may be activated with a first TRP for the PCell. When the wireless device transmits a PHR to the first TRP, the wireless device may not report a PH value for the PCell associated with a second TRP. For example, a first entry (e.g., PH (Type 2, SpCell of the other MAC entry)) may be omitted for the PHR in this case. In an example, a wireless device may not transmit any Type 2 PH (e.g., a PHR based on a PUCCH) of a second TRP, in response to transmission of a PHR to a first TRP, when the wireless device may not transmit a PUCCH to the second TRP. When the wireless device may transmit a PUCCH to the second TRP in a cell X, the first entry may comprise a PH value of the cell X.

Figure 29:
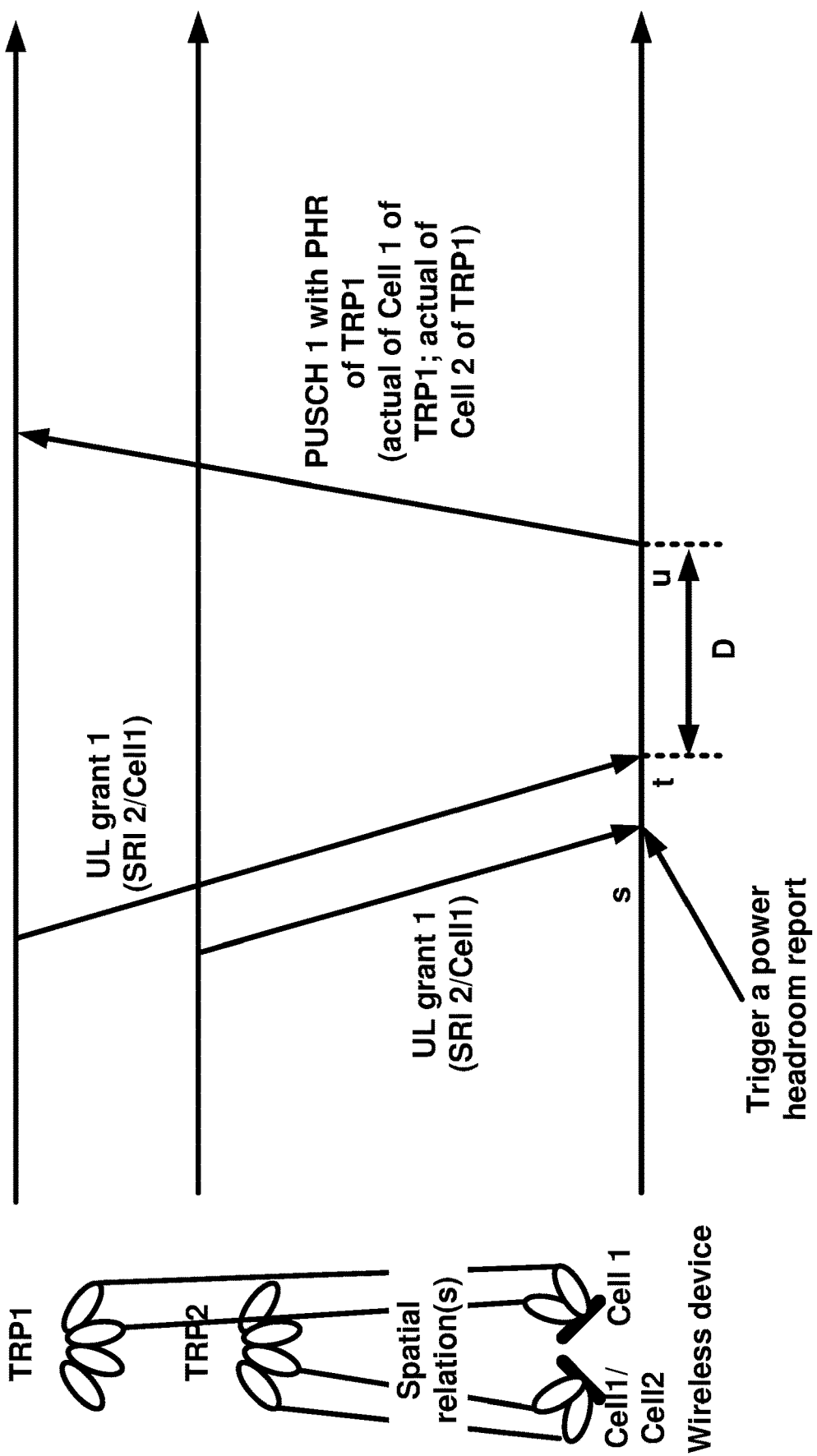
FIG. 29 is a signal flow diagram of a multi-TRP scenario as per an aspect of an example embodiment of the present disclosure.

In an example, a wireless device may have a first PH value for a first TRP and a second PH value for a second TRP for a cell. FIG. 29 illustrates an example. A wireless device may be associated with a first TRP (e.g., TRP1) and a second TRP (e.g., TRP2) where the first TRP configures/activates a first cell (e.g., Cell 1) and a second cell (e.g., Cell2), and the second TRP configures/activates the first cell (e.g., Cell 1). For the first cell, the wireless device determines a first PH value for the first TRP and a second PH value for the second TRP. The wireless device may select a single PH value between the first PH and the second PH based on one or more criteria. For example, the wireless device may select a PH value based on an actual transmission. The wireless device may inform the first TRP or the second TRP of the actual transmission in a PHR reporting MAC CE. When the first PH is based on an actual and the second PH is based on an actual, the wireless device may select a single PH for a TRP where the PHR is transmitted to. The wireless device selects the first cell PH value for Cell 1 as the PHR is transmitted to the TRP1 at a time u. The wireless device transmits a PHR comprising a PH value of Cell 1 associated with the first TRP and a PH value of Cell 2 associated with the first TRP. A wireless device may inform a TRP index using one of reserved bits as shown in FIG. 24A or FIG.

Figure 30:
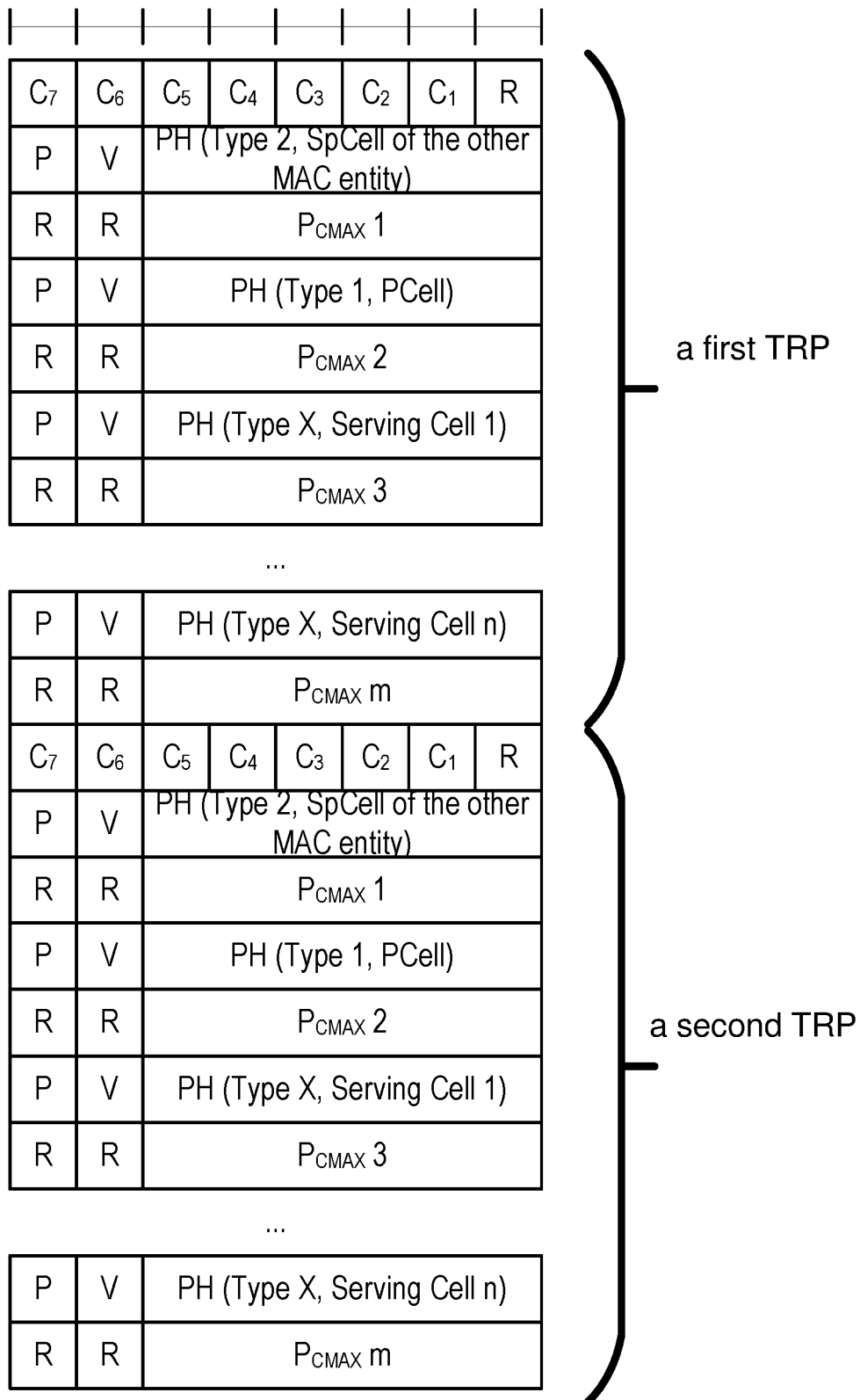
FIG. 30 illustrates a MAC CE format as per an aspect of an example embodiment of the present disclosure.

24B. A bit 'S' may be used to indicate a first TRP (e.g., '0') or a second TRP (e.g., '1'). When the first PH and the second PH are based on a reference format, the wireless device may transmit the first PH associated with the first TRP, or transmit the first PH if the PHR is transmitted to the first TRP and transmit the second PH if the PHR is transmitted to the second TRP. Based on a prioritization/selection rule, a wireless device may transmit a PH value for a cell in a multi-TRP scenario, when the cell is not a PCell. For the PCell, the wireless device may transmit a Type 2 PH for PCell of the other TRP. FIG. 30 illustrates an example of a MAC CE format to support a multi-TRP scenario. One or more first cells associated with a first TRP may be present first and one or more second cells associated with a second TRP may be followed.

In an example, a wireless device may use a MAC CE format supporting a multi-TRP scenario in response to receiving one or more radio resource control messages from a base station comprising more than one PHR processes. The wireless device may use a MAC CE format without assuming a multi-TRP scenario when the wireless device is associated with a single TRP. The wireless device may use a MAC CE format extended to support a multi-TRP scenario when the wireless device is associated with more than a TRP. The wireless device may use the MAC CE format extended to support a multi-TRP scenario in response to a RRC message indicating to use the MAC CE format from the base station.

In an example, a wireless device may use a MAC CE format without assuming a multi-TRP scenario. The wireless device may transmit a PHR comprising one or more cells of a TRP, or a PH value for an activated cell. The wireless device may support a first PHR process associated with a first TRP. The wireless device may support a second PHR process associated with a second TRP in response to being activated with the second TRP. The wireless device may transmit PH values for one or more first cells associated with the first TRP in a PHR, in response to a PHR trigger is associated with the first TRP. The wireless device may transmit PH values for one or more second cells associated with the second TRP, in response to a PHR trigger is associated with the second TRP. The wireless device may transmit a PH value for a cell that is associated with a TRP when the wireless device is triggered with a PHR towards to the TRP.

Figure 31:
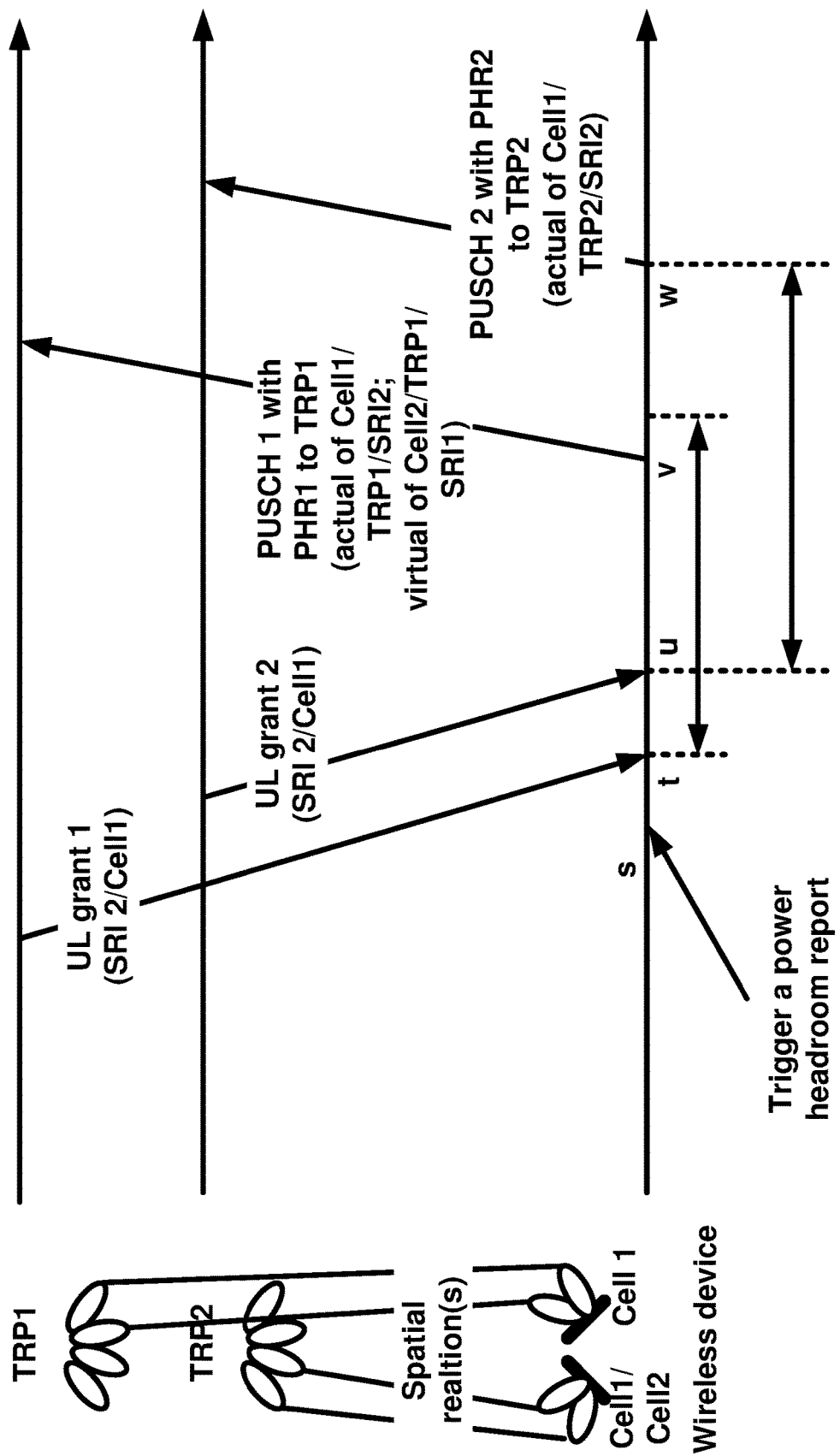
FIG. 31 is a signal flow diagram of a multi-TRP scenario as per an aspect of an example embodiment of the present disclosure.

In an example, a wireless device may maintain a single PHR process for a MAC entity. The wireless device may have a PHR process for supporting a cell group. In response to activating with a multi-TRP scenario in the cell group, the wireless device may transmit a PHR to each TRP when a PHR trigger occurs. FIG. 31 illustrates an example. A scenario of FIG. 31 is similar to that of FIG. 30. A wireless device is associated with a first TRP (e.g., TRP1) and a second TRP (e.g., TRP2). The wireless device is activated with a first cell (e.g., Cell1) and a second cell (e.g., Cell2) for the first TRP. The wireless device is activated with the first cell (e.g., Cell1) for the second TRP. The wireless device is triggered with a PHR at a time s. A PHR process may be shared between the first TRP and the second TRP. The wireless device determines one or more first PH values for one or more first cells associated with the first TRP. The wireless device transmits the one or more first PH values to a first PUSCH to the first TRP. In the example, the wireless device receives a first UL grant (UL grant 1) at a time t for the first TRP. The wireless device transmits the one or more first PH values via the first PUSCH (PUSCH 1) to the first TRP at a time v based on UL grant 1. The one or more first cells are active cells of the cell group where the active cells are associated with the first TRP. The wireless device may determine a cell is associated with a TRP based on one or more CORESET configuration from the TRP on the cell. The wireless device may determine a cell is associated with a TRP based on one or more TCI (transmission control indication) configuration that includes a potential control/data transmission from the TRP. The wireless device may determine a cell is associated with a TRP based on one or more RRC messages indicating that the cell is serviced by the TRP. The wireless device determines one or more second PH values for one or more second cells associated with the second TRP. The wireless device transmits the one or more second PH values to a second PUSCH (PUSCH 2) to the second TRP. In the example, the wireless device receives a second UL grant at a time u for the second TRP. The wireless device transmits the one or more second PH values via PUSCH 2 to the second TRP at a time w based on UL grant 2. In the time v, the wireless device transmits PH values of 'a PH for the first cell based on an actual transmission based on UL grant 1 and a PH for the second cell based on a reference format' as the first cell and the second cell are associated with the first TRP. In the time w, the wireless device transmits a first PH value of the first cell based on an actual transmission based on UL grant 2 as TRP2 configures the first cell only.

Figure 32:
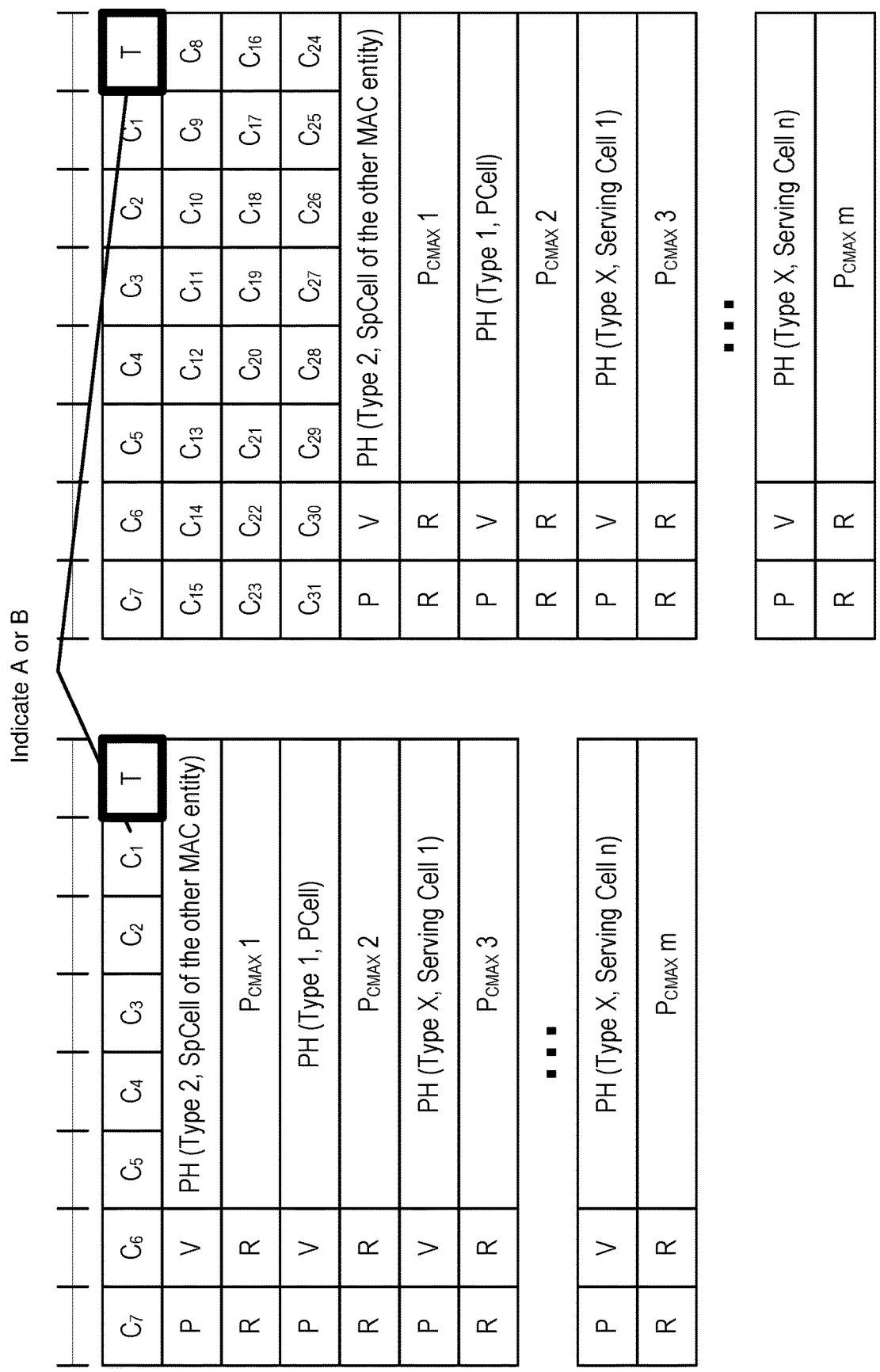
FIG. 32A illustrates an example MAC CE format for power headroom reporting as per an aspect of an example embodiment of the present disclosure.
FIG. 32B illustrates an example MAC CE format for power headroom reporting as per an aspect of an example embodiment of the present disclosure.

In an example, a wireless device may transmit one or more first PH values of one or more first cells associated with a first TRP in a first PUSCH. The wireless device may transmit one or more second PH values of one or more second cells associated with a second TRP in a second PUSCH. For example, a wireless device may initiate a PHR determination for a TRP based on a dedicated PHR process. The wireless device may maintain a first PHR process for the first TRP. The wireless device may maintain a second PHR process for the second TRP. In response to a PHR trigger based on the first PHR process, the wireless device may transmit the one or more first PH values. In response to a PHR trigger based on the second PHR process, the wireless device may transmit the one or more second PH values. For example, a wireless device may maintain a single PHR process shared between a first TRP and a second TRP. In response to a PHR trigger, the wireless device may transmit one or more first PH values for cells associated with the first TRP in a first PUSCH. The wireless device may transmit one or more second PH values for cells associated with the second TRP in a second PUSCH. For example, the first PUSCH is an earliest PUSCH after the PHR trigger. The second PUSCH is a next earliest PUSCH after the PHR trigger. The first PUSCH and the second PUSCH may be selected regardless of a destination (e.g., either the first TRP or the second TRP). In an example, the wireless device may select a first PUSCH as a first PUSCH to the first TRP after a PHR trigger. The wireless device may select a second PUSCH as a first PUSCH to the second TRP after a PHR trigger. In an example, a wireless device may use a reserved bit in a MAC CE to inform whether PH values are for a first TRP or a second TRP. FIGS. 32A and 32B illustrate an example a MAC CE format to indicate a TRP index of the reported PH values. 'T' bit may represent a first TRP (e.g., T=0) or may represent a second TRP (e.g., T=1).

Figure 33:
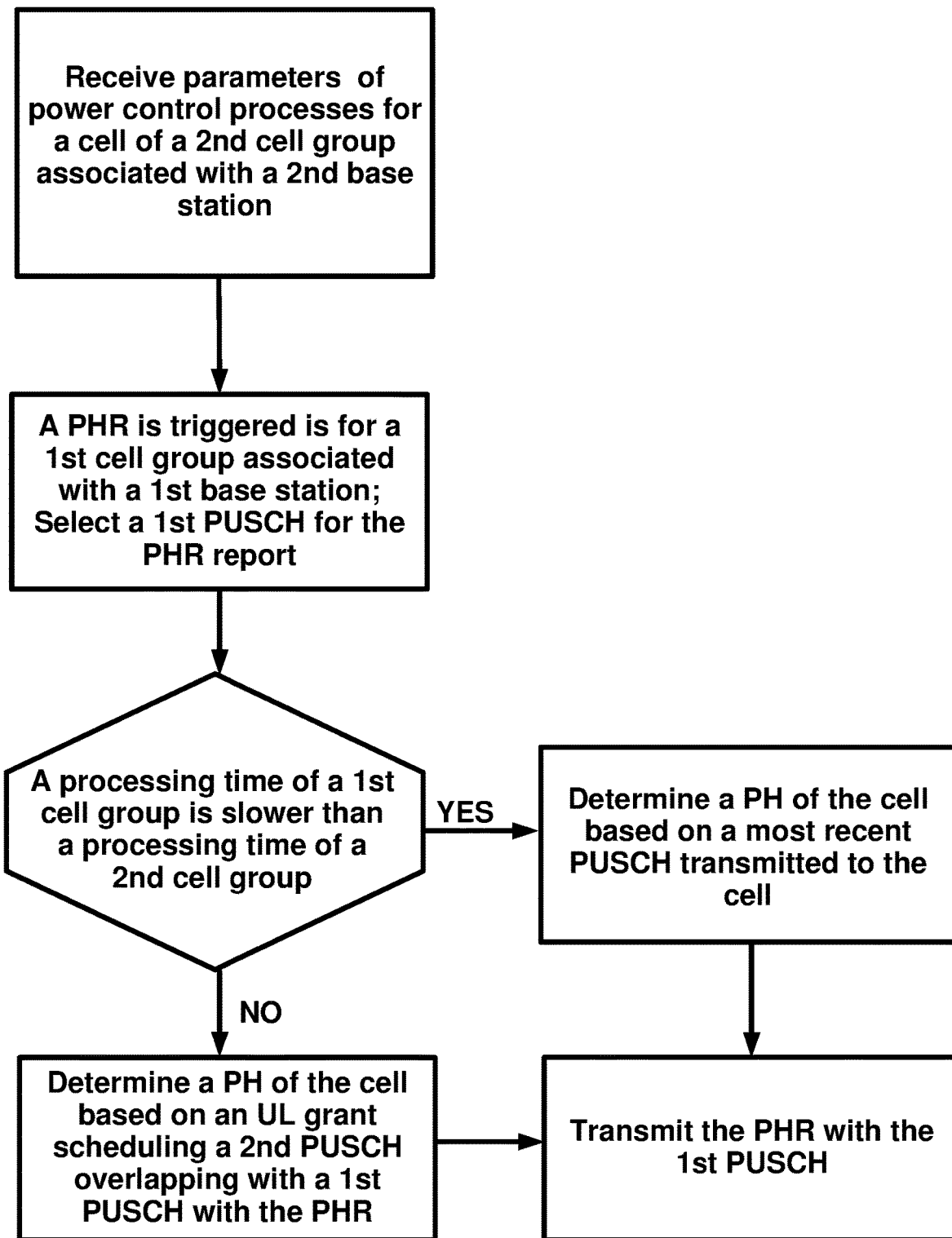
FIG. 33 is a flow diagram of an aspect of an example embodiment of the present disclosure.

FIG. 33 illustrates a flow chart to indicate an actual PH of a second base station when a processing time of a second cell group is faster than a processing time of a first cell group. When a wireless device is triggered with a PHR to the first base station, and is configured to determine a PH based on actual transmission for the second cell group, the wireless device may use a previous PUSCH of a cell of the second cell group to determine a PH based on actual transmission.

Figure 34:
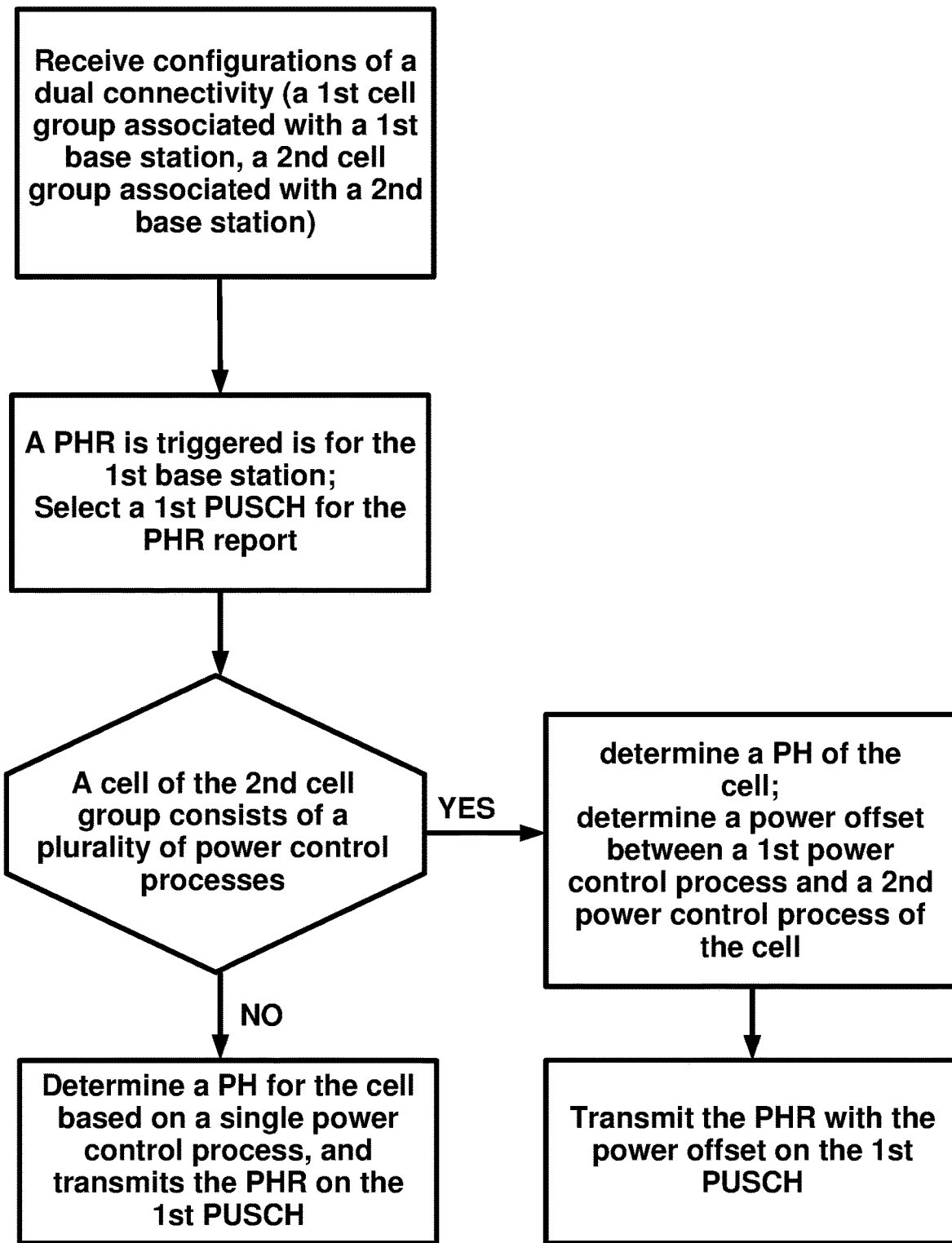
FIG. 34 is a flow diagram of an aspect of an example embodiment of the present disclosure.

FIG. 34 illustrates a flow chart to indicate a power offset between a plurality of power control processes. When a wireless device operates with a plurality of power control processes in a cell, the wireless device may transmit a power offset between the power control processes. The operation may be done for a PHR reporting to a first base station, where the cell belongs to a second base station.

In an example, a wireless device may receive one or more radio resource control (RRC) messages. The one or more RRC messages may comprise one or more parameters to configure a dual connectivity and parameters of power headroom report. The wireless device may determine a first power headroom value associated with a first power control process of a first cell. The first cell may be associated with a first base station. The wireless device may determine a power offset at least based on the first power headroom value and a second power headroom value associated with a second power control process of the first cell. The wireless device may transmit to a second base station a power headroom report. The power headroom report may comprise the first power headroom value and the power offset.

In an example, a wireless device may receive one or more radio resource control (RRC) messages. The one or more RRC messages may comprise one or more parameters to configure a dual connectivity and parameters of power headroom report. The wireless device may determine a first power headroom value associated with a first power control process of a first cell. The wireless device may determine the first power headroom value based on an actual transmission in response to a power control process of the actual transmission being indicated as a first power control process of the cell. The wireless device may determine the first power headroom value based on a reference format in response to a power control process of an actual transmission being indicated as a second power control process of the cell. The wireless device may transmit to a second base station a power headroom report. The power headroom report may comprise the first power headroom value.

In an example, a wireless device may receive one or more radio resource control (RRC) messages. The one or more RRC messages may comprise one or more parameters to configure a dual connectivity and parameters of power headroom report. The one or more RRC messages may indicate a dedicated power control process for a first cell. The wireless device may determine a first power headroom value associated with a first power control process of a first cell. The wireless device may determine the first power headroom value based on an actual transmission in response to a power control process of the actual transmission being indicated as a same to the dedicated power control process of the cell. The wireless device may determine the first power headroom value based on a reference format in response to a power control process of an actual transmission being indicated differently from the dedicated power control process of the cell. The wireless device may transmit to a second base station a power headroom report. The power headroom report may comprise the first power headroom value.

In an example, a wireless device may receive one or more radio resource control (RRC) messages. The one or more RRC messages may comprise one or more parameters to configure a multi-TRP scenario (e.g., a first TRP and a second TRP) and parameters of power headroom report. One or more first cells are associated with the first TRP. One or more second cells are associated with the second TRP. A first cell is associated with the first TRP as well as with the second TRP. The wireless device may determine a first power headroom value associated with the first cell. The wireless device may determine the first power headroom value as a power headroom value of the first cell based on an actual transmission to the first TRP in a first condition. The first condition may comprise that a first UL grant or a configured grant may schedule a first PUSCH that overlaps with a PUSCH carrying a PHR (Power Headroom Report) in response to the PHR triggering. The wireless device may determine the first power headroom value as a power headroom value of the first cell based on an actual transmission to the second TRP in a second condition. The second condition may comprise that a second UL grant or a configured grant may schedule a second PUSCH that overlaps with the PUSCH carrying the PHR and a power headroom value of the first cell for the first TRP may be based on a reference format. The wireless device may transmit the power headroom report. The power headroom report may comprise the first power headroom value. According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 35:
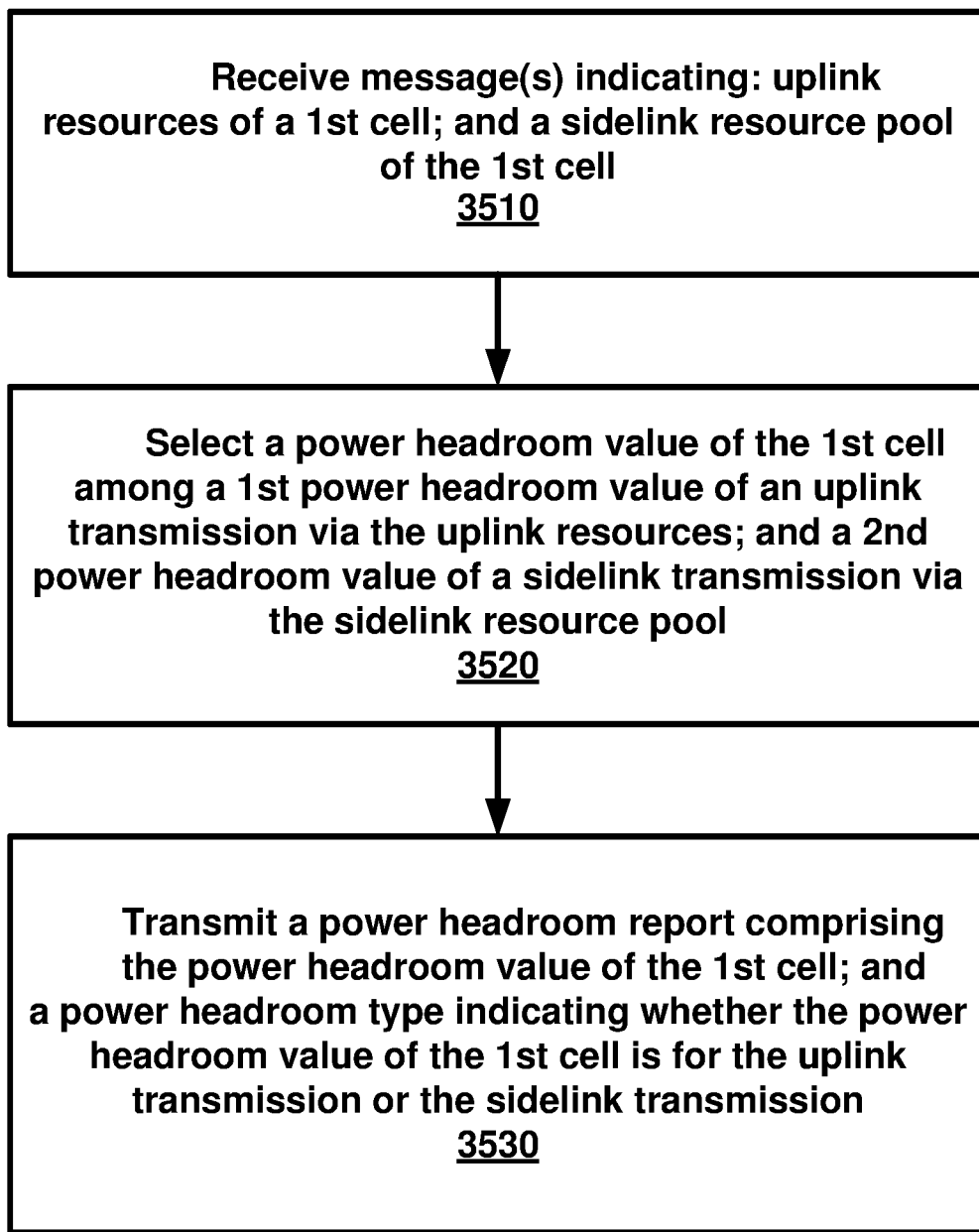
FIG. 35 is a flow diagram of an aspect of an example embodiment of the present disclosure.

FIG. 35 is a flow diagram as per an aspect of an example embodiment of the present disclosure. At 3510, a wireless device may receive one or more radio resource control (RRC) messages. The one or more RRC messages may indicate uplink resources of a first cell and a sidelink resource pool of the first cell. At 3520, the wireless device may select a power headroom value of the first cell among a first power headroom value of an uplink transmission via the uplink resources and a second power headroom value of a sidelink transmission via the sidelink resource pool. At 3530, the wireless device may transmit a power headroom report comprising the power headroom value of the first cell and a power headroom type indicating whether the power headroom value of the first cell is for the uplink transmission or the sidelink transmission.

According to an example embodiment, the wireless device may receive one or more second RRC messages indicating one or more parameters. The one or more parameters may be for the second power headroom value of the sidelink transmission. The one or more parameters may comprise/indicate a power headroom determination mechanism. For example, the power headroom determination mechanism may indicate whether to determine the second power headroom value based on an actual sidelink transmission or a sidelink reference format. According to an example embodiment, the wireless device may determine the second power headroom value based on the power headroom determination mechanism. For example, the wireless device may be configured with a mode 1 sidelink operation in the sidelink resource pool. In response to being configured with the mode 1 sidelink operation, the wireless device may determine the power headroom determination mechanism based on the actual sidelink transmission. In response to being configured with the mode 1 sidelink operation, the wireless device may receive resource assignments of the sidelink transmission from a base station.

According to an example embodiment, the wireless device may be configured with a mode 2 sidelink operation in the sidelink resource pool. In response to being configured with the mode 2 sidelink operation, the wireless device may determine the power headroom determination mechanism based on the sidelink reference format. In response to being configured with the mode 2 sidelink operation, the wireless device may determine resource assignments for the sidelink transmission. According to an example embodiment, the wireless device may be scheduled with the uplink transmission in a slot and may not be scheduled with the sidelink transmission in the slot. The wireless device may select the power headroom value based on the uplink transmission in such case. According to an example embodiment, the wireless device may not be scheduled with the uplink transmission in a slot and may be scheduled with the sidelink transmission in the slot. The wireless device may select the power headroom value based on the sidelink transmission in such case.

According to an example embodiment, the selecting of the power headroom value may be based on the uplink transmission in a case. For example, the case may comprise the wireless device may be configured with the uplink transmission in a slot and may be configured with the sidelink transmission in the slot. The wireless device may determine that the uplink transmission may have a higher priority than or equal to the sidelink transmission in the slot. According to an example embodiment, the selecting of the power headroom value may be based on the sidelink transmission in a second case. For example, the second case may comprise the wireless device may be configured with the uplink transmission in a slot and may be configured with the sidelink transmission in the slot. The wireless device may determine that the uplink transmission may have a lower priority than the sidelink transmission in the slot.

In an example, a wireless device may receive one or more radio resource control (RRC) messages. The one or more RRC messages may indicate a first cell group associated with a first base station, a second cell group associated with a second base station, a first power control process of a first cell of the first cell group and a second power control process of the first cell. The wireless device may transmit, to the second base station, a power headroom report for the second cell group. The power headroom report may comprise a first power headroom value of the first power control process of the first cell and a power offset. For example, the power offset may be determined based on a second power headroom value of the second power control process and the first power headroom value of the first power control process. For example, the power headroom report may comprise one or more power offsets for one or more cells, comprising the first cell, of the first cell group. For example, the power headroom report may not comprise power offset for one or more second cells of the second cell group. The wireless device may determine a third power headroom value based on a power control process of a second cell of the second cell group. For example, the first power headroom report may comprise the third power headroom value of the second cell. For example, the wireless device may determine the first power headroom value based on one or more first power control parameters for the first power control process and a reference format. For example, the wireless device may determine the second power headroom value based on one or more second power control parameters for the second power control process and the reference format. The wireless device may determine the power offset as a difference between the first power headroom value and the second power headroom value.

According to an example embodiment, the one or more RRC may comprise a power headroom type for the first cell group. For example, the power headroom type may be used in determining, in response to the power headroom report for the second cell group, one or more power headroom values of one or more cells, comprising the first cell, of the first cell group. The power headroom type may indicate to determine a power headroom value of a cell of the one or more cells based on an actual transmission or a reference format. For example, the power headroom report may comprise the power offset in response to being configured with the power headroom type based on the reference format. For example, the first base station may comprise a first transmission and reception point (TRP) and a second TRP. According to an example embodiment, the wireless device may receive one or more second RRC messages. The one or more second RRC messages may indicate that the first cell is associated with the first TRP and the second TRP. For example, the first power control process may be associated with the first TRP and the second power control process may be associated with the second TRP. According to an example embodiment, the wireless device may trigger a second power headroom report for the first TRP of the first cell group and a third power headroom report for the second TRP of the first cell group. The wireless device may determine, in response to the triggering, a third power headroom value of the first cell based on the first power control process. The wireless device may transmit the second power headroom report comprising the third power headroom value of the first cell to the first TRP of the first cell group. For example, the second power headroom report may comprise a TRP index indicating the first TRP for the third power headroom value. According to an example embodiment, the wireless device may determine, in response to the triggering, a fourth power headroom value of the first cell based on the second power control process. The wireless device may transmit the third power headroom report comprising the fourth power headroom value of the first cell to the second TRP of the first cell group. The third power headroom report may comprise a second TRP index indicating the second TRP for the fourth power headroom value.

In an example, a wireless device may be configured with a dual connectivity. The wireless device may determine a first power headroom value of a first cell associated with a first base station based on an actual transmission in response to a power control process indicated in the actual transmission being determined based on a first power control process of the first cell and a reference format in response to a power control process indicated in the actual transmission being determined based on a second power control process of the first cell. The wireless device may transmit, to a second base station, a power headroom report comprising the first power headroom value.

In an example, a wireless device may be configured with a multi-transmission and reception point (TRP). The wireless device may determine a first power headroom value associated with a first cell associated with a first TRP and a second TRP. The wireless device may determine the first power headroom value as a power headroom value of the first cell based on an actual transmission to the first TRP. For example, a first UL grant or a configured grant scheduling a first physical uplink shared channel (PUSCH) that overlaps with a PUSCH carrying a power headroom report. The wireless device may determine the first power headroom value as a power headroom value of the first cell based on an actual transmission to the second TRP. For example, a second UL grant or a configured grant scheduling a second PUSCH that overlaps with the PUSCH carrying the power headroom report and a PH of the first cell for the first TRP being a virtual PH. The wireless device may transmit the power headroom report comprising the first power headroom value.

In an example, a wireless device receive one or more RRC messages. The one or more RRC messages may indicate a first carrier for an uplink operation and a sidelink PH determination mechanism indicating a PH value of a sidelink transmission determination based on an actual transmission or a reference format. The wireless device may trigger a power headroom report. The wireless device may determine a first power headroom value of the first carrier and a second power headroom value of the second carrier based on the sidelink PH determination mechanism. The wireless device may transmit a power headroom report indicating the first power headroom value and the second power headroom value.

We claim:

1. A method performed by a wireless device, comprising:
    selecting a power headroom value of a first cell among:
        a first power headroom value of an uplink transmission via uplink resources of the first cell, and
        a second power headroom value of a sidelink transmission via a sidelink resource pool of the first cell; and
    transmitting a power headroom report comprising the power headroom value of the first cell and a power headroom type indicating whether the power headroom value of the first cell is for the uplink transmission or the sidelink transmission,
    wherein the second power headroom value is determined (1) based on an actual sidelink transmission when the wireless device is configured with a mode 1 sidelink operation in which resource assignments for the sidelink transmission are received from a base station, and (2) based on a sidelink reference format that is a virtual power headroom value when the wireless device is configured with a mode 2 sidelink operation in which resource assignments for the sidelink transmission are not received from the base station.

2. The method of claim 1, further comprising receiving an indication of the uplink resources and the sidelink resource pool.

3. The method of claim 1, further comprising, in response to a configured first uplink transmission and a configured second sidelink transmission overlapping in time, dropping:
    the configured first uplink transmission via the uplink resources of the first cell; and
    the configured second sidelink transmission via the sidelink resource pool of the first cell.

4. The method of claim 1, wherein, in response to the wireless device being scheduled with the uplink transmission in a slot and not being scheduled with the sidelink transmission in the slot, the selecting the power headroom value is further based on the uplink transmission.

5. The method of claim 1, wherein, in response to the wireless device being scheduled with the sidelink transmission in a slot and not being scheduled with the uplink transmission, the selecting the power headroom value is further based on the sidelink transmission.

6. The method of claim 1, wherein the selecting the power headroom value is further based on a comparison of a priority of the uplink transmission in a slot with a priority of the sidelink transmission in the slot, in response to the wireless device being scheduled with both the uplink transmission and the sidelink transmission in the slot.

7. A wireless device comprising:
    one or more processors; and
    memory storing instructions that, when executed by the one or more processors, cause the wireless device to:
    select a power headroom value of a first cell among:
        a first power headroom value of an uplink transmission via uplink resources of the first cell, and
        a second power headroom value of a sidelink transmission via a sidelink resource pool of the first cell; and
    transmit a power headroom report comprising the power headroom value of a first cell and the power headroom type indicating whether the power headroom value of the first cell is for the uplink transmission or the sidelink transmission,
    wherein the second power headroom value is determined (1) based on an actual sidelink transmission when the wireless device is configured with a mode 1 sidelink operation in which resource assignments for the sidelink transmission are received from a base station, and (2) based on a sidelink reference format that is a virtual power headroom value when the wireless device is configured with a mode 2 sidelink operation in which resource assignments for the sidelink transmission are not received from the base station.

8. The wireless device of claim 7, wherein the instructions further cause the wireless device to receive an indication of the uplink resources and the sidelink resource pool.

9. The wireless device of claim 7, wherein the instructions further cause the wireless device to, in response to a configured first uplink transmission and a configured second sidelink transmission overlapping in time, drop:
    the configured first uplink transmission via the uplink resources of the first cell; and
    the configured second sidelink transmission via the sidelink resource pool of the first cell.

10. The wireless device of claim 7, wherein, in response to the wireless device being scheduled with the uplink transmission in a slot and not being scheduled with the sidelink transmission in the slot, selecting the power headroom value is further based on the uplink transmission.

11. The wireless device of claim 7, wherein, in response to the wireless device being scheduled with the sidelink transmission in a slot and not being scheduled with the uplink transmission, selecting the power headroom value is further based on the sidelink transmission.

12. A system comprising:
    a base station; and
    a wireless device comprising:
        one or more processors; and
        memory storing instructions that, when executed by the one or more processors, cause the wireless device to:
    select a power headroom value of a first cell among:
        a first power headroom value of an uplink transmission via uplink resources of the first cell and
        a second power headroom value of a sidelink transmission via a sidelink resource pool of the first cell; and
    transmit a power headroom report comprising a power headroom value of a first cell and a power headroom type indicating whether the power headroom value of the first cell is for the uplink transmission or the sidelink transmission,
    wherein the second power headroom value is determined (1) based on an actual sidelink transmission when the wireless device is configured with a mode 1 sidelink operation in which resource assignments for the sidelink transmission are received from a base station, and (2) based on a sidelink reference format that is a virtual power headroom value when the wireless device is configured with a mode 2 sidelink operation in which resource assignments for the sidelink transmission are not received from the base station.

* * * * *